(12) United States Patent
Choi et al.

(10) Patent No.: US 11,973,977 B2
(45) Date of Patent: Apr. 30, 2024

(54) CCLM PREDICTION-BASED IMAGE DECODING METHOD AND APPARATUS IN IMAGE CODING SYSTEM

(71) Applicant: LG ELECTRONICS INC., Seoul (KR)

(72) Inventors: Jangwon Choi, Seoul (KR); Jin Heo, Seoul (KR); Seunghwan Kim, Seoul (KR); Sunmi Yoo, Seoul (KR); Jungah Choi, Seoul (KR); Ling Li, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 322 days.

(21) Appl. No.: 17/432,372

(22) PCT Filed: Feb. 21, 2020

(86) PCT No.: PCT/KR2020/002532
§ 371 (c)(1),
(2) Date: Aug. 19, 2021

(87) PCT Pub. No.: WO2020/171644
PCT Pub. Date: Aug. 27, 2020

(65) Prior Publication Data
US 2022/0150538 A1    May 12, 2022

Related U.S. Application Data

(60) Provisional application No. 62/817,570, filed on Mar. 13, 2019, provisional application No. 62/808,844, filed on Feb. 22, 2019.

(51) Int. Cl.
*H04N 19/593* (2014.01)
*H04N 19/11* (2014.01)
(Continued)

(52) U.S. Cl.
CPC .......... *H04N 19/593* (2014.11); *H04N 19/11* (2014.11); *H04N 19/132* (2014.11);
(Continued)

(58) Field of Classification Search
CPC .... H04N 19/593; H04N 19/11; H04N 19/132; H04N 19/176; H04N 19/186
See application file for complete search history.

(56) References Cited

U.S. PATENT DOCUMENTS

2013/0272377 A1* 10/2013 Karczewicz ............ H03M 7/30
341/51
2020/0296380 A1* 9/2020 Aono .................... H04N 19/593

FOREIGN PATENT DOCUMENTS

JP      2018056685 A    4/2018
KR   10-2017-0129750 A   11/2017
(Continued)

OTHER PUBLICATIONS

Jangwon Choi et al., CE3-related: Reduced number of reference samples for CCLM parameter calculation (JVET-L0138 v1), Oct. 6, 2018, pp. 1-9.
(Continued)

*Primary Examiner* — Fabio S Lima
(74) *Attorney, Agent, or Firm* — Bryan Cave Leighton Paisner LLP

(57) ABSTRACT

An image decoding method executed by a decoding apparatus according to the present document comprises the steps of: deriving an intra prediction mode of the current chroma block by means of cross-component linear model (CCLM) mode; deriving downsampled luma samples on the basis of the current luma block; deriving downsampled neighboring luma samples on the basis of neighboring luma samples of the current luma block; and deriving the CCLM parameter on the basis of the downsampled neighboring luma samples
(Continued)

and neighboring chroma samples of the current neighboring chroma block, wherein the number of downsampled neighboring luma samples and number of neighboring chroma samples are equal to the previously set thresh-hold value, and the thresh-hold value is derived on the basis of the width and height of the current chroma block.

3 Claims, 36 Drawing Sheets

(51) Int. Cl.
  *H04N 19/132* (2014.01)
  *H04N 19/176* (2014.01)
  *H04N 19/186* (2014.01)
  *H04N 19/196* (2014.01)
(52) U.S. Cl.
  CPC ......... *H04N 19/176* (2014.11); *H04N 19/186* (2014.11); *H04N 19/196* (2014.11)

(56) References Cited

FOREIGN PATENT DOCUMENTS

| KR | 20190008224 A | 1/2019 |
| WO | 2017164297 A1 | 9/2017 |
| WO | 2018132710 A1 | 7/2018 |
| WO | 2018140587 A1 | 8/2018 |

OTHER PUBLICATIONS

Jangwon Choi et al., "CE3-related: Reduced number of reference samples for CCLM parameter calculation", LG Electronics Inc., Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0138-v2, pp. 1-6.

Jangwon Choi et al., "CE3-related: Reduced No. of reference samples for CCLM parameter calculation", LG Electronics Inc., Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0138-v3, pp. 1-6.

* cited by examiner downsampled Y      Cb / Cr previous reference subsampling method downsampled Y      Cb / Cr proposed reference subsampling method downsampled Y  Cb / Cr previous reference subsampling method downsampled Y  Cb / Cr proposed reference subsampling method downsampled Y Cb / Cr previous reference subsampling method downsampled Y Cb / Cr proposed reference subsampling method

CCLM PREDICTION-BASED IMAGE DECODING METHOD AND APPARATUS IN IMAGE CODING SYSTEM

CROSS-REFERENCE TO RELATED APPLICATION

This application is the National Stage filing under 35 U.S.C. 371 of International Application No. PCT/KR2020/002532,filed Feb. 21, 2020, which claims the benefit of U.S. Provisional Application No. 62/817,570, filed on Mar. 13, 2019, and U.S. Provisional Application No. 62/808,844, filed on Feb. 22, 2019, the contents of which are all hereby incorporated by reference herein in their entirety.

BACKGROUND OF THE DISCLOSURE

Field of the Disclosure

The present disclosure relates to an image decoding method based on intra prediction according to CCLM, and an apparatus thereof.

Related Art

Recently, demands for high-resolution and high-quality images, such as High Definition (HD) images and Ultra High Definition (UHD) images, have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE DISCLOSURE

Technical Objects

An aspect of the present disclosure is to provide a method and an apparatus for enhancing image coding efficiency.

Another aspect of the present disclosure is to provide a method and an apparatus for enhancing efficiency of intra prediction.

Still another aspect of the present disclosure is to provide a method and an apparatus for enhancing efficiency of intra prediction based on a cross component linear model (CCLM).

Still another aspect of the present disclosure is to provide an efficient encoding and decoding method of CCLM prediction, and an apparatus for performing the encoding and decoding method.

Still another aspect of the present disclosure is to provide a method and an apparatus for selecting peripheral samples for deriving linear model parameters for CCLM.

Technical Solutions

According to one exemplary embodiment of the present disclosure, an image decoding method performed by a decoding apparatus is provided. The method includes: when an intra prediction mode for a current chroma block is a cross-component linear model (CCLM) mode, deriving downsampled luma samples based on a current luma block; deriving downsampled neighboring luma samples based on neighboring luma samples of the current luma block; and deriving a CCLM parameter based on the downsampled neighboring luma samples and neighboring chroma samples of a current neighboring chroma block, wherein the number of downsampled neighboring luma samples and the number of neighboring chroma samples are equal to a predetermined threshold value, and the threshold value is derived based on a width and a height of the current chroma block.

According to another exemplary embodiment of the present disclosure, a decoding apparatus for performing image decoding is provided. The decoding apparatus includes a predictor configured to: when deriving an intra prediction mode for a current chroma block as a cross-component linear model (CCLM) mode and performing a prediction thereof, derive downsampled luma samples based on a current luma block, derive downsampled neighboring luma samples based on neighboring luma samples of the current luma block, and derive a CCLM parameter based on the downsampled neighboring luma samples and neighboring chroma samples of a current neighboring chroma block, wherein the number of downsampled neighboring luma samples and the number of neighboring chroma samples are equal to a predetermined threshold value, and the threshold value is derived based on a width and a height of the current chroma block.

According to still another exemplary embodiment of the present disclosure, a video encoding method performed by an encoding apparatus is provided. The method includes: when determining a cross-component linear model (CCLM) mode as an intra prediction mode for a current chroma block, deriving downsampled luma samples based on a current luma block; deriving downsampled neighboring luma samples based on neighboring luma samples of the current luma block; and deriving a CCLM parameter based on the downsampled neighboring luma samples and neighboring chroma samples of a current neighboring chroma block, wherein the number of downsampled neighboring luma samples and the number of neighboring chroma samples are equal to a predetermined threshold value, and the threshold value is derived based on a width and a height of the current chroma block.

According to still another exemplary embodiment of the present disclosure, a video encoding apparatus is provided. The encoding apparatus includes: a predictor configured to: derive an intra prediction mode for a current chroma block as a cross-component linear model (CCLM) mode based on prediction mode information on a current chroma block, derive downsampled luma samples based on a current luma block, derive downsampled neighboring luma samples based on neighboring luma samples of the current luma block, and derive a CCLM parameter based on the downsampled neighboring luma samples and neighboring chroma samples of a current neighboring chroma block, wherein the number of downsampled neighboring luma samples and the number of neighboring chroma samples are equal to a predetermined threshold value, and the threshold value is derived based on a width and a height of the current chroma block.

According to still another exemplary embodiment of the present disclosure, a digital storage medium may be provided, in which image data including encoded image information and bitstream generated according to an image encoding method performed by an encoding apparatus is stored.

According to still another exemplary embodiment of the present disclosure, a digital storage medium may be provided, in which image data including encoded image information and bitstream causing a decoding apparatus to perform the image decoding method is stored.

Effects of the Disclosure

According to the present disclosure, the overall image/video compression efficiency can be enhanced.

According to the present disclosure, the intra prediction efficiency can be enhanced.

According to the present disclosure, the image coding efficiency can be enhanced through performing of intra prediction based on CCLM.

According to the present disclosure, the CCLM-based intra prediction efficiency can be enhanced.

According to the present disclosure, the intra prediction complexity can be reduced by limiting the number of neighboring samples being selected to derive a linear model parameter for CCLM to a specific number.

Effects that can be obtained through detailed examples in the description are not limited to the above-mentioned effects. For example, there may be various technical effects that can be understood or induced from the description by a person having ordinary skill in the related art. Accordingly, the detailed effects of the description are not limited to those explicitly described in the description, and may include various effects that can be understood or induced from the technical features of the description.

DESCRIPTION OF EXEMPLARY EMBODIMENTS

Figure 1:
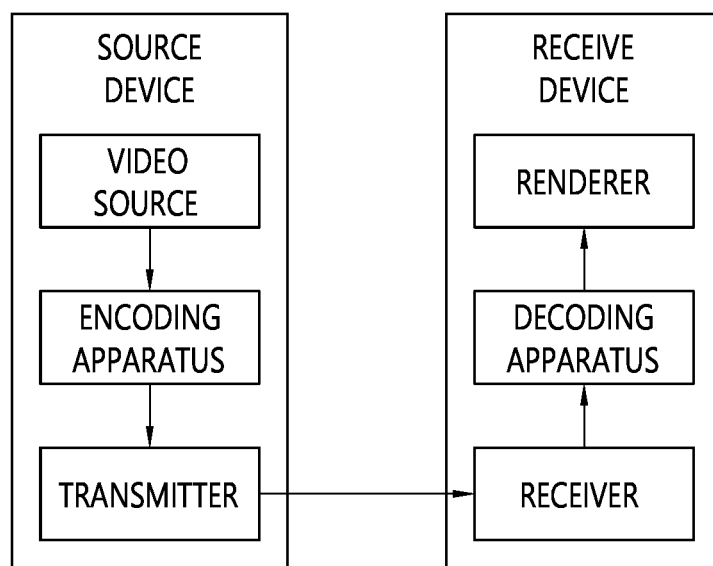
FIG. 1 schematically illustrates an example of a video/image coding system to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

In this document, the term "A or B" may mean "only A", "only B", or "both A and B". In other words, in the document, the term "A or B" may be interpreted to indicate "A and/or B". For example, in the document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In the document, "at least one of A and B" may mean "only A", "only B", or "both A and B". Further, in the document, the expression "at least one of A or B" or "at least one of A and/or B" may be interpreted the same as "at least one of A and B".

Further, in the document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the document may mean "for example". Specifically, in the case that "prediction (intra prediction)" is expressed, it may be indicated that "intra prediction" is proposed as an example of "prediction". In other words, the term "prediction" is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the document, technical features individually explained in one drawing may be individually implemented, or may be simultaneously implemented.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
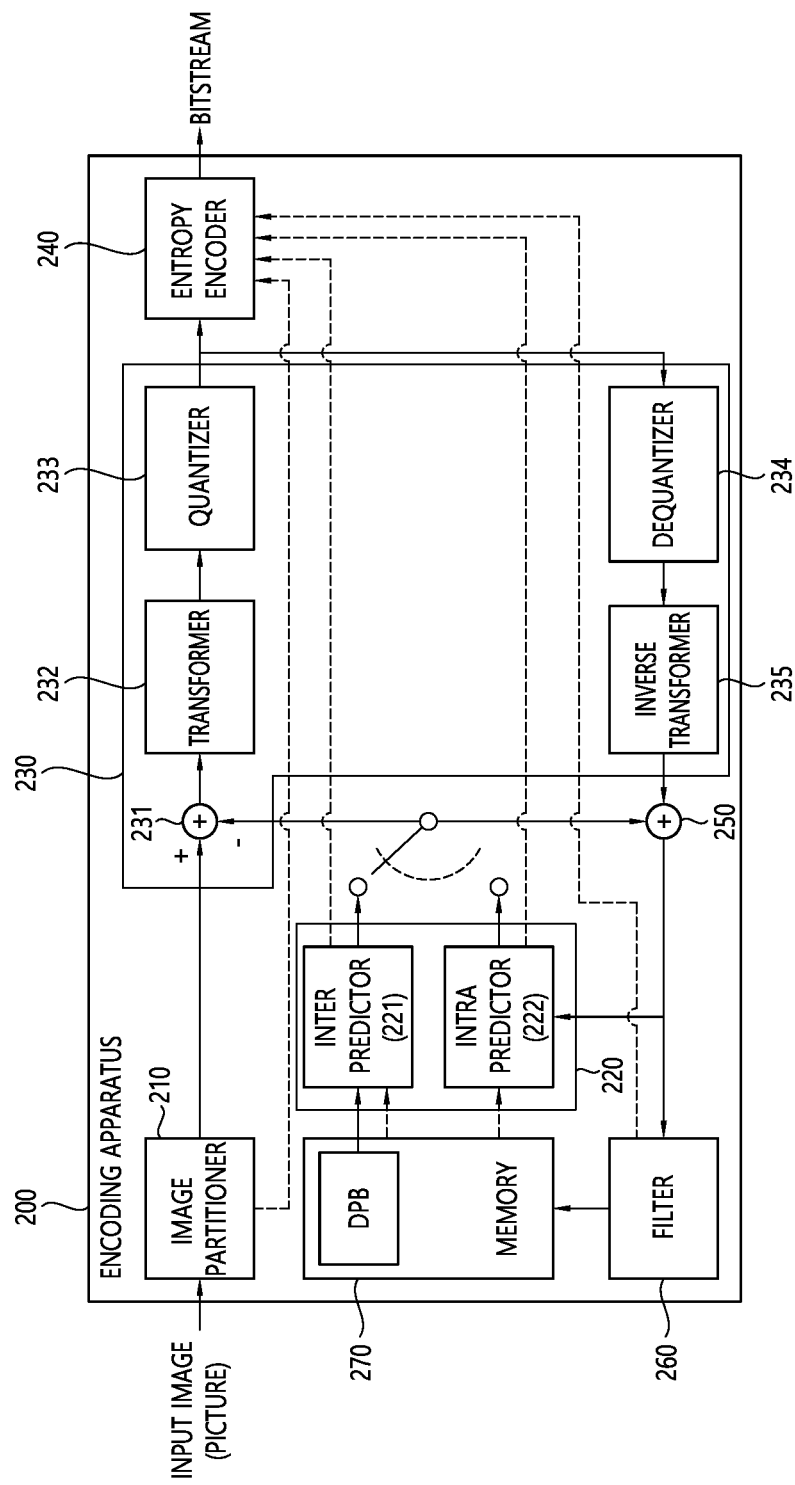
FIG. 2 is a diagram schematically explaining the configuration of a video/image encoding apparatus to which embodiments of the present disclosure are applicable.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pa.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
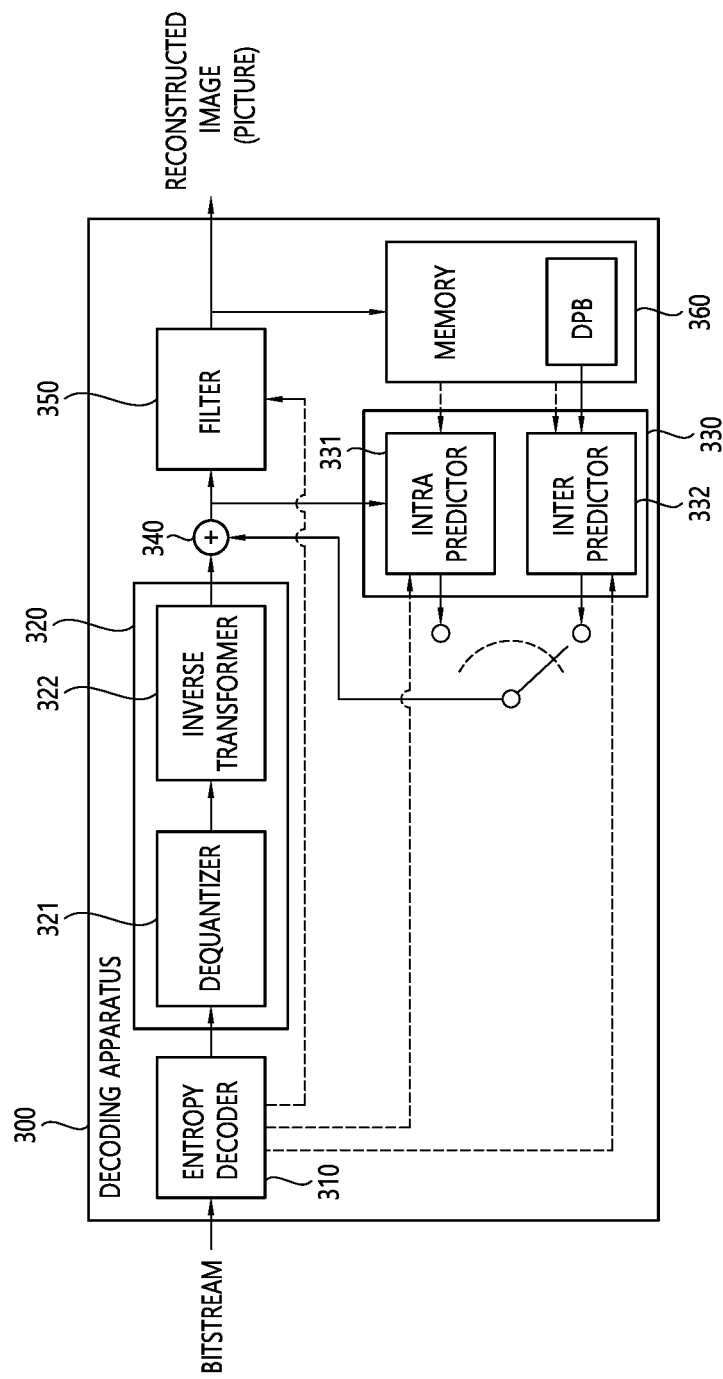
FIG. 3 is a diagram schematically explaining the configuration of a video/image decoding apparatus to which embodiments of the present disclosure are applicable.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded through the decoding procedure, and may be obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

Meanwhile, as described above, in performing video coding, a prediction is performed to enhance compression efficiency. Accordingly, a prediction block including prediction samples for a current block, that is, a coding target block, may be generated. In this case, the predicted block includes prediction samples in a spatial domain (or pixel domain). The prediction block is identically derived in the encoding apparatus and the decoding apparatus. The encoding apparatus may improve image coding efficiency by signaling residual information on a residual between an original block and the predicted block not an original sample value of the original block itself to the decoding apparatus. The decoding apparatus may derive a residual block including residual samples based on the residual information, may generate a reconstructed block including reconstructed samples by adding up the residual block and the prediction block, and may generate a reconstructed picture including the reconstructed block.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bit stream). In this case, the residual information may include information, such as value information, location information, a transform scheme, a transform kernel and a quantization parameter of the quantized transform coefficients. The decoding apparatus may perform a dequantization/inverse transform procedure based on the residual information and may derive the residual samples (or residual block). The decoding apparatus may generate the reconstructed picture based on the prediction block and the residual block. The encoding apparatus may also derive the residual block by performing a dequantization/inverse transform on the quantized transform coefficients for the reference of inter prediction of a subsequent picture and may generate the reconstructed picture based on the residual block.

Figure 4:
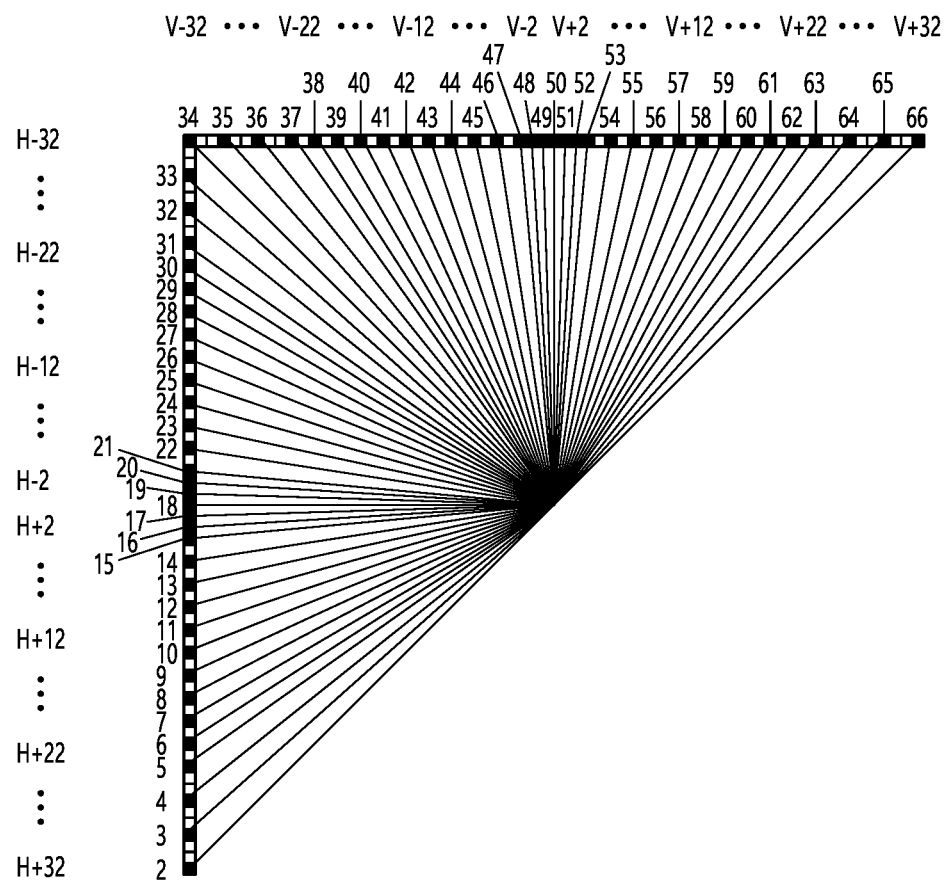
FIG. 4 exemplarily illustrates intra directional modes of 65 prediction directions.

FIG. 4 illustrates intra-directional modes of 65 prediction directions.

Referring to FIG. 4, intra-prediction modes having horizontal directionality and intra-prediction modes having vertical directionality may be classified based on an intra-prediction mode #34 having an upper left diagonal prediction direction. H and V in FIG. 3 represent the horizontal directionality and the vertical directionality, respectively, and the numbers from −32 to 32 represent displacements of 1/32 unit on sample grid positions. Intra-prediction modes #2 to #33 have the horizontal directionality and intra-prediction modes #34 to #66 have the vertical directionality. Intra-prediction mode #18 and intra-prediction mode #50 represent a horizontal intra-prediction mode and a vertical intra-prediction mode, respectively. Intra-prediction mode #2 may be called a lower left diagonal intra-prediction mode, intra-prediction mode #34 may be called an upper left diagonal intra-prediction mode and intra-prediction mode #66 may be called an upper right diagonal intra-prediction mode.

Figure 5:
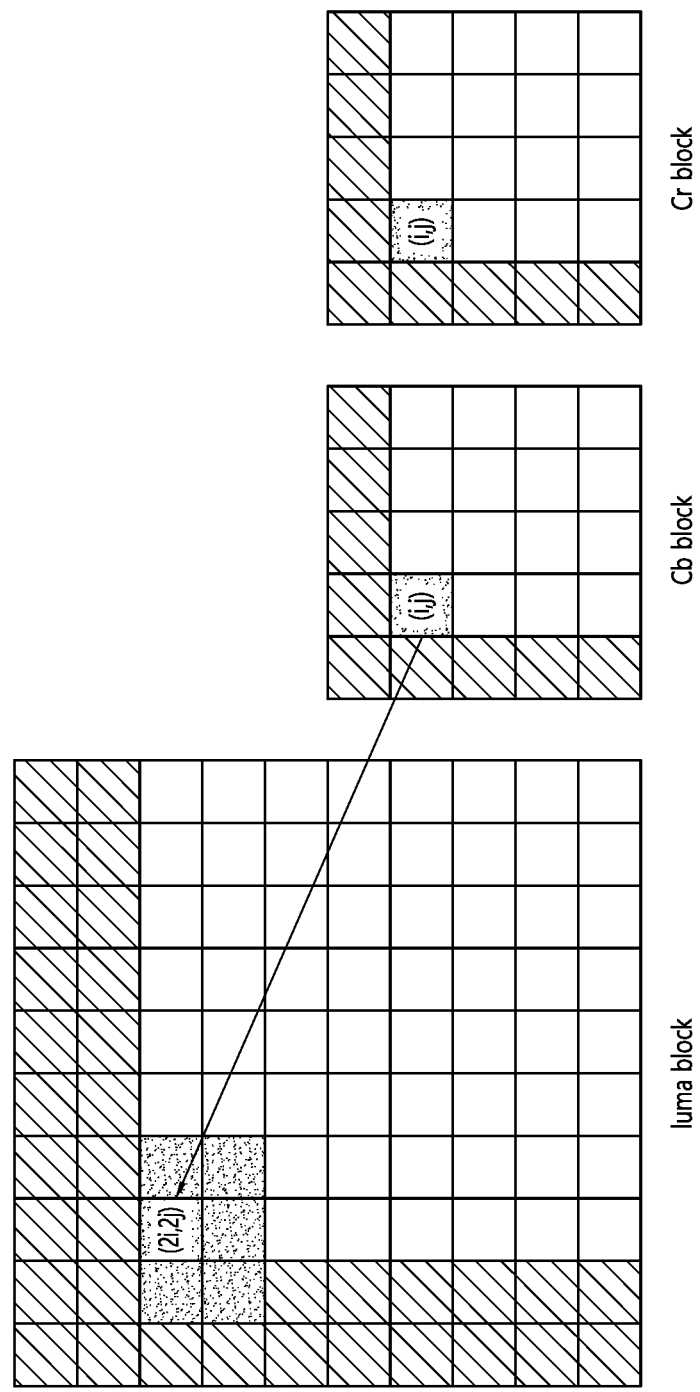
FIG. 5 is a diagram explaining a process of deriving an intra prediction mode for a current chroma block according to an embodiment.

FIG. 5 is a diagram for describing a process of deriving an intra-prediction mode of a current chroma block according to an embodiment.

In the present disclosure, "chroma block", "chroma image", and the like may represent the same meaning of chrominance block, chrominance image, and the like, and accordingly, chroma and chrominance may be commonly used. Likewise, "luma block", "luma image", and the like may represent the same meaning of luminance block, luminance image, and the like, and accordingly, luma and luminance may be commonly used.

In the present disclosure, a "current chroma block" may mean a chroma component block of a current block, which is a current coding unit, and a "current luma block" may mean a luma component block of a current block, which is a current coding unit. Accordingly, the current luma block and the current chroma block correspond with each other. However, block formats and block numbers of the current luma block and the current chroma block are not always the same but may be different depending on a case. In some cases, the current chroma block may correspond to the current luma region, and in this case, the current luma region may include at least one luma block.

In the present disclosure, "reference sample template" may mean a set of reference samples neighboring a current chroma block for predicting the current chroma block. The reference sample template may be predefined, or information for the reference sample template may be signaled to the decoding apparatus 300 from the encoding apparatus 200.

Referring to FIG. 5, a set of samples one shaded line neighboring 4×4 block, which is a current chroma block, represents a reference sample template. It is shown in FIG. 5 that the reference sample template includes a reference sample of one line, but the reference sample region in a luma region corresponding to the reference sample template includes two lines.

In an embodiment, when an intra encoding of a chroma image is performed in Joint Exploration TEST Model (JEM) used in Joint Video Exploration Team (JVET), Cross Component Linear Model (CCLM) may be used. CCLM is a method of predicting a pixel value of a chroma image based on a pixel value of a reconstructed luma image, which is based on the property of high correlation between a chroma image and a luma image.

CCLM prediction of Cb and Cr chroma images may be based on the equation below.

$$\text{Pred}_C(i,j) = \alpha \cdot \text{Rec}'_L(i,j) + \beta \quad \text{[Equation 1]}$$

Here, $\text{pred}_c(i,j)$ means a Cb or Cr chroma image to be predicted, $\text{Rec}_L'(i,j)$ means a reconstructed luma image of which the size is adjusted to a chroma block size, and (i,j) means pixel coordinates. In the 4:2:0 color format, since the size of the luma image is double the size of the chroma image, $Rec_L'$ of a chroma block size should be generated through downsampling, and thus pixels of the luma image to be used for the chroma image $pred_c$ (i,j) may be used in consideration of all neighboring pixels in addition to $Rec_L$ (2i,2j). The $Rec_L'$(i,j) may be represented as downsampled luma samples.

For example, the $Rec_L'$(i,j) may be derived using 6 neighboring pixels as in the following equation.

$$Rec'_L(x,y)=(2\times Rec_L(2x,2y)+2\times Rec_L(2x,2y+1)+Rec_L(2x-1,2y)+Rec_L(2x+1,2y)+Rec_L(2x-1,2y+1)+Rec_L(2x+1,2y+1)+4)>>3 \quad \text{[Equation 2]}$$

Further, α and β represent a cross-correlation and an average value difference between a Cb or Cr chroma block neighboring template and a luma block neighboring template as shown as shaded regions of FIG. 5, and may be, for example, as in Equation 3 below.

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)} \quad \text{[Equation 3]}$$

$$\beta = \frac{\sum C(n) - \alpha \cdot \sum L(n)}{N}$$

Here, L(n) means neighboring reference samples and/or left neighboring samples of a luma block corresponding to a current chroma image, C(n) means neighboring reference samples and/or left neighboring samples of a current chroma block to which encoding is currently applied, and (i,j) means a pixel location. Further, L(n) may represent downsampled top neighboring samples and/or left neighboring samples of the current luma block. Further, N may represent the number of total pixel pair (luma and chroma) values used to calculate a CCLM parameter, and may represent a value that is twice as large as a smaller value between a width and a height of the current chroma block.

Meanwhile, samples for parameter calculation (e.g., α and β) for the above-described CCLM prediction may be selected as follows.

In the case that the current chroma block is a chroma block of N×N size, total 2N (N horizontal and N vertical) neighboring reference sample pairs (luma and chroma) of the current chroma block may be selected.

Figure 6:
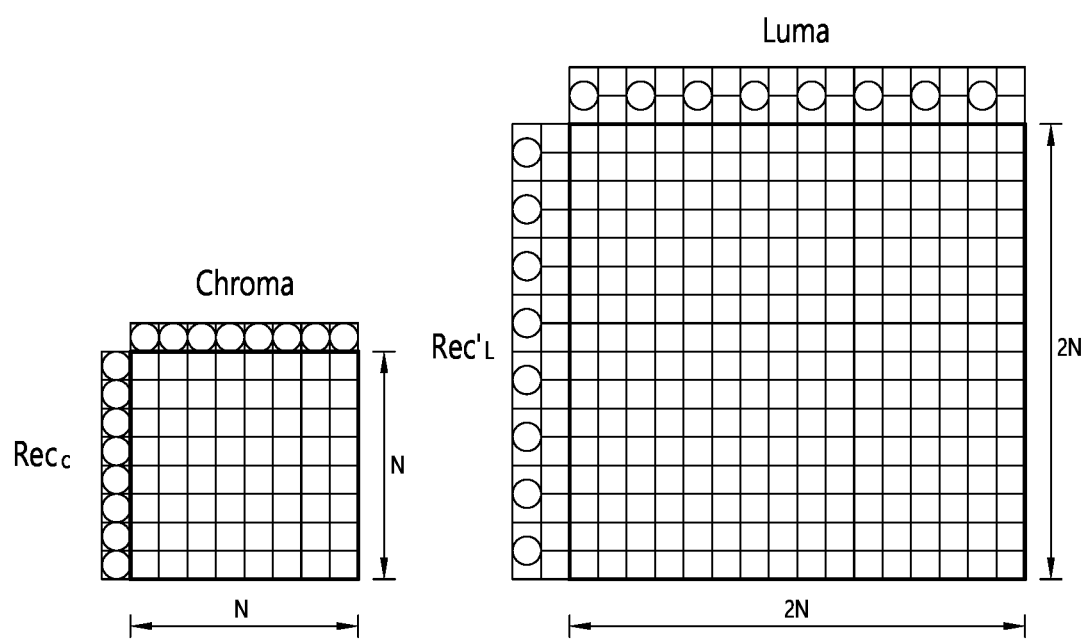
FIG. 6 illustrates 2N reference samples for parameter calculation for CCLM prediction.

In the case that the current chroma block is a chroma block of N×M size or M×N size (here, N<=M), total 2N (N horizontal and N vertical) neighboring reference sample pairs of the current chroma block may be selected. Meanwhile, since M is larger than N (e.g., M=2N or 3N, and the like), N sample pairs may be selected through subsampling among M samples. FIG. 6 illustrates 2N reference samples for parameter calculation for CCLM prediction described above. Referring to FIG. 6, 2N reference sample pairs are shown, which is derived for parameter calculation for the CCLM prediction. The 2N reference sample pairs may include 2N reference samples adjacent to the current chroma block and 2N reference samples adjacent to the current luma block.

As described above, 2N sample pairs may be derived, and in the case that CCLM parameters α and β are calculated using Equation 3 using the sample pair described above, the operation of numbers as represented in Table 1 below may be required.

TABLE 1

| operations | Number of operations |
| --- | --- |
| Multiplications | 2N + 5 |
| Sums | 8N − 1 |
| Division | 2 |

Referring to Table 1 above, for example, in the case of a chroma block of 4×4 size, 13 multiplication operations and 31 addition operations may be required for calculating CCLM parameter, and in the case of a chroma block of 32×32 size, 133 multiplication operations and 255 addition operations may be required for calculating CCLM parameter. That is, as the size of the chroma block increases, an amount of operation required for calculating CCLM parameter increases rapidly, which may be directly connected to a delay problem in hardware implementation. Particularly, since the CCLM parameter should be derived through calculation even in the decoding apparatus, the amount of operation may be connected to a delay problem in hardware implementation of the decoding apparatus and increase of implementation cost.

Meanwhile, in the case of calculating CCLM parameters α and β, in order to reduce operations such as multiplication and addition, the CCLM parameters may be calculated using a slope of change of two luma and chroma sample pairs. For example, the CCLM parameters may be calculated as in Equation 4 as follows.

$$\alpha = \frac{y_B - y_A}{x_B - x_A} \quad \text{[Equation 4]}$$

$$\beta = y_A - \alpha x_A$$

Here, $(x_A, y_A)$ may represent sample values of a luma sample $x_A$ having the smallest luma value and a chroma sample $y_A$ that is the pair of the luma sample among neighboring reference samples of the current block for CCLM parameter calculation, and $(x_B, y_B)$ may represent sample values of a luma sample $x_B$ having the largest luma value and a chroma sample $y_B$ that is the pair of the luma sample among the neighboring reference samples of the current block for the CCLM parameter calculation. In other words, $x_A$ may represent the luma sample having the smallest luma value among the neighboring reference samples of the current block, $y_A$ may represent the chroma sample that is the pair to the luma sample $x_A$, $x_B$ may represent the luma sample having the largest luma value among the neighboring reference samples of the current block, and $y_B$ may represent the chroma sample that is the pair to the luma sample $y_B$.

Figure 36:
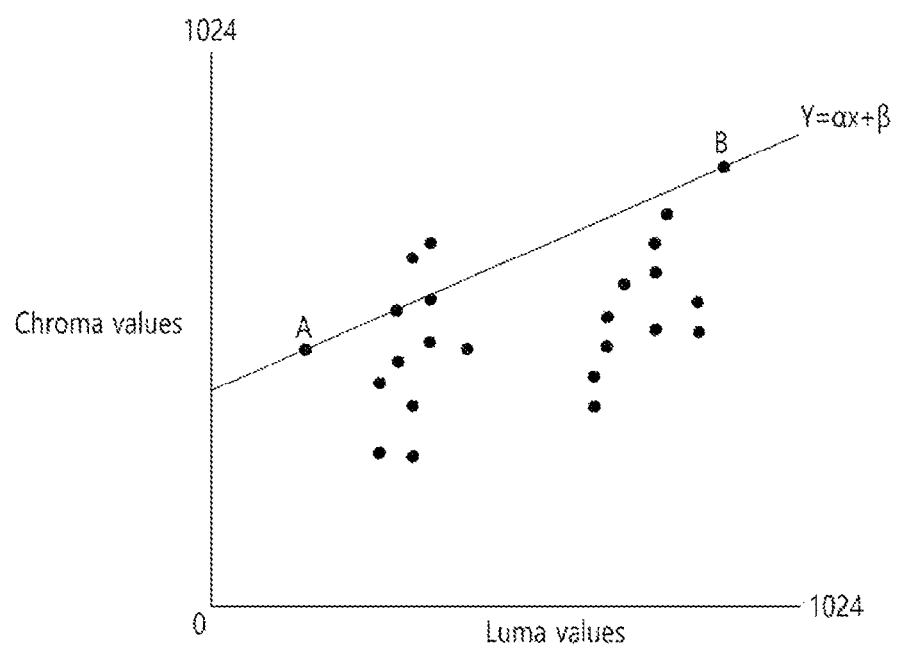
FIG. 36 shows Table 2.

FIG. 36 exemplifies a CCLM parameter being derived in a simplified calculation method.

If the CCLM parameter is calculated using the above-described equations, it is advantageous to greatly reduce multiplication and addition operations as compared with the existing method, but comparison operations are added since the minimum value and the maximum value should be determined among the neighboring luma samples of the current block. That is, in order to determine the minimum and maximum sample values from the 2N neighboring samples, 4N comparison operations are required, and addition of the comparison operations may cause a delay in hardware implementation.

Figure 7:
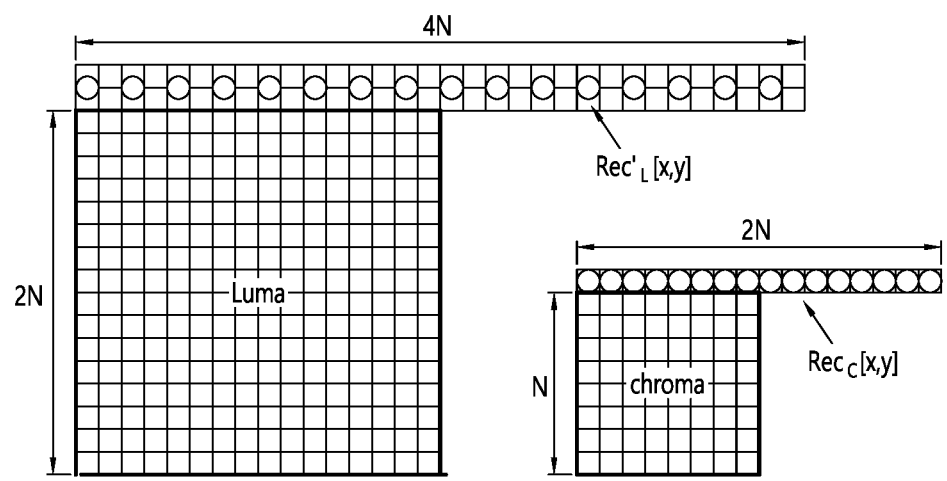
FIG. 7 exemplarily illustrates a linear model_above (LM_A) mode according to an embodiment.
Figure 8:
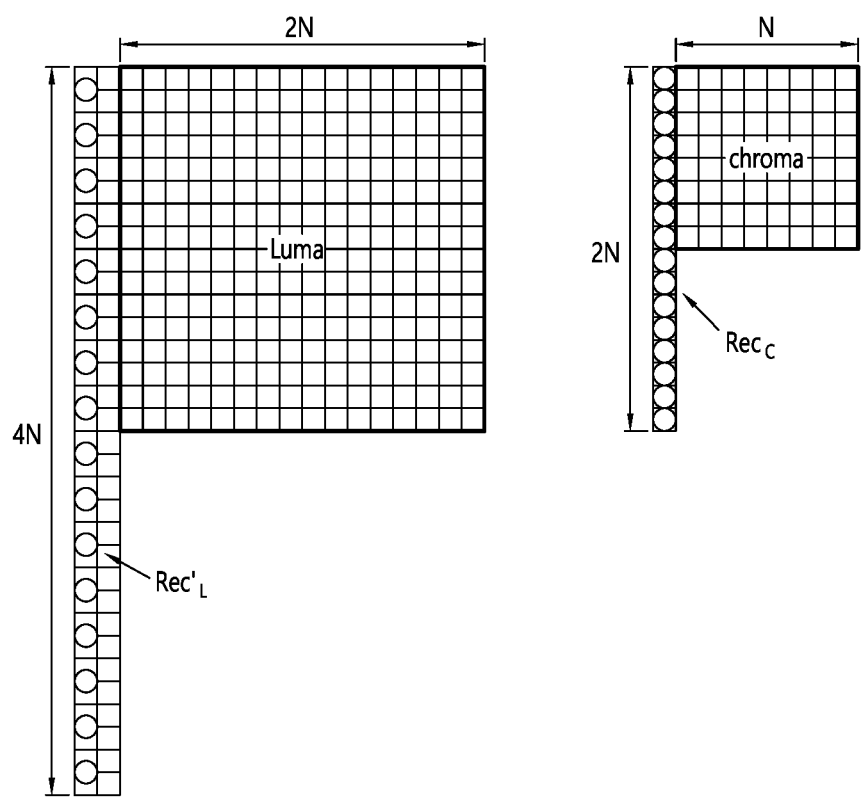
FIG. 8 exemplarily illustrates a linear model_left (LM_L) mode according to an embodiment.

In performing CCLM prediction, a multi-directional LM (MDLM) may be performed, and as shown in FIGS. 7 and 8, the CCLM prediction may be performed through addition of LM_A and LM_L modes.

That is, in the LM_A mode of FIG. 7, the CCLM is performed using only the top reference sample of the current block, and in this case, the CCLM prediction is performed by extending twice as long as the existing top reference sample to the right. The LM_A mode may be called an LM_T mode.

As shown in FIG. 8, in the LM_L mode, the CCLM is performed using only the left reference sample of the current block, and in this case, the CCLM prediction may be performed by extending twice as long as the existing left reference sample downward.

In the case of applying the MDLM, the parameters α and β are also calculated using the change slope of the above-described two luma and chroma pixel pairs, and many comparison operations are required even for the MDLM calculation. Since such addition of comparison operations still causes a delay in hardware implementation, there is a need for a scheme for reducing the addition of the operations.

Hereinafter, embodiments will be described, which can reduce the operation complexity for the CCLM parameter derivation, and through this, can reduce hardware costs of a decoding apparatus and complexity and time of a decoding process.

As an example, in order to solve the problem of increase of CCLM parameter operation amount as the chroma block size increase described above, an embodiment may be proposed for calculating a CCLM parameter by selecting a chroma block neighboring pixel, after configuring a neighboring sample selection upper limit $N_{th}$ as described below. The $N_{th}$ may also be represented as a maximum neighboring sample number. For example, $N_{th}$ may be set as 2, 4, 8 or 16.

The CCLM parameter calculation procedure according to the present embodiment may be as below.

In the case that a current chroma block is a chroma block of N×N size and $N_{th} \geq N$, total 2N (N horizontal and N vertical) neighboring reference sample pairs of the current chroma block may be selected.

In the case that a current chroma block is a chroma block of N×N size and $N_{th} < N$, total $2*N_{th}$ ($2*N_{th}$ horizontal and $2*N_{th}$ vertical) neighboring reference sample pairs of the current chroma block may be selected.

In the case that a current chroma block is a chroma block of N×M size or M×N size (herein, N<=M) and $N_{th} \geq N$, total 2N (N horizontal and N vertical) neighboring reference sample pairs of the current chroma block may be selected. Since M is greater than N (e.g., M=2N or 3N, etc.), among M samples, N sample pairs may be selected through subsampling.

In the case that a current chroma block is a chroma block of N×M size or M×N size (herein, N<=M) and $N_{th} < N$, total $2*N_{th}$ ($2*N_{th}$ horizontal and $2*N_{th}$ vertical) neighboring reference sample pairs of the current chroma block may be selected. Since M is greater than N (e.g., M=2N or 3N, etc.), among M samples, $N_{th}$ sample pairs may be selected through subsampling.

As described above, according to the present embodiment, a neighboring reference sample number for CCLM parameter calculation may be limited by setting $N_{th}$, which is a maximum number of selected neighboring sample numbers, and through this, a CCLM parameter may be calculated through relatively less calculations even in a chroma block of big size.

In addition, in the case of setting $N_{th}$ as relatively small number (e.g., 4 or 8), in hardware implementation of CCLM parameter calculation, a worst case operation (e.g., chroma block of 32×32 size) may be avoided, and therefore, a required hardware gate numbers may be reduced in comparison with the worst case, and through this, there is also an effect of reducing hardware implementation cost.

For example, in the case that $N_{th}$ is 2, 4 and 8, an amount of the CCLM parameter calculation for a chroma block size may be represented as the following table.

TABLE 3

| | Number of operations (multiplication + sums) | | | |
|---|---|---|---|---|
| Block size | Original CCLM | Proposed method ($N_{th}$ = 2) | Proposed method ($N_{th}$ = 4) | Proposed method ($N_{th}$ = 8) |
| N = 2 | 24 | 24 | 24 | 24 |
| N = 4 | 44 | 24 | 44 | 44 |
| N = 8 | 84 | 24 | 44 | 84 |
| N = 16 | 164 | 24 | 44 | 84 |
| N = 32 | 324 | 24 | 44 | 84 |

Meanwhile, the $N_{th}$ may be derived by an encoding apparatus and a decoding apparatus as a predetermined value without the necessity of transmitting additional information representing the $N_{th}$. Further, the additional information representing the $N_{th}$ may be transmitted in a unit of coding unit (CU), slice, picture, or sequence, and the $N_{th}$ may be derived based on the additional information representing the $N_{th}$. The additional information representing the $N_{th}$ may represent the $N_{th}$ value.

For example, in the case that the additional information representing Nth is transmitted in a CU unit, when an intra-prediction mode of a current chroma block is the CCLM mode, as described below, a method may be proposed to parse syntax element cclm_reduced_sample_flag and perform a CCLM parameter calculation procedure. The cclm_reduced_sample_flag may represent a syntax element of CCLM reduced sample flag.

In the case that the cclm_reduced_sample_flag is 0 (false), a CCLM parameter calculation is performed through the existing CCLM neighboring sample selection method.

In the case that the cclm_reduced_sample_flag is 1 (true), Nth is set to 2, and a CCLM parameter calculation is performed through the neighboring sample selection method proposed in the present embodiment described above.

Further, in the case that the additional information representing the $N_{th}$ is transmitted in a unit of slice, picture, or sequence, the $N_{th}$ value may be decoded based on the additional information that is transmitted through a high level syntax (HLS) to be described later. In this case, the information on the $N_{th}$ value may be encoded by the encoding apparatus, and may be included in a bitstream to be transmitted. In this document, a slice/slice header may be replaced by a tile (group)/tile (group) header.

For example, the additional information signaled through a slice header may be represented as the following table.

TABLE 4

| slice_header( ) { | Descriptor |
|---|---|
| ... | |
| cclm_reduced_sample_num | f(2) |
| ... | | cclm_reduced_sample_num may represent a syntax element of the additional information representing Nth.

Alternatively, for example, the additional information signaled through a Picture Parameter Set (PPS) may be represented as the following table.

TABLE 5

| pic_parameter_set_rbsp( ) { | Descriptor |
|---|---|
| ... | |
| cclm_reduced_sample_num | f(2) |
| ... | |

Alternatively, for example, the additional information signaled through a Sequence Parameter Set (SPS) may be represented as the following table.

TABLE 6

| seq_parameter_set_rbsp( ) { | Descriptor |
|---|---|
| ... | |
| cclm_reduced_sample_num | f(2) |
| ... | |

Nth value, which is derived based on the cclm_reduced_sample_num value (i.e., a value derived by decoding cclm_reduced_sample_num) transmitted through the slice header, the PPS or the SPS, may be derived as represented in the following table.

TABLE 7

| cclm_reduced_sample_num | $N_{th}$ |
|---|---|
| 0 | 2 |
| 1 | 4 |
| 2 | 8 |
| 3 | 16 |

For example, referring to Table 7 above, Nth may be derived based on the cclm_reduced_sample_num. In the case that the cclm_reduced_sample_num value is 0, Nth may be derived as 2, in the case that the cclm_reduced_sample_num value is 1, Nth may be derived as 4, in the case that the cclm_reduced_sample_num value is 2, Nth may be derived as 8, and in the case that the cclm_reduced_sample_num value is 3, Nth may be derived as 16.

Meanwhile, in the case that the additional information representing Nth is transmitted in a unit of CU, slice, picture or sequence, the encoding apparatus may determine the Nth value as below and transmit the additional information representing Nth that represent the Nth value.

In the case that the additional information representing Nth is transmitted in a unit of CU, when an intra-prediction mode of the current chroma block is CCLM mode, the encoding apparatus may determine a side of good encoding efficiency between two following cases through RDO and transmit information of the determined method to the decoding apparatus.

1) In the case that encoding efficiency is good when a CCLM parameter calculation is performed through the existing CCLM reference sample selection method, cclm_reduced_sample_flag of value 0 (false) is transmitted.

2) In the case that encoding efficiency is good when Nth is set to 2 and a CCLM parameter calculation is performed through the CCLM reference sample selection method proposed in the present embodiment, cclm_reduced_sample_flag of value 1 (true) is transmitted.

Alternatively, in the case that the additional information representing Nth is transmitted in a unit of slice, picture or sequence, the encoding apparatus may add a high level syntax (HLS) as represented in Table 4, Table 5 or Table 6 described above and transmit the additional information representing Nth. The encoding apparatus may configure the Nth value by considering a size of input image or in accordance with an encoding target bitrate.

1) For example, in the case that an input image is HD quality or more, the encoding apparatus may set as Nth=8, and in the case that an input image is HD quality or less, the encoding apparatus may set as Nth=4.

2) In the case that image encoding of high quality is required, the encoding apparatus may set as Nth=8, and in the case that image encoding of normal quality is required, the encoding apparatus may set as Nth=2.

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 9:
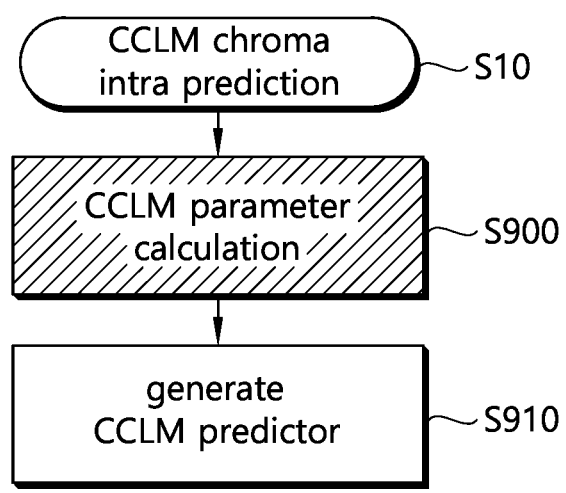
FIG. 9 is a diagram explaining a process of performing CCLM prediction for a current chroma block according to an embodiment.
Figure 10:
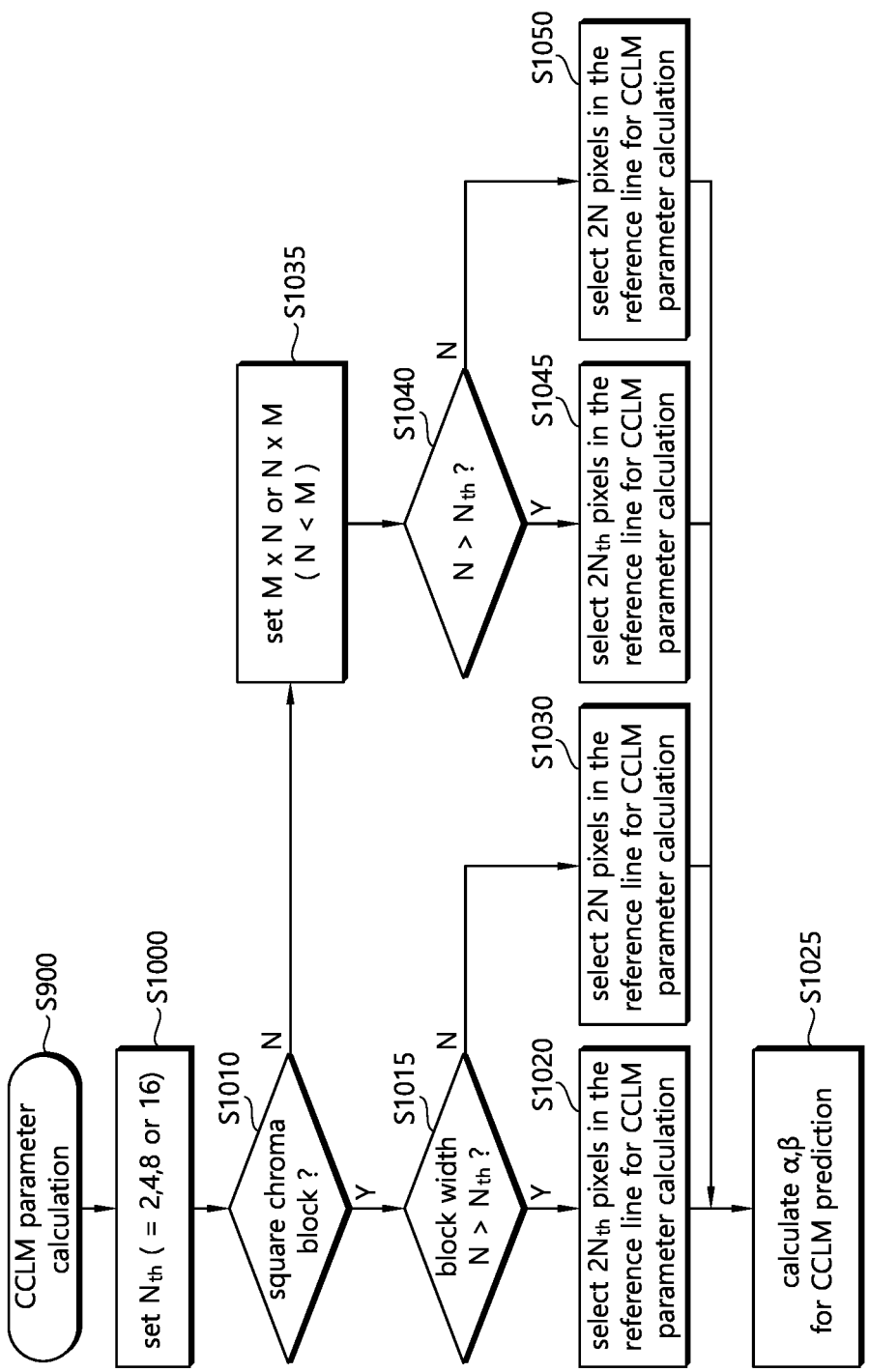
FIG. 10 is a diagram explaining a specific embodiment to calculate a CCLM parameter of FIG. 9.

FIGS. 9 and 10 are diagrams for describing a procedure of performing CCLM prediction for a current chroma block according to an embodiment.

Referring to FIG. 9, the encoding apparatus/decoding apparatus may calculate a CCLM parameter for the current block (step, S900). For example, the CCLM parameter may be calculated as the present embodiment shown in FIG. 8b.

FIG. 10 may illustrate a specific embodiment of calculating the CCLM parameter. For example, referring to FIG. 10, the encoding apparatus/decoding apparatus may set Nth for the current chroma block (step, S1000). The Nth may be a predetermined value or derived based on the additional information for Nth. The Nth may be set to 2, 4, 8 or 16.

Later, the encoding apparatus/decoding apparatus may determine whether the current chroma block is a square chroma block (step, S1010).

In the case that the current chroma block is a square chroma block, the encoding apparatus/decoding apparatus may determine whether N, a width of the current block, is greater than the Nth (step, S1015).

In the case that N is greater than the Nth, the encoding apparatus/decoding apparatus may select 2Nth neighboring samples in a reference line adjacent to the current block as a reference sample for the CCLM parameter calculation (step, S1020).

The encoding apparatus/decoding apparatus may derive parameters α and β for the CCLM prediction based on the selected reference samples (step, S1025).

In addition, in the case that N is not greater than the Nth, the encoding apparatus/decoding apparatus may select 2N neighboring samples in a reference line adjacent to the current block as a reference sample for the CCLM parameter calculation (step, S1030). Later, the encoding apparatus/decoding apparatus may derive the parameters α and β for the CCLM prediction based on the selected reference samples (step, S1025).

Meanwhile, in the case that the current chroma block is not a square chroma block, a size of the current chroma block may be derived in M×N size or N×M size (step, S1035). Here, M may represent a value greater than N (N<M).

Later, the encoding apparatus/decoding apparatus determine whether the N is greater than the Nth (step, S1040).

In the case that N is greater than the Nth, the encoding apparatus/decoding apparatus may select 2Nth neighboring samples in a reference line adjacent to the current block as a reference sample for the CCLM parameter calculation (step, S1045).

The encoding apparatus/decoding apparatus may derive parameters α and β for the CCLM prediction based on the selected reference samples (step, S1025).

In addition, in the case that N is not greater than the Nth, the encoding apparatus/decoding apparatus may select 2N neighboring samples in a reference line adjacent to the current block as a reference sample for the CCLM parameter calculation (step, S1050). Later, the encoding apparatus/decoding apparatus may derive the parameters α and β for the CCLM prediction based on the selected reference samples (step, S1025).

Referring to FIG. 9 again, in the case that the parameters for CCLM prediction for the current chroma block is calculated, the encoding apparatus/decoding apparatus may perform the CCLM prediction based on the parameters and generate a prediction sample for the current chroma block (step, S910). For example, the encoding apparatus/decoding apparatus may generate a prediction sample for the current chroma block based on the calculated parameters and Equation 1 described above in which reconstructed samples of the current luma block for the current chroma block.

Meanwhile, in the present disclosure, in deriving the CCLM parameter, an embodiment which is different from the present embodiment of reducing operation complexity for deriving the CCLM parameter may be proposed.

As an example, in order to solve the problem of increase of the CCLM parameter operation amount as the chroma block size increase described above, an embodiment may be proposed for calculating the CCLM parameter by configuring a neighboring sample selection upper limit Nth to a block size of the current chroma block adaptively and selecting a neighboring pixel of the current chroma block based on the configured Nth. The Nth may also be represented as a maximum neighboring sample number.

For example, the Nth may be configured to a block size of the current chroma block adaptively as below.

In the case that N<=TH in the current chroma block of N×M size (here, e.g., N<=M), the $N_{th}$ is set to $N_{th}$=2.

In the case that N>TH in the current chroma block of N×M size (here, e.g., N<=M), the $N_{th}$ is set to Nth=4.

In this case, for example, depending on a threshold value TH, a reference sample used for calculating the CCLM parameter may be selected as below.

For example, in the case that the TH is 4 (TH=4), and in the case that the N of the current chroma block is 2 or 4, two sample pairs for a block side is used, and the CCLM parameter may be calculated, and in the case that the N is 8, 16 or 32, four sample pairs for a block side is used, and the CCLM parameter may be calculated.

In addition, for example, in the case that the TH is 8 (TH=8), two sample pairs for a block side is used, and the CCLM parameter may be calculated, and in the case that the N is 16 or 32, four sample pairs for a block side is used, and the CCLM parameter may be calculated.

As described above, according to the present embodiment, the Nth is configured to a block size of the current chroma block adaptively, and a sample number which is optimized for a block size may be selected.

For example, an amount of operation for the CCLM parameter calculation according to the existing CCLM reference sample selection method and the present embodiment may be represented as the following table.

TABLE 8

| Block size | Number of operations ( multiplication + sums ) | | |
|---|---|---|---|
| | Original CCLM | Proposed method (TH = 4) | Proposed method (TH = 8) |
| N = 2 | 24 | 24 | 24 |
| N = 4 | 44 | 24 | 24 |
| N = 8 | 84 | 44 | 24 |
| N = 16 | 164 | 44 | 44 |
| N = 32 | 324 | 44 | 44 |

Here, the N may represent the smallest value of a width and a height of the current block. Referring to Table 8 above, in the case that the CCLM reference sample selection method proposed in the present embodiment is used, an amount of operation required for the CCLM parameter calculation is not increased even in the case that a block size is increased.

Meanwhile, the TH may be derived as a predetermined value in the encoding apparatus and the decoding apparatus without need to transmit additional information representing the TH. Alternatively, additional information representing the TH may be transmitted in a unit of Coding Unit (CU), slice, picture or sequence, and the TH may be derived based on the additional information representing the TH. The additional information representing the TH may represent a value of the TH.

For example, in the case that the additional information representing TH is transmitted in a CU unit, when an intra-prediction mode of a current chroma block is the CCLM mode, as described below, a method may be proposed to parse syntax element cclm_reduced_sample_flag and perform a CCLM parameter calculation procedure. The cclm_reduced_sample_flag may represent a syntax element of CCLM reduced sample flag.

In the case that the cclm_reduced_sample_flag is 0 (false), it is configured the Nth=4 for all blocks, and a CCLM parameter calculation is performed through the neighboring sample selection method of the present embodiment proposed in FIG. 9, FIG. 10 described above.

In the case that the cclm_reduced_sample_flag is 1 (true), it is configured the TH=4, and a CCLM parameter calculation is performed through the neighboring sample selection method proposed in the present embodiment described above.

Alternatively, in the case that the additional information representing TH is transmitted in a unit of slice, picture or sequence, as described below, TH value may be decoded based on the additional information transmitted through a high level syntax (HLS).

For example, the additional information signaled through a slice header may be represented as the following table.

TABLE 9

| | Descriptor |
|---|---|
| slice_header( ) { | |
| ... | |
| cclm_reduced_sample_threshold | u(1) |
| ... | | cclm_reduced_sample_threshold may represent a syntax element of the additional information representing TH.

Alternatively, for example, the additional information signaled through a Picture Parameter Set (PPS) may be represented as the following table.

TABLE 10

| | Descriptor |
|---|---|
| pic_parameter_set_rbsp( ) { | |
| ... | |
| cclm_reduced_sample_threshold | u(1) |
| ... | |

Alternatively, for example, the additional information signaled through a Sequence Parameter Set (SPS) may be represented as the following table.

TABLE 11

| | Descriptor |
|---|---|
| sps_parameter_set_rbsp( ) { | |
| ... | |
| cclm_reduced_sample_threshold | u(1) |
| ... | |

TH value, which is derived based on the cclm_reduced_sample_threshold value (i.e., a value derived by decoding cclm_reduced_sample_threshold) transmitted through the slice header, the PPS or the SPS, may be derived as represented in the following table.

TABLE 12

| cclm_reduced_sample_threshold | TH |
|---|---|
| 0 | 4 |
| 1 | 8 |

For example, referring to Table 12 above, the TH may be derived based on the cclm_reduced_sample_threshold. In the case that the cclm_reduced_sample_threshold value is 0, the TH may be derived as 4, and in the case that the cclm_reduced_sample_threshold value is 1, the TH may be derived as 8.

Meanwhile, in the case that the TH is derived as a predetermined value in the encoding apparatus and the decoding apparatus without transmitting separate additional information, the encoding apparatus may perform the CCLM parameter calculation for the CCLM prediction as the present embodiment described above based on the predetermined TH value.

Alternatively, the encoding apparatus may determine whether to use the threshold value TH and may transmit information representing whether to use the TH and the additional information representing the TH value to the decoding apparatus as below.

In the case that the information representing whether to use the TH is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.
1) In the case that encoding efficiency is good when the Nth is set to 4 for all blocks and a CCLM parameter calculation is performed through the reference sample selection method of the present embodiment proposed in FIG. 9, FIG. 10 described above, cclm_reduced_sample_flag of value 0 (false) is transmitted.

2) In the case that encoding efficiency is good when the TH is set to 4 and a CCLM parameter calculation is performed through the reference sample selection method of the present embodiment proposed, cclm_reduced_sample_flag of value 1 (true) is transmitted.

Alternatively, in the case that the information representing whether to use the TH is transmitted in a unit of slice, picture or sequence, the encoding apparatus may add a high level syntax (HLS) as represented in Table 9, Table 10 or Table 11 described above and transmit the information representing whether to use the TH. The encoding apparatus may configure the use of the TH by considering a size of input image or in accordance with an encoding target bitrate.

1) For example, in the case that an input image is HD quality or more, the encoding apparatus may set as TH=8, and in the case that an input image is HD quality or less, the encoding apparatus may set as TH=4.

2) In the case that image encoding of high quality is required, the encoding apparatus may set as TH=8, and in the case that image encoding of normal quality is required, the encoding apparatus may set as TH=4.

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 11:
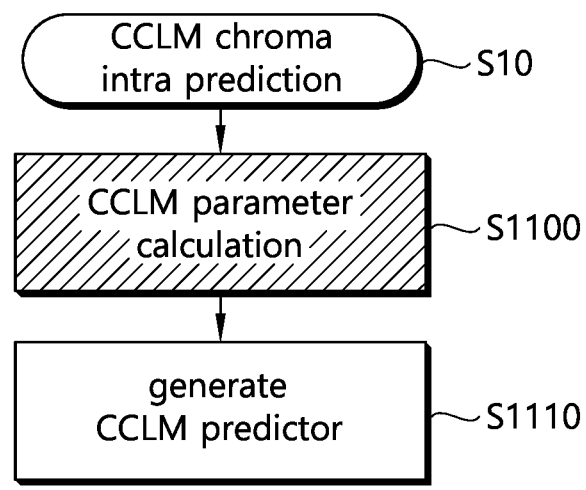
FIG. 11 is a diagram explaining a process of performing CCLM prediction for a current chroma block according to an embodiment.
Figure 12:
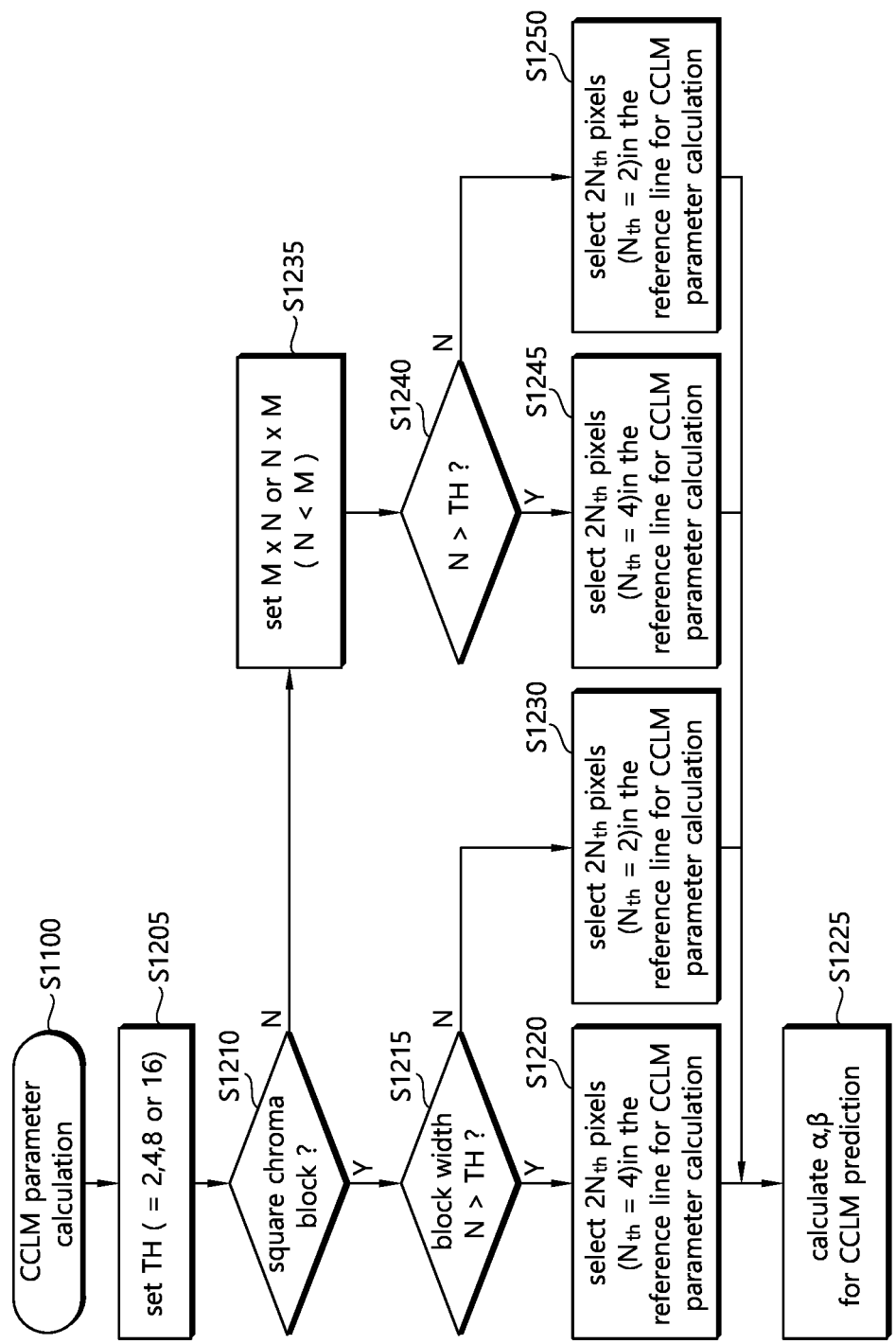
FIG. 12 is a diagram explaining a specific embodiment to calculate a CCLM parameter of FIG. 11.

FIGS. 11 and 12 are diagrams for describing a procedure of performing CCLM prediction for a current chroma block according to an embodiment.

Referring to FIG. 11, the encoding apparatus/decoding apparatus may calculate a CCLM parameter for the current block (step, S1100). For example, the CCLM parameter may be calculated as the present embodiment shown in FIG. 12.

FIG. 12 may illustrate a specific embodiment of calculating the CCLM parameter. For example, referring to FIG. 12, the encoding apparatus/decoding apparatus may set TH for the current chroma block (step, S1205). The TH may be a predetermined value or derived based on the additional information for TH. The TH may be set to 4 or 8.

Later, the encoding apparatus/decoding apparatus may determine whether the current chroma block is a square chroma block (step, S1210).

In the case that the current chroma block is a square chroma block, the encoding apparatus/decoding apparatus may determine whether N, a width of the current block, is greater than the TH (step, S1215).

In the case that N is greater than the TH, the encoding apparatus/decoding apparatus may select 2Nth neighboring samples in a reference line adjacent to the current block as a reference sample for the CCLM parameter calculation (step, S1220). Here, the Nth may be 4. That is, in the case that N is greater than the TH, the Nth may be 4.

The encoding apparatus/decoding apparatus may derive parameters α and β for the CCLM prediction based on the selected reference samples (step, S1225).

In addition, in the case that N is not greater than the TH, the encoding apparatus/decoding apparatus may select 2Nth neighboring samples in a reference line adjacent to the current block as a reference sample for the CCLM parameter calculation (step, S1230). That is, in the case that N is not greater than the TH, the Nth may be 2. Later, the encoding apparatus/decoding apparatus may derive the parameters α and β for the CCLM prediction based on the selected reference samples (step, S1225).

Meanwhile, in the case that the current chroma block is not a square chroma block, a size of the current chroma block may be derived in M×N size or N×M size (step, S1235). Here, M may represent a value greater than N (N<M).

Later, the encoding apparatus/decoding apparatus determine whether the N is greater than the TH (step, S1240).

In the case that N is greater than the TH, the encoding apparatus/decoding apparatus may select 2Nth neighboring samples in a reference line adjacent to the current block as a reference sample for the CCLM parameter calculation (step, S1245). Here, the Nth may be 4. That is, in the case that N is greater than the TH, the Nth may be 4.

The encoding apparatus/decoding apparatus may derive parameters α and β for the CCLM prediction based on the selected reference samples (step, S1225).

In addition, in the case that N is not greater than the TH, the encoding apparatus/decoding apparatus may select 2Nth neighboring samples in a reference line adjacent to the current block as a reference sample for the CCLM parameter calculation (step, S1250). Here, the Nth may be 2. That is, in the case that N is greater than the TH, the Nth may be 2. Later, the encoding apparatus/decoding apparatus may derive the parameters α and β for the CCLM prediction based on the selected reference samples (step, S1225).

Referring to FIG. 11 again, in the case that the parameters for CCLM prediction for the current chroma block is calculated, the encoding apparatus/decoding apparatus may perform the CCLM prediction based on the parameters and generate a prediction sample for the current chroma block (step, S1110). For example, the encoding apparatus/decoding apparatus may generate a prediction sample for the current chroma block based on the calculated parameters and Equation 1 described above in which reconstructed samples of the current luma block for the current chroma block.

Meanwhile, in the present disclosure, in deriving the CCLM parameter, an embodiment which is different from the present embodiment of reducing operation complexity for deriving the CCLM parameter may be proposed.

Particularly, in order to solve the problem of increase of CCLM parameter operation amount as the chroma block size increase described above, the present embodiment proposes a method of configuring a pixel selection upper limit Nth adaptively. In addition, in the case that N=2 (here, N is a smaller value between a width and a height of a chroma block), in order to prevent the worst case operation (a case CCLM prediction is performed for all chroma blocks, after all chroma blocks in a CTU is divided into 2×2 size) occurred in CCLM prediction for a chroma block of 2×2 size, the present embodiment proposes a method of configuring Nth adaptively, and through this, an amount of operation for CCLM parameter calculation in the worst cast may be reduced by about 40%.

For example, according to the present embodiment, the Nth may be configured to a block size adaptively as below.

Method 1 in the present embodiment (proposed method 1)

In the case that N<=2 in the current chroma block of N×M size or M×N size (here, e.g., N<=M), Nth may be set to 1 (Nth=1).

In the case that N=4 in the current chroma block of N×M size or M×N size (here, e.g., N<=M), Nth may be set to 2 (Nth=2).

In the case that N>4 in the current chroma block of N×M size or M×N size (here, e.g., N<=M), Nth may be set to 4 (Nth=4).

Alternatively, for example, according to the present embodiment, the Nth may be configured to a block size adaptively as below.

Method 2 in the present embodiment (proposed method 2)

In the case that N<=2 in the current chroma block of N×M size or M×N size (here, e.g., N<=M), Nth may be set to 1 (Nth=1).

In the case that N=4 in the current chroma block of N×M size or M×N size (here, e.g., N<=M), Nth may be set to 2 (Nth=2).

In the case that N=8 in the current chroma block of N×M size or M×N size (here, e.g., N<=M), Nth may be set to 4 (Nth=4).

In the case that N>8 in the current chroma block of N×M size or M×N size (here, e.g., N<=M), Nth may be set to 8 (Nth=8).

Alternatively, for example, according to the present embodiment, the Nth may be configured to a block size adaptively as below.

Method 3 in the present embodiment (proposed method 3)

In the case that N<=2 in the current chroma block of N×M size or M×N size (here, e.g., N<=M), Nth may be set to 1 (Nth=1).

In the case that N>2 in the current chroma block of N×M size or M×N size (here, e.g., N<=M), Nth may be set to 2 (Nth=2).

Alternatively, for example, according to the present embodiment, the Nth may be configured to a block size adaptively as below.

Method 4 in the present embodiment (proposed method 4)

In the case that N<=2 in the current chroma block of N×M size or M×N size (here, e.g., N<=M), Nth may be set to 1 (Nth=1).

In the case that N>2 in the current chroma block of N×M size or M×N size (here, e.g., N<=M), Nth may be set to 4 (Nth=4).

Method 1 to method 4 described above in the present embodiment may reduce a complexity of the worst case by about 40%, and since Nth may be adaptively applied to each chroma block size, encoding loss may be minimized. In addition, for example, since method 2 may apply Nth up to 8 in variable manner, this may proper to high quality image encoding. Since method 3 and method 4 may reduce Nth to 4 or 2, CCLM complexity may be reduced significantly, and may proper to low image quality or middle image quality.

As described in method 1 to method 4, according to the present embodiment, Nth may be configured adaptively to a block size, and through this, a reference sample number for deriving an optimized CCLM parameter may be selected.

The encoding apparatus/decoding apparatus may set the upper limit Nth for neighboring sample selection, and then, calculate a CCLM parameter by selecting a chroma block neighboring sample as described above.

An amount of CCLM parameter calculation according to a chroma block size in the case to which the present embodiment described above is applied may be represented as the following table.

TABLE 13

| | | Number of operations ( multiplication + sums) | | | |
|---|---|---|---|---|---|
| Block size | Original CCLM | Proposed method 1 ($N_{th}$ = 1, 2, 4) | Proposed method 2 ($N_{th}$ = 1, 2, 4, 8) | Proposed method 3 ($N_{th}$ = 1, 2) | Proposed method 4 ($N_{th}$ = 1, 4) |
| N = 2 | 24 | 14 | 14 | 14 | 14 |
| N = 4 | 44 | 24 | 24 | 24 | 44 |
| N = 8 | 84 | 44 | 44 | 24 | 44 |
| N = 16 | 164 | 44 | 84 | 24 | 44 |
| N = 32 | 324 | 44 | 84 | 24 | 44 |

As represented in Table 13 above, in the case that the methods proposed in the present embodiment is used, it is identified that an amount of operation required for the CCLM parameter calculation is not increase even a block size is increased.

Meanwhile, according to the present embodiment, without need to transmit additional information, a promised value may be used in the encoding apparatus and the decoding apparatus, or it may be transmitted whether to use the proposed method and information representing the Nth value in a unit of CU, slice, picture and sequence.

For example, in the case that information representing whether to use the proposed method is used in a unit of CU, when an intra-prediction mode of a current chroma block is CCLM mode (i.e., in the case that CCLM prediction is applied to the current chroma block), cclm_reduced_sample_flag may be parsed and the present embodiment described above may be performed as below.

In the case that the cclm_reduced_sample_flag is 0 (false), it is configured Nth=4 for all blocks, and a CCLM parameter calculation is performed through the neighboring sample selection method of the present embodiment proposed in FIG. 9 and FIG. 10 described above.

In the case that the cclm_reduced_sample_flag is 1 (true), a CCLM parameter calculation is performed through method 3 of the present embodiment described above.

Alternatively, in the case that the information representing the applied method is transmitted in a unit of slice, picture or sequence, as described below, the method among method 1 to method 4 may be selected based on the information transmitted through a high level syntax (HLS), and based on the selected method, the CCLM parameter may be calculated.

For example, the information representing the applied method signaled through a slice header may be represented as the following table.

TABLE 14

| | Descriptor |
|---|---|
| slice_header( ) { | |
| ... | |
| cclm_reduced_sample_threshold | f(2) |
| ... | | cclm_reduced_sample_threshold may represent a syntax element of the information representing the applied method.

Alternatively, for example, the information representing the applied method signaled through a Picture Parameter Set (PPS) may be represented as the following table.

TABLE 15

| | Descriptor |
|---|---|
| pic_parameter_set_rbsp( ) { | |
| ... | |
| cclm_reduced_sample_threshold | f(2) |
| ... | |

Alternatively, for example, the information representing the applied method signaled through a Sequence Parameter Set (SPS) may be represented as the following table.

TABLE 16

| | Descriptor |
|---|---|
| sps_parameter_set_rbsp( ) { | |
| ... | |
| cclm_reduced_sample_threshold | f(2) |
| ... | |

The method selected based on cclm_reduced_sample_threshold value (i.e., a value derived by decoding cclm_reduced_sample_threshold) transmitted through the slice header, the PPS or the SPS may be derived as represented in the following table.

TABLE 17

| cclm_reduced_sample_threshold | Proposed method |
|---|---|
| 0 | 1 ($N_{th}$ = 1, 2, 4) |
| 1 | 2 ($N_{th}$ = 1, 2, 4, 8) |
| 2 | 3 ($N_{th}$ = 1, 2) |
| 3 | 4 ($N_{th}$ = 1, 4) |

Referring to Table. 17, in the case that the cclm_reduced_sample_threshold value is 0, method 1 may be selected as the method applied to the current chroma block, in the case that the cclm_reduced_sample_threshold value is 1, method 2 may be selected as the method applied to the current chroma block, in the case that the cclm_reduced_sample_threshold value is 2, method 3 may be selected as the method applied to the current chroma block, and in the case that the cclm_reduced_sample_threshold value is 3, method 4 may be selected as the method applied to the current chroma block.

The method proposed in the present embodiment may be used a CCLM mode which is an intra-prediction mode for a chroma component, and the chroma block predicted through the CCLM mode may be used for deriving a residual image through a differential from an original image in the encoding apparatus or used for deriving a reconstructed image through an addition with a residual signal in the decoding apparatus.

Meanwhile, in the case that the information representing one of the methods is transmitted in a unit of CU, slice, picture and sequence, the encoding apparatus may determine one of method 1 to method 4 and transmit the information to the decoding apparatus as below.

In the case that the information representing whether the method of the present embodiment described above is applied is transmitted in a unit of CU, when an intra-prediction mode of the current chroma block is CCLM mode (i.e., the CCLM prediction is applied to the current chroma block), the encoding apparatus may determine a side of good encoding efficiency between two following cases through RDO and transmit information of the determined method to the decoding apparatus.

1) In the case that encoding efficiency is good when the Nth is set to 4 for all blocks and a CCLM parameter calculation is performed through the reference sample selection method of the present embodiment proposed in FIG. 9 and FIG. 10 described above, cclm_reduced_sample_flag of value 0 (false) is transmitted.

2) In the case that encoding efficiency is good when it is configured that method 3 is applied and a CCLM parameter calculation is performed through the reference sample selection method of the present embodiment proposed, cclm_reduced_sample_flag of value 1 (true) is transmitted.

Alternatively, in the case that the information representing whether the method of the present embodiment described above is applied is transmitted in a unit of slice, picture or sequence, the encoding apparatus may add a high level syntax (HLS) as represented in Table 14, Table 15 or Table 16 described above and transmit the information representing one method among the methods. The encoding apparatus may configure the method applied among the methods by considering a size of input image or in accordance with an encoding target bitrate.

1) For example, in the case that an input image is HD quality or more, the encoding apparatus may apply method 2 (Nth=1, 2, 4 or 8), and in the case that an input image is HD quality or less, the encoding apparatus may apply method 1 (Nth=1, 2 or 4).

2) In the case that image encoding of high quality is required, the encoding apparatus may apply method 2 (Nth=1, 2, 4 or 8), and in the case that image encoding of normal quality is required, the encoding apparatus may apply method 4 (Nth=1 or 4).

The method proposed in the present embodiment may be used for a CCLM mode which is an intra-prediction mode for a chroma component, and the chroma block predicted through the CCLM mode may be used for deriving a residual image through a differential from an original image in the encoding apparatus or used for reconstructed image through an addition with a residual signal in the decoding apparatus.

Figure 13:
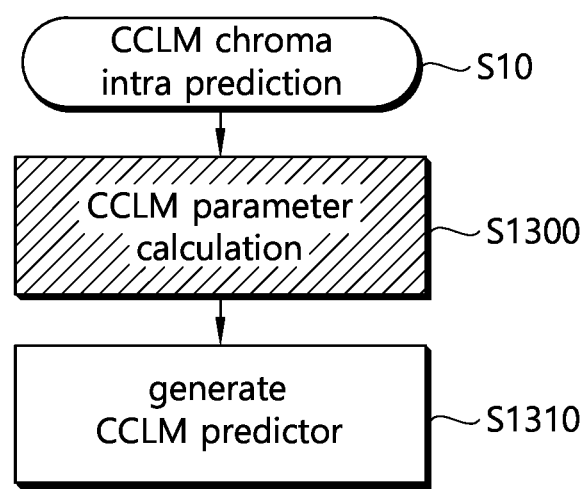
FIG. 13 is a diagram explaining a process of performing CCLM prediction for a current chroma block according to another embodiment.
Figure 14:
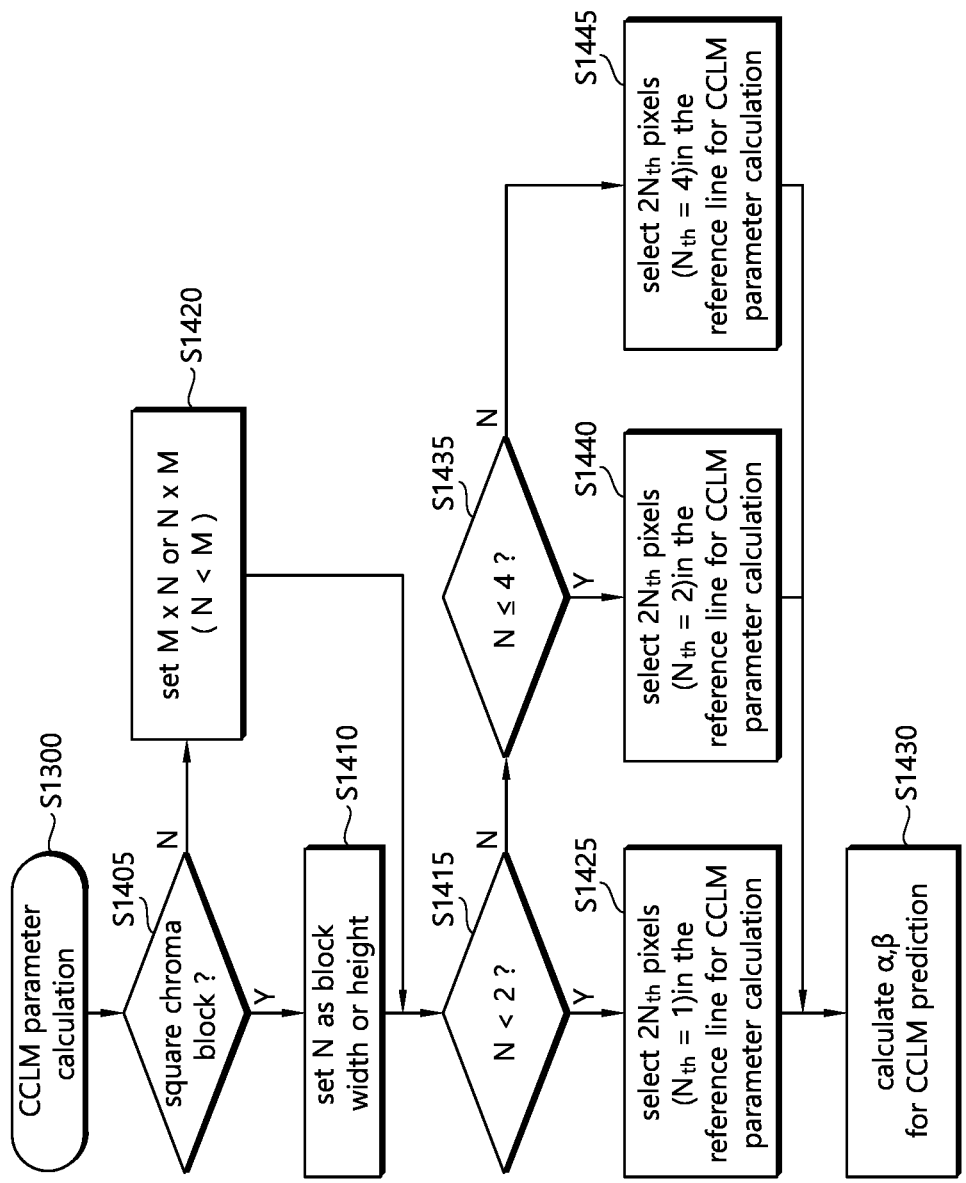
FIG. 14 is a diagram explaining a process of performing CCLM prediction based on CCLM parameters of a current chroma block derived according to method 1 of FIG. 13.

FIGS. 13 and 14 are diagrams for describing a procedure of performing CCLM prediction based on the CCLM parameters of the current chroma block derived according to method 1 of the present embodiment described above.

Referring to FIG. 13, the encoding apparatus/decoding apparatus may calculate a CCLM parameter for the current block (step, S1300). For example, the CCLM parameter may be calculated as the present embodiment shown in FIG. 14.

FIG. 14 may illustrate a specific embodiment of calculating the CCLM parameter. For example, referring to FIG. 14, the encoding apparatus/decoding apparatus may determine whether the current chroma block is a square chroma block (S1405).

In the case that the current chroma block is the square chroma block, the encoding apparatus/decoding apparatus may set the width or height of the current block to N (S1410), and may determine whether the N is smaller than 2 (N<2) (S1415).

Alternatively, if the current chroma block is not the square chroma block, the size of the current chroma block may be derived as M×N size or N×M size (S1420), and the encoding apparatus/decoding apparatus may determine whether the N is smaller than 2 (S1415). Here, the M may represent a larger value than the N (N<M).

If the N is smaller than 2, the encoding apparatus/decoding apparatus may select $2N_{th}$ neighboring samples in a reference line adjacent to the current block as reference samples for the CCLM parameter calculation (S1425). Here, the Nth may be 1 ($N_{th}$=1).

The encoding apparatus/decoding apparatus may derive the parameters α and β for the CCLM prediction based on the selected reference samples (S1430).

Meanwhile, if the N is not smaller than 2, the encoding apparatus/decoding apparatus may determine whether the N is equal to or smaller than 4 (N<=4) (S1435).

If the N is equal to or smaller than 4, the encoding apparatus/decoding apparatus may select the $2N_{th}$ neighboring samples in the reference line adjacent to the current block as the reference samples for the CCLM parameter calculation (S1440). Here, the Nth may be 2 ($N_{th}$=2). Thereafter, the encoding apparatus/decoding apparatus may derive the parameters α and β for the CCLM prediction based on the selected reference samples (S1430).

Further, if the N is larger than 4, the encoding apparatus/decoding apparatus may select the $2N_{th}$ neighboring samples in the reference line adjacent to the current block as the reference samples for the CCLM parameter calculation (S1445). Here, the $N_{th}$ may be 4 ($N_{th}$=4). Thereafter, the encoding apparatus/decoding apparatus may derive the parameters α and β for the CCLM prediction based on the selected reference samples (S1430).

Referring again to FIG. 13, if the parameters for the CCLM prediction for the current chroma block have been calculated, the encoding apparatus/decoding apparatus may generate a prediction sample for the current chroma block by performing the CCLM prediction based on the parameters (S1310). For example, the encoding apparatus/decoding apparatus may generate the prediction sample for the current chroma block based on the above-described Equation 1 in which the calculated parameters and reconstructed samples of the current luma block for the current chroma block are used.

Figure 15:
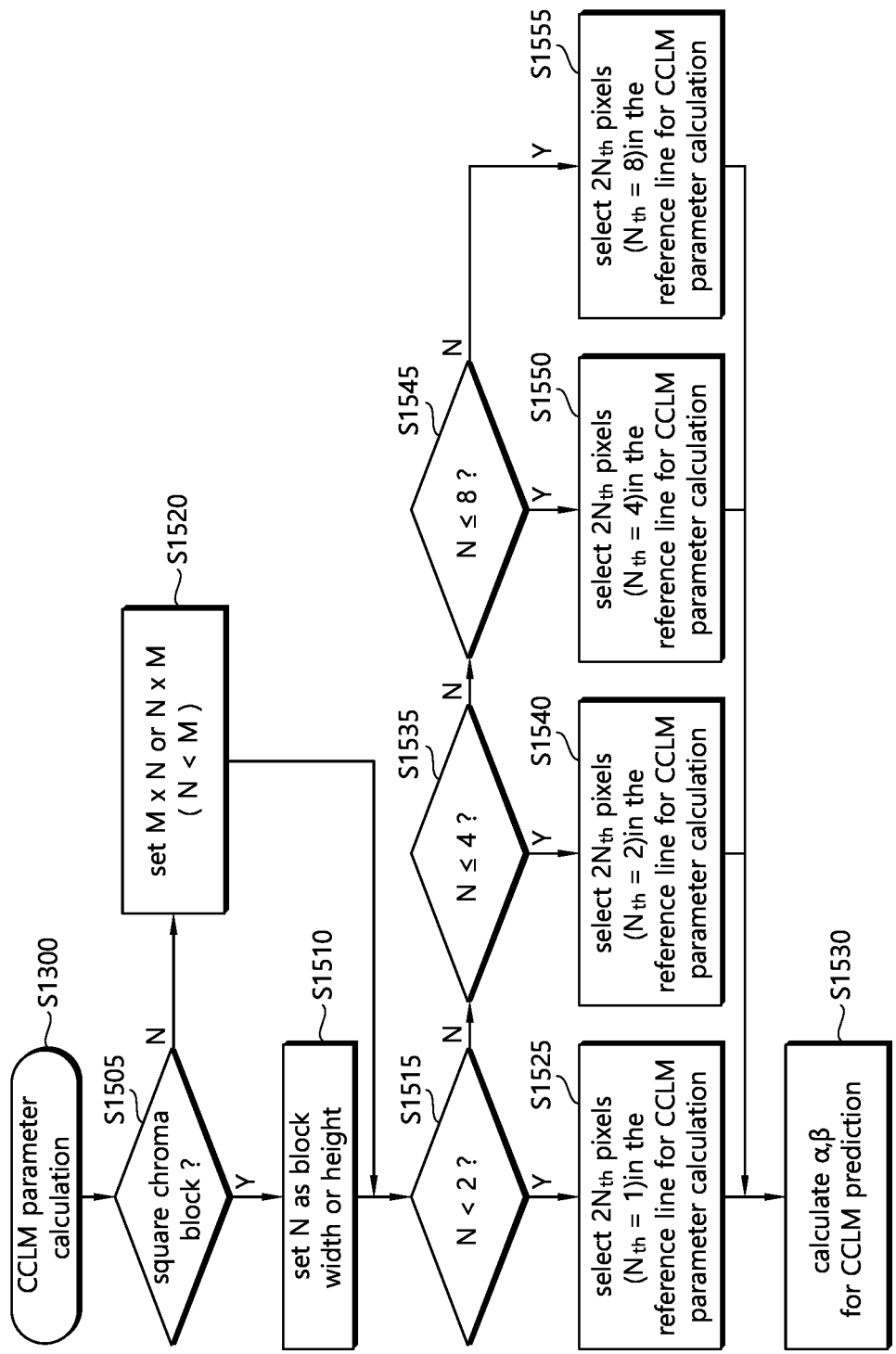
FIG. 15 is a diagram explaining a process of performing CCLM prediction based on CCLM parameters of a current chroma block derived according to method 2 of FIG. 13.

FIG. 15 is a diagram explaining a process of performing CCLM prediction based on CCLM parameters of the current chroma block derived according to method 2 in FIG. 13.

FIG. 15 may exemplarily represent a specific embodiment for calculating CCLM parameters. For example, referring to FIG. 15, the encoding apparatus/decoding apparatus may determine whether the current chroma block is a square chroma block (S1505).

In the case that the current chroma block is the square chroma block, the encoding apparatus/decoding apparatus may set the width or height of the current block to N (S1510), and may determine whether the N is smaller than 2 (N<2) (S1515).

Alternatively, if the current chroma block is not the square chroma block, the size of the current chroma block may be derived as M×N size or N×M size (S1520), and the encoding apparatus/decoding apparatus may determine whether the N is smaller than 2 (S1515). Here, the M may represent a larger value than the N (N<M).

If the N is smaller than 2, the encoding apparatus/decoding apparatus may select $2N_{th}$ neighboring samples in a reference line adjacent to the current block as reference samples for the CCLM parameter calculation (S1525). Here, the $N_{th}$ may be 1 ($N_{th}$=1).

The encoding apparatus/decoding apparatus may derive the parameters α and β for the CCLM prediction based on the selected reference samples (S1530).

Meanwhile, if the N is not smaller than 2, the encoding apparatus/decoding apparatus may determine whether the N is equal to or smaller than 4 (N<=4) (S1535).

If the N is equal to or smaller than 4, the encoding apparatus/decoding apparatus may select the $2N_{th}$ neighboring samples in the reference line adjacent to the current block as the reference samples for the CCLM parameter calculation (S1540). Here, the $N_{th}$ may be 2 ($N_{th}$=2). Thereafter, the encoding apparatus/decoding apparatus may derive the parameters α and β for the CCLM prediction based on the selected reference samples (S1530).

Meanwhile, if the N is larger than 4, the encoding apparatus/decoding apparatus may determine whether the N is equal to or smaller than 8 (N<=8) (S1545).

If the N is equal to or smaller than 8, the encoding apparatus/decoding apparatus may select the $2N_{th}$ neighboring samples in the reference line adjacent to the current block as the reference samples for the CCLM parameter calculation (S1550). Here, the $N_{th}$ may be 4 ($N_{th}$=4). Thereafter, the encoding apparatus/decoding apparatus may derive the parameters α and β for the CCLM prediction based on the selected reference samples (S1530).

Further, if the N is larger than 8, the encoding apparatus/decoding apparatus may select the $2N_{th}$ neighboring samples in the reference line adjacent to the current block as the reference samples for the CCLM parameter calculation (S1555). Here, the $N_{th}$ may be 8 ($N_{th}$=8). Thereafter, the encoding apparatus/decoding apparatus may derive the parameters α and β for the CCLM prediction based on the selected reference samples (S1530).

Referring again to FIG. 13, if the parameters for the CCLM prediction for the current chroma block have been calculated, the encoding apparatus/decoding apparatus may generate a prediction sample for the current chroma block by performing the CCLM prediction based on the parameters (S1310). For example, the encoding apparatus/decoding apparatus may generate the prediction sample for the current chroma block based on the above-described Equation 1 in which the calculated parameters and reconstructed samples of the current luma block for the current chroma block are used.

Figure 16:
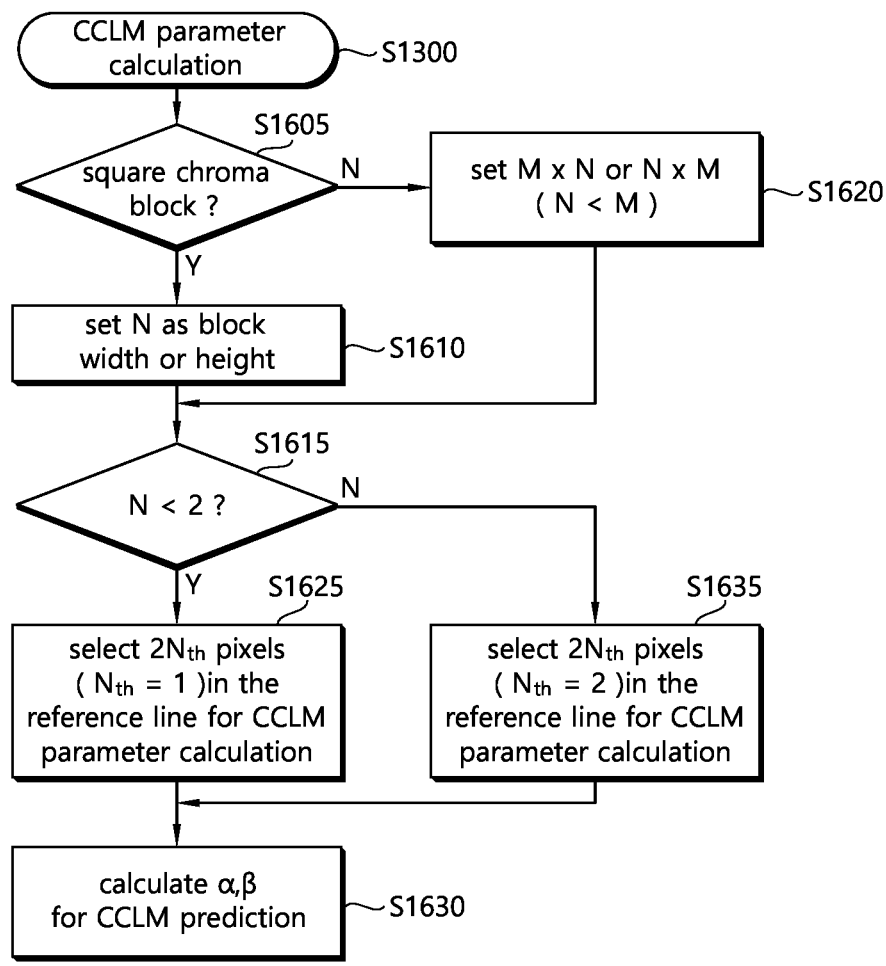
FIG. 16 is a diagram explaining a process of performing CCLM prediction based on CCLM parameters of a current chroma block derived according to method 3 of FIG. 13.

FIG. 16 is a diagram explaining a process of performing CCLM prediction based on CCLM parameters of the current chroma block derived according to method 3 in FIG. 13.

FIG. 16 may exemplarily represent a specific embodiment for calculating CCLM parameters. For example, referring to FIG. 16, the encoding apparatus/decoding apparatus may determine whether the current chroma block is a square chroma block (S1605).

In the case that the current chroma block is the square chroma block, the encoding apparatus/decoding apparatus may set the width or height of the current block to N (S1610), and may determine whether the N is smaller than 2 (N<2) (S1615).

Alternatively, if the current chroma block is not the square chroma block, the size of the current chroma block may be derived as M×N size or N×M size (S1620), and the encoding apparatus/decoding apparatus may determine whether the N is smaller than 2 (S1615). Here, the M may represent a larger value than the N (N<M).

If the N is smaller than 2, the encoding apparatus/decoding apparatus may select $2N_{th}$ neighboring samples in a reference line adjacent to the current block as reference samples for the CCLM parameter calculation (S1625). Here, the $N_{th}$ may be 1 ($N_{th}$=1).

The encoding apparatus/decoding apparatus may derive the parameters α and β for the CCLM prediction based on the selected reference samples (S1630).

Meanwhile, if the N is not smaller than 2, the encoding apparatus/decoding apparatus may select the $2N_{th}$ neighboring samples in the reference line adjacent to the current block as the reference samples for the CCLM parameter calculation (S1635). Here, the $N_{th}$ may be 2 ($N_{th}$=2). Thereafter, the encoding apparatus/decoding apparatus may derive the parameters α and β for the CCLM prediction based on the selected reference samples (S1630).

Referring again to FIG. 13, if the parameters for the CCLM prediction for the current chroma block have been calculated, the encoding apparatus/decoding apparatus may generate a prediction sample for the current chroma block by performing the CCLM prediction based on the parameters (S1310). For example, the encoding apparatus/decoding apparatus may generate the prediction sample for the current chroma block based on the above-described Equation 1 in which the calculated parameters and reconstructed samples of the current luma block for the current chroma block are used.

Figure 17:
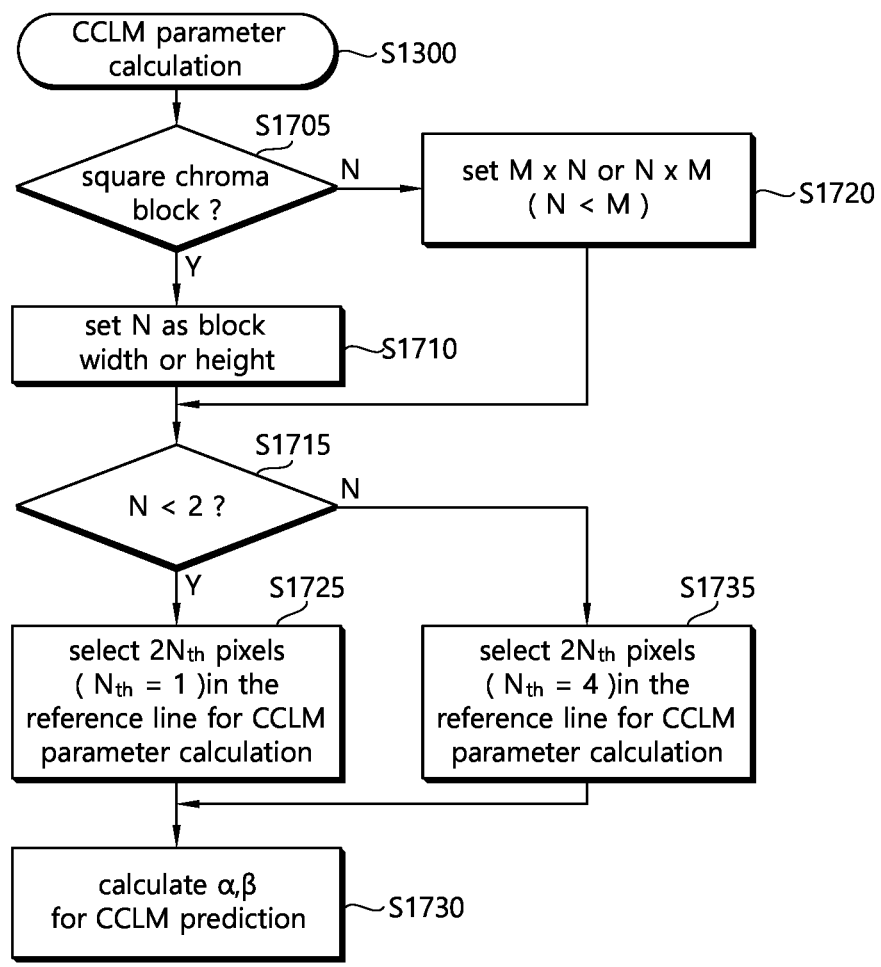
FIG. 17 is a diagram explaining a process of performing CCLM prediction based on CCLM parameters of a current chroma block derived according to method 4 of FIG. 13.

FIG. 17 is a diagram explaining a process of performing CCLM prediction based on CCLM parameters of the current chroma block derived according to method 4 in FIG. 13.

FIG. 17 may exemplarily represent a specific embodiment for calculating CCLM parameters. For example, referring to FIG. 17, the encoding apparatus/decoding apparatus may determine whether the current chroma block is a square chroma block (S1705).

In the case that the current chroma block is the square chroma block, the encoding apparatus/decoding apparatus may set the width or height of the current block to N (S1710), and may determine whether the N is smaller than 2 (N<2) (S1715).

Alternatively, if the current chroma block is not the square chroma block, the size of the current chroma block may be derived as M×N size or N×M size (S1720), and the encoding apparatus/decoding apparatus may determine whether the N is smaller than 2 (S1715). Here, the M may represent a larger value than the N (N<M).

If the N is smaller than 2, the encoding apparatus/decoding apparatus may select $2N_{th}$ neighboring samples in a reference line adjacent to the current block as reference samples for the CCLM parameter calculation (S1725). Here, the $N_{th}$ may be 1 ($N_{th}$=1).

The encoding apparatus/decoding apparatus may derive the parameters α and β for the CCLM prediction based on the selected reference samples (S1730).

Meanwhile, if the N is not smaller than 2, the encoding apparatus/decoding apparatus may select the $2N_{th}$ neighboring samples in the reference line adjacent to the current block as the reference samples for the CCLM parameter calculation (S1735). Here, the $N_{th}$ may be 4 ($N_{th}$=4). Thereafter, the encoding apparatus/decoding apparatus may derive the parameters α and β for the CCLM prediction based on the selected reference samples (S1730).

Referring again to FIG. 13, if the parameters for the CCLM prediction for the current chroma block have been calculated, the encoding apparatus/decoding apparatus may generate a prediction sample for the current chroma block by performing the CCLM prediction based on the parameters (S1310). For example, the encoding apparatus/decoding apparatus may generate the prediction sample for the current chroma block based on the above-described Equation 1 in which the calculated parameters and reconstructed samples of the current luma block for the current chroma block are used.

Meanwhile, in the case that subsampling is required in deriving a neighboring reference sample for a CCLM parameter calculation, the present disclosure proposes an embodiment of selecting a subsampling sample more efficiently.

Figure 18:
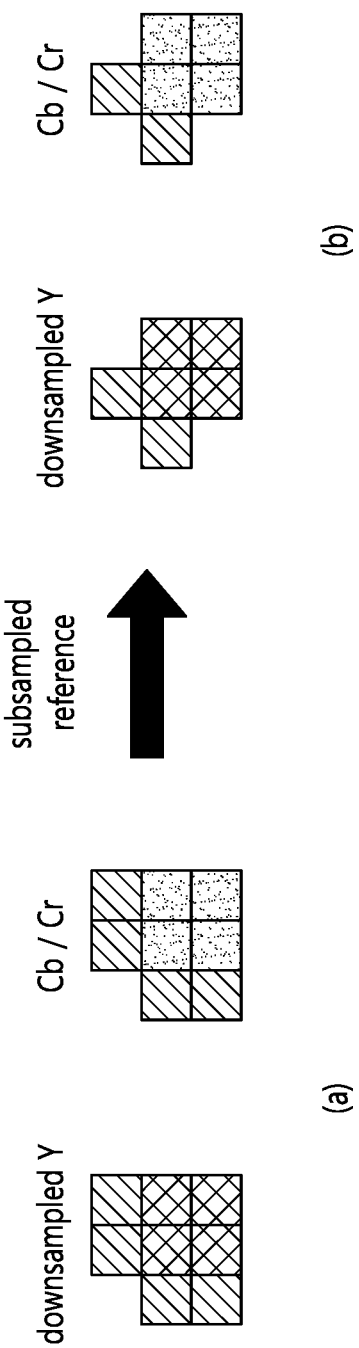
FIG. 18 illustrates an example for selecting a neighboring reference sample of a chroma block.

FIG. 18 illustrates an example of selecting a neighboring reference sample of a chroma block.

Referring to (a) of FIG. 18, in a chroma block of 2×2 size (N=2), CCLM parameters α and β for the chroma block may be calculated based on 4 neighboring reference samples. The neighboring reference samples may include 4 neighboring reference samples of the luma block and 4 neighboring reference samples of the chroma block. In addition, like the present embodiments described above, in the case that $N_{th}$ for the chroma block of 2×2 size is set to 1 ($N_{th}$=1), referring to (b) of FIG. 18, CCLM parameters α and β for the chroma block may be calculated based on 2 neighboring reference samples. However, as shown in FIG. 18, in the case of using neighboring reference samples which are sub-sampled in a half, since the neighboring reference samples are crowded in a top right side of the current chroma block, a problem occurs that diversity of neighboring reference samples is not considered in CCLM parameter calculation, which may be a cause of CCLM parameter accuracy degradation.

Figure 19:
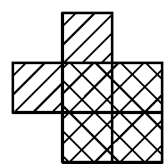
FIG. 19 illustrates an example of neighboring reference samples derived through the existing subsampling and neighboring reference samples derived through subsampling according to an embodiment of the present disclosure.
Figure 19:
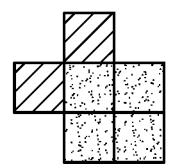
Figure 19:
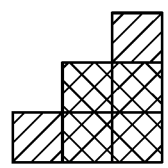
Figure 19:
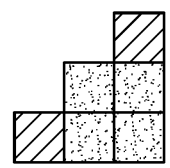
Figure 20:
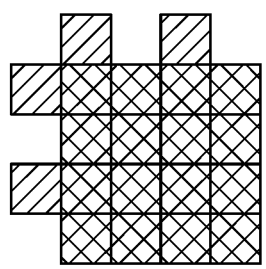
FIG. 20 illustrates another example of neighboring reference samples derived through the existing subsampling and neighboring reference samples derived through subsampling according to an embodiment of the present disclosure.
Figure 20:
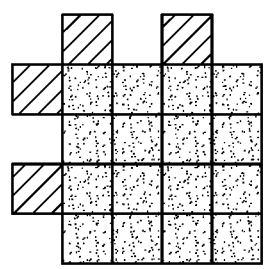
Figure 20:
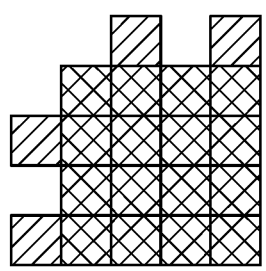
Figure 20:
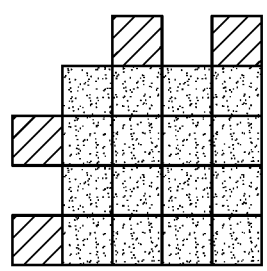
Figure 21:
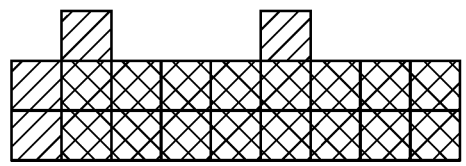
FIG. 21 illustrates still another example of neighboring reference samples derived through the existing subsampling and neighboring reference samples derived through subsampling according to an embodiment of the present disclosure.
Figure 21:
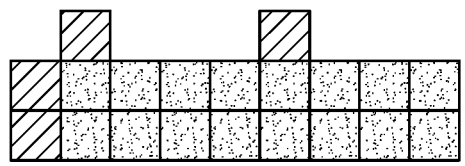
Figure 21:
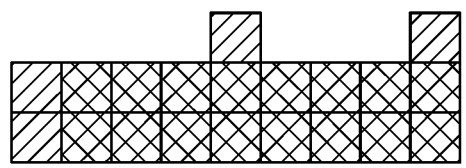
Figure 21:
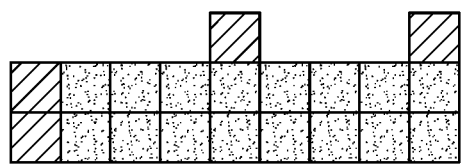

FIGS. 19 to 21 illustrates neighboring reference samples derived through the existing subsampling and neighboring reference samples derived through subsampling according to the present embodiment.

As shown in FIG. 19 and FIG. 21, a neighboring sample which is far from a top left side of the current chroma block is preferentially selected through the subsampling according to the present embodiment, more diverse sample values may be selected in CCLM parameter calculation.

In addition, as shown in FIG. 19, the present embodiment proposes subsampling that selects a side far from a top left side preferentially even for a non-square chroma block like n×2 size or 2×n size. Through this, more diverse sample values may be selected in CCLM parameter calculation, and through this, CCLM parameter calculation accuracy may be improved.

Meanwhile, the existing subsampling may be performed based on the following equation.

$$Idx\_w=(x*width)/subsample\_num$$

$$Idx\_h=(y*height)/subsample\_num \quad \text{[Equation 5]}$$

Here, Idx_w may represent a neighboring reference sample (or position of neighboring reference sample) adjacent to a top current chroma block which is derived through subsampling, and Idx_h may represent a neighboring reference sample (or position of neighboring reference sample) adjacent to a left current chroma block which is derived through subsampling. Further, width may represent a width of the current chroma block, and height may represent a height of the current chroma block. In addition, subsample_num may represent the number of neighboring reference samples (the number of neighboring reference samples adjacent to a side) which is derived through subsampling.

For example, the subsampling performed based on Equation 5 above may be performed as below.

x of Equation 5 above is a variable and may be increased from 0 to a reference sample number of top neighboring reference samples of the current chroma block after subsampling. As an example, in the case that 2 top neighboring reference samples are selected in the current chroma block of which width is 16, the width of Equation 5 is 16, and x may vary from 0 to 1. In addition, since the Subsample_num is 2, 0 and 8 may be selected as the Idx_w value. Accordingly, in the case that x component and y component of a top left sample position of the current chroma block are 0, the top neighboring reference sample of which x coordinate is 0 and top the neighboring reference sample of which x coordinate is 8 may be selected among the top neighboring reference samples through the subsampling.

y of Equation 5 above is a variable and may be increased from 0 to a reference sample number of left neighboring reference samples of the current chroma block after subsampling. As an example, in the case that 4 left neighboring reference samples are selected in the current chroma block of which height is 32, the height of Equation 5 is 32, and y may vary from 0 to 3. In addition, since the Subsample_num is 4, 0, 8, 16 and 24 may be selected as the Idx_h value. Accordingly, in the case that x component and y component of a top left sample position of the current chroma block are 0, the left neighboring reference sample of which y coordinate is 0, the left neighboring reference sample of which y coordinate is 8, the left neighboring reference sample of which y coordinate is 16 and the left neighboring reference sample of which y coordinate is 24 may be selected among the left neighboring reference samples through the subsampling.

Referring to Equation 5 above, only the samples near to the top left of the current chroma block may be selected through the subsampling.

Therefore, according to the present embodiment, subsampling may be performed based on an equation different from Equation 5 above. For example, the subsampling proposed in the present embodiment may be performed based on the following equation.

$$Idx\_w=width-1-(x*width)/subsample\_num\_width$$

$$Idx\_h=height-1-(y*height)/subsample\_num\_height \quad \text{[Equation 6]}$$

Herein, subsample_num_width may represent a top neighboring reference sample number derived through subsampling, and subsample_num_height may represent a left neighboring reference sample number derived through subsampling.

In addition, x is a variable and may be increased from 0 to a reference sample number of top neighboring reference samples of the current chroma block after subsampling. Further, y is a variable and may be increased from 0 to a reference sample number of left neighboring reference samples of the current chroma block after subsampling.

For example, referring to Equation 6 above, in the case that 2 top neighboring reference samples are selected in the current chroma block of which width is 16, the width of Equation 6 is 16, and x may vary from 0 to 1. In addition, since the subsample_num_width is 2, 15 and 7 may be selected as the Idx_w value. Accordingly, in the case that x component and y component of a top left sample position of the current chroma block are 0, the top neighboring reference sample of which x coordinate is 15 and top the neighboring reference sample of which x coordinate is 7 may be selected among the top neighboring reference samples through the subsampling. That is, among the top neighboring reference samples of the current chroma block, the top neighboring reference sample which is far from the top left side of the current chroma block may be selected.

In addition, for example, referring to Equation 6 above, in the case that 4 left neighboring reference samples are selected in the current chroma block of which height is 32, the height of Equation 6 is 32, and y may vary from 0 to 3. In addition, since the subsample_num_height is 4, 31, 23, 15 and 7 may be selected as the Idx_h value. Accordingly, in the case that x component and y component of a top left sample position of the current chroma block are 0, the left neighboring reference sample of which y coordinate is 31, the left neighboring reference sample of which y coordinate is 23, the left neighboring reference sample of which y coordinate is 15 and the left neighboring reference sample of which y coordinate is 7 may be selected among the left neighboring reference samples through the subsampling.

Meanwhile, the subsample_num_width and the subsample_num_height of Equation 6 above may be derived based on a size of the current chroma block. For example, the subsample_num_width and the subsample_num_height may be derived as represented in the following table.

TABLE 18

| Chroma block size | (subsample_num_width, subsample_num_height) |
|---|---|
| 2 × 2, 2 × N, N × 2 (N > 2) | (2, 2) |
| 4 × 4, 4 × N, N × 4 (N > 4) | (4, 4) |
| 8 × 8, 8 × N, N × 8 (N > 8) | (8, 8) |
| 16 × 16, 16 × N, N × 16 (N > 16) | (16, 16) |
| 32 × 32, 32 × N, N × 32 (N > 32) | (32, 32) |
| 64 × 64 | (64, 64) |

Referring to Table 18, subsampling may be performed for neighboring reference samples adjacent to a long side in accordance with a short side between a width and a height of the current chroma block. That is, the number of neighboring reference samples selected among the neighboring reference samples adjacent to a long side may be derived as a smaller value between a width and a height of the current chroma block. For example, it may be derived as subsample_num_width=subsample_num_height=min (width, height).

Alternatively, for example, in the case that the Nth is derived, the subsample_num_width and the subsample_num_height may be derived based on the Nth. For example, the subsample_num_width and the subsample_num_height may be derived as represented in the following table based on the Nth.

TABLE 19 subsample_num_width = min (width, height) if $N_{th}$ >= width
subsample_num_width = min ($N_{th}$, height) if $N_{th}$ < width
subsample_num_height = min (width, height) if $N_{th}$ >= height
subsample_num_height = min ($N_{th}$, width) if $N_{th}$ < height Herein, min (A, B) may represent a smaller value between A and B.

Alternatively, for example, based on a predetermined look-up table (LUT), subsampling may be performed for deriving an optimal number of neighboring reference samples in accordance with a shape of the current chroma block. For example, the LUT may be derived as represented in the following table.

TABLE 20

| Chroma block size | (subsample_num_width, subsample_num_height) |
|---|---|
| 2 × 2, 2 × 4, 2 × 8, 2 × 16, 2 × 32 | (2, 2), (2, 2), (2, 6), (2, 14), (2, 30) |
| 4 × 2, 8 × 2, 16 × 2, 32 × 2 | (2, 2), (6, 2), (14, 2), (30, 2) |
| 4 × 4, 4 × 8, 4 × 16, 4 × 32 | (4, 4), (4, 4), (4, 12), (4, 28) |

TABLE 20-continued

| Chroma block size | (subsample_num_width, subsample_num_height) |
|---|---|
| 8 × 4, 16 × 4, 32 × 4 | (4, 4), (12, 4), (28, 4) |
| 8 × 8, 8 × 16, 8 × 32 | (8, 8), (8, 8), (8, 24) |
| 16 × 8, 32 × 8 | (8, 8), (24, 8) |
| 16 × 16, 16 × 32 | (16, 16), (16, 16) |
| 32 × 16 | (16, 16) |
| 32 × 32 | (32, 32) |

Referring to Table 20 above, the selected number of neighboring reference samples may be increased in comparison with the subsampling described above, and through this, a CCLM parameter may be calculated in higher accuracy. In subsampling for deriving 6 neighboring reference samples in the example described above, first 6 positions (idx_w or idx_h) may be selected among subsampling for deriving 8 neighboring reference samples, and in subsampling for deriving 12 or 14 neighboring reference samples, first 12 or 14 positions may be selected among subsampling for deriving 16 neighboring reference samples. In addition, in subsampling for deriving 24 or 28 neighboring reference samples, first 24 or 28 positions may be selected among subsampling for deriving 32 neighboring reference samples.

Further, referring to Table 20 above, the number of reference samples being selected in the encoding apparatus and the decoding apparatus may be determined as follows.

For example, if the chroma block size of the current chroma block is 4×32 size, it may be determined that the subsample_num_width is 4, and the subsample_num_height is 28, and even in the case of the remaining chroma block sizes, the subsample_num_width and the subsample_num_height may be determined in the same manner.

Alternatively, in order to prevent increase of hardware complexity, subsampling for deriving simplified number of neighboring reference samples may be performed. For example, the LUT may be derived as represented in the following table.

TABLE 21

| Chroma block size | (subsample_num_width, subsample_num_height) |
|---|---|
| 2 × 2, 2 × 4, 2 × 8, 2 × 16, 2 × 32 | (2, 2), (2, 2), (2, 6), (2, 6), (2, 6) |
| 4 × 2, 8 × 2, 16 × 2, 32 × 2 | (2, 2), (6, 2), (6, 2), (6, 2) |
| 4 × 4, 4 × 8, 4 × 16, 4 × 32 | (4, 4), (4, 4), (2, 6), (2, 6) |
| 8 × 4, 16 × 4, 32 × 4 | (4, 4), (6, 2), (6, 2) |
| 8 × 8, 8 × 16, 8 × 32 | (4, 4), (4, 4), (2, 6) |
| 16 × 8, 32 × 8 | (4, 4), (6, 2) |
| 16 × 16, 16 × 32 | (4, 4), (4, 4) |
| 32 × 16 | (4, 4) |
| 32 × 32 | (4, 4) |

Referring to Table 21 above, the maximum value of the sum of the subsample_num_width and the subsample_num_height may be set to 8. Through this, the CCLM parameter can be efficiently calculated as well as the increase of hardware complexity can be reduced.

In subsampling for deriving 6 neighboring reference samples in the example described above, first 6 positions (idx_w or idx_h) may be selected during subsampling for deriving 8 neighboring reference samples.

Further, referring to Table 21 above, the number of reference samples being selected in the encoding apparatus and the decoding apparatus may be determined as follows.

For example, if the chroma block size of the current chroma block is 4×32 size, it may be determined that the subsample_num_width is 2, and the subsample_num_height is 6, and even in the case of the remaining chroma block sizes, the subsample_num_width and the subsample_num_height may be determined in the same manner.

According to the proposed method, without need to transmit additional information, a value promised in an encoder or a decoder may be used, or it may be transmitted whether to use the proposed method or a value in a unit of CU, slice, picture and sequence.

In the case that the subsampling using the LUT as represented in Table 20 and Table 21 described above is performed, the encoding apparatus and the decoding apparatus may use the subsample_num_width and subsample_num_height numbers determined in the Table (i.e., LUT), and in the case that the Nth is used, the subsample_num_width and the subsample_num_height may be determined based on the Nth value. In addition, in the other cases, the value derived as Table 18 may be used as a default subsample_num_width and a subsample_num_height number.

Meanwhile, in the case that the proposed method is transmitted in a unit of CU, that is, the information representing whether to apply subsampling using Equation 6 described above is transmitted, a method for the decoding apparatus to perform a CCLM prediction by parsing cclm_subsample_flag as below, when an intra-prediction mode of the current chroma block is the CCLM mode.

- In the case that the cclm_subsample_flag is 0 (false), a neighboring reference sample selection and a CCLM parameter calculation are performed through the existing subsampling method (subsampling based on Equation 5 described above).
- In the case that the cclm_subsample_flag is 1 (true), a neighboring reference sample selection and a CCLM parameter calculation are performed through the proposed subsampling method (subsampling based on Equation 6 described above).

In the case that the information representing whether to use the proposed method is transmitted in a unit of slice, picture and sequence, the information may be transmitted through high level syntax (HLS) as below. The decoding apparatus may select a subsampling method which is performed based on the information.

For example, the information representing whether to use the proposed method signaled through a slice header may be represented as the following Table.

TABLE 22

| | Descriptor |
|---|---|
| slice_header( ) { | |
| ... | |
| cclm_subsample_flag | f(1) |
| ... | | cclm_reduced_sample_flag may represent a syntax element of the information representing whether to use the proposed method.

Alternatively, for example, the information representing whether to use the proposed method signaled through a Picture Parameter Set (PPS) may be represented as the following table.

TABLE 23

| | Descriptor |
|---|---|
| pic_parameter_set_rbsp( ) { | |
| ... | |
| cclm_subsample_flag | f(1) |
| ... | |

Alternatively, for example, the information representing whether to use the proposed method signaled through a Sequence Parameter Set (SPS) may be represented as the following table.

TABLE 24

| sps_parameter_set_rbsp( ) { | Descriptor |
|---|---|
| ... | |
| cclm_subsample_flag | f(1) |
| ... | |

The method selected based on cclm_reduced_sample_flag value (i.e., a value derived by decoding cclm_reduced_sample_flag) transmitted through the slice header, the PPS or the SPS may be derived as represented in the following table.

TABLE 25

| cclm_subsample_flag | Proposed method |
|---|---|
| 0 | Not apply (Use Equation 5) |
| 1 | Apply (Use Equation 6) |

Referring to Table. 25, in the case that the cclm_reduced_sample_flag value is 0, the subsampling using Equation 5 may be performed, and in the case that the cclm_reduced_sample_flag value is 1, the subsampling using Equation 6 may be performed.

Meanwhile, in the case that a predetermined value is used in the encoding apparatus and the decoding apparatus without transmitting the additional information, the encoding apparatus may perform the embodiment described above in the same manner of the decoding apparatus and perform a CCLM parameter calculation based on the selected neighboring reference samples.

Alternatively, in the case that the information representing whether to apply the proposed subsampling method is transmitted in a unit of CU, slice, picture and sequence, the encoding apparatus may determine whether to apply the proposed subsampling method, and then, transmit information of the determined method to the decoding apparatus.

In the case that the information representing whether to apply the proposed subsampling method is transmitted in a unit of CU, when an intra-prediction mode of the current chroma block is CCLM mode, the encoding apparatus may determine a side of good encoding efficiency between two following cases through RDO and transmit information of the value representing the corresponding case to the decoding apparatus.

1) In the case that encoding efficiency is good when a CCLM parameter calculation is performed through the existing subsampling (subsampling based on Equation 5 described above), cclm_reduced_sample_flag of value 0 (false) is transmitted.

2) In the case that encoding efficiency is good when a CCLM parameter calculation is performed through the proposed subsampling (subsampling based on Equation 5 described above), cclm_reduced_sample_flag of value 1 (true) is transmitted.

In the case that the information representing whether to apply the proposed subsampling method is transmitted in a unit of slice, picture or sequence, the encoding apparatus may add a high level syntax (HLS) as represented in Table 22, Table 23 or Table 24 described above and transmit the information.

Figure 22:
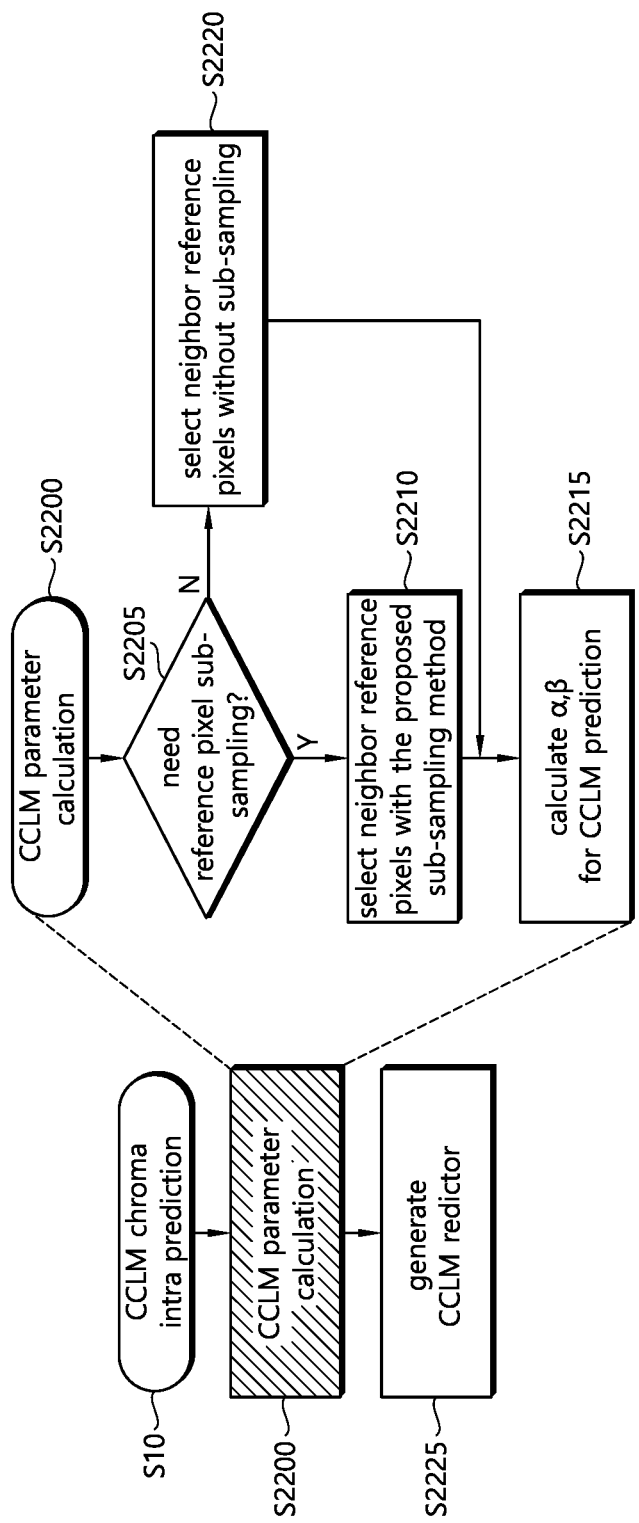
FIG. 22 illustrates an example for performing CCLM prediction using subsampling according to an example of the present disclosure.

FIG. 22 illustrates an example of performing a CCLM prediction using subsampling using Equation 6 described above.

Referring to FIG. 22, the encoding apparatus/decoding apparatus may calculate a CCLM parameter for the current block (step, S2200).

Particularly, the encoding apparatus/decoding apparatus may determine whether subsampling for neighboring samples of the current chroma block is required (step, S2205).

For example, in order to derive CCLM parameters for the current chroma block, in the case that top neighboring samples of a smaller number than that of a width of the current chroma block are selected, it is required to perform the subsampling for top neighboring samples of the current chroma block. In addition, for example, in order to derive CCLM parameters for the current chroma block, in the case that top neighboring samples of a smaller number than that of a height of the current chroma block are selected, it is required to perform the subsampling for left neighboring samples of the current chroma block.

In the case that the subsampling is required, the encoding apparatus/decoding apparatus may select a specific number of neighboring samples by performing subsampling using Equation 6 for the neighboring samples (step, S2210). Later, the encoding apparatus/decoding apparatus may calculate CCLM parameters for the current chroma block based on the selected neighboring samples (step, S2215).

In the case that the subsampling is not required, the encoding apparatus/decoding apparatus may not perform the subsampling but select the neighboring samples of the current chroma block (step, S2220). Later, the encoding apparatus/decoding apparatus may calculate the CCLM parameters for the current chroma block based on the selected neighboring samples (step, S2215).

In the case that the CCLM parameters are derived, the encoding apparatus/decoding apparatus may generate a prediction sample of the current chroma block by performing a CCLM prediction for the current chroma block based on the CCLM parameters (step, S2225).

Meanwhile, in this document, in deriving the CCLM parameter, another embodiment that is different from the above-described embodiment for reducing the operation complexity for deriving the CCLM parameter may be proposed.

According to an example, samples for parameters (e.g., α and β) for the CCLM and MDLM prediction may be selected as follows.

In the case of the chroma block of N×N size to which CCLM is applied, total 2N (N horizontal and N vertical) neighboring reference sample pairs (luma and chroma) of the current chroma block may be selected.

In the case of the chroma block of N×M size or M×N size to which CCLM is applied (here, N<=M), total 2N (N horizontal and N vertical) neighboring reference sample pairs of the current chroma block may be selected. Meanwhile, since M is larger than N (e.g., M=2N or 3N), N sample pairs may be selected through subsampling among M samples.

In the case of the chroma block of N×M size to which MDLM is applied, 2N top neighboring reference sample pairs (luma and chroma) of the current chroma block may be selected in the LM_A mode.

In the case of the chroma block of M×N size to which MDLM is applied, 2N left neighboring reference sample pairs (luma and chroma) of the current chroma block may be selected in the LM_L mode.

As described above, 2N sample pairs may be derived, and when the CCLM parameters α and β are calculated through the above-described Equation 3 using the sample pairs, 4N comparison operations may be required.

That is, in the case of the chroma block of 4×4 size, 16 comparison operations are necessary for calculating the CCLM parameter, and in the case of the chroma block of 32×32 size, 128 comparison operations are required. That is, as the size of the chroma block is increased, an amount of operation required for calculating the CCLM parameter is increased rapidly, and this may cause a delay problem in hardware implementation. Particularly, since the CCLM parameter should be derived through the calculation even in the decoding apparatus, this may be connected to a delay problem in hardware implementation of the decoding apparatus and an increase of implementation cost.

Specifically, in order to solve the problem of the increase of CCLM parameter operation amount according to the increase of the block size of the chroma block, the present embodiment proposes a scheme for adaptively configuring a pixel selection upper limit Nth. Further, in the case that N=2 (here, N is a smaller value between a width and a height of a chroma block), in order to prevent the worst case operation (a case in which CCLM prediction is performed for all chroma blocks, after all chroma blocks in a CTU are divided into 2×2 size) occurred in CCLM prediction for a chroma block of 2×2 size, the present embodiment may propose a method for adaptively configuring the $N_{th}$, and through this, an amount of operation for CCLM parameter calculation in the worst case may be reduced by about 50%.

Method 1 in the present embodiment (proposed method 1)
In the case that N<=2 in the current chroma block of N×M size or M×N size (here, e.g., N<=M), the $N_{th}$ may be set to 1 ($N_{th}$=1).
In the case that N=4 in the current chroma block of N×M size or M×N size (here, e.g., N<=M), the $N_{th}$ may be set to 2 ($N_{th}$=2).
In the case that N>4 in the current chroma block of N×M size or M×N size (here, e.g., N<=M), the $N_{th}$ may be set to 4 ($N_{th}$=4).

Alternatively, for example, according to the present embodiment, the $N_{th}$ may be adaptively configured to a block size as follows.

Method 2 in the present embodiment (proposed method 2)
In the case that N=2 in the current chroma block of N×M size or M×N size (here, e.g., N<=M), the $N_{th}$ may be set to 1 ($N_{th}$=1).
In the case that N=4 in the current chroma block of N×M size or M×N size (here, e.g., N<=M), the $N_{th}$ may be set to 2 ($N_{th}$=2).

Further, for example, according to the present embodiment, the $N_{th}$ may be adaptively configured to the block size as follows.

Method 3 in the present embodiment (proposed method 3)
In the case that N>4 in the current chroma block of N×M size or M×N size (here, e.g., N<=M), the $N_{th}$ may be set to 4 ($N_{th}$=4).

Alternatively, for example, according to the present embodiment, the $N_{th}$ may be adaptively configured to the block size as follows.

Method 4 in the present embodiment (proposed method 4)
In the case that N>2 in the current chroma block of N×M size or M×N size (here, e.g., N<=M), the $N_{th}$ may be set to 2 ($N_{th}$=2).

Alternatively, for example, according to the present embodiment, the $N_{th}$ may be adaptively configured to the block size as follows.

Method 5 in the present embodiment (proposed method 5)
The $N_{th}$ is configured to N/2 in the current chroma block of N×M size or M×N size (here, e.g., N<=M) ($N_{th}$=N/2).

In the above methods, N=2 means that the total number of pixels for calculating the CCLM parameter is 4 (2N), and $N_{th}$=1 means that only two (2*$N_{th}$) pixels are used to calculate the CCLM parameter. Further, N=4 means that the total number of pixels for calculating the CCLM parameter is 8 (2N), and $N_{th}$=2 means that only four (2$N_{th}$) pixels are used to calculate the CCLM parameter.

In method 1, in the case of using four pixels (in the case of using the existing CCLM of 2×N and N×2, and in the LM_A mode of 2×N and in the LM_L mode of N×2 in the case of MDLM), it is possible to reduce the comparison operations by half in the worst case by using a half of the pixels. Further, in the case of using eight pixels (in the case of using the existing CCLM of 4×N and N×4, and in the LM_A mode of 4×N and in the LM_L mode of N×4 in the case of MDLM), it is possible to greatly reduce an amount of comparison operation by using the half of the pixels, and even in the case of using more pixels, it is possible to perform the CCLM parameter operation by using only up to 8 pixels.

In method 2, in the case of using four pixels (in the case of using the existing CCLM of 2×N and N×2, and in the LM_A mode of 2×N and in the LM_L mode of N×2 in the case of MDLM), it is possible to reduce the comparison operations by half in the worst case by using the half of the pixels, and even in the case of using more pixels, it is possible to perform the CCLM parameter operation by using only up to 4 pixels.

Method 3 can perform the CCLM parameter operation using only up to 8 pixels, and method 4 can perform the CCLM parameter operation using only up to 4 pixels. That is, in method 4, the CCLM parameter is calculated using only 4 pixels in all blocks.

Method 1 to method 5 described above in the present embodiment may reduce the complexity of the worst case by about 50% in the case that N=2, and since the $N_{th}$ can be adaptively applied to each chroma block size, an encoding loss can be minimized.

As described above, the number of pixels optimized to the block size can be selected by adaptively configuring the $N_{th}$ to the block size, and after the $N_{th}$ is configured, the CCLM parameter can be calculated by selecting the chroma block neighboring pixels as shown in FIGS. 9 and 10. Table 26 shows an amount of CCLM parameter calculation operation according to the chroma block size in the case of applying the embodiment.

As illustrated in Table 26 above, in the case of using methods proposed in the present embodiment, it can be seen that the operation amount required for the CCLM parameter calculation is not increased even though the block size is increased.

Next table represents data of the experimental results of method 1 and method 2 proposed in the present embodiment.

TABLE 27

| | All Intra Main10 | | | | |
| --- | --- | --- | --- | --- | --- |
| | Over VTM-3.0rc1 | | | | |
| | Y | U | V | EncT | DecT |
| Class A1 | −0.05% | −0.27% | −0.43% | 99% | 99% |
| Class A2 | 0.01% | 0.05% | 0.06% | 100% | 99% |
| Class B | 0.00% | −0.24% | −0.32% | 99% | 98% |
| Class C | −0.04% | −0.05% | −0.03% | 97% | 91% |
| Class E | −0.02% | −0.04% | −0.06% | 98% | 95% |
| Overall | −0.02% | −0.12% | −0.17% | 99% | 96% |
| Class D | 0.02% | 0.07% | 0.00% | 98% | 97% |

TABLE 28

| | All Intra Main10 | | | | |
| --- | --- | --- | --- | --- | --- |
| | Over VTM-3.0rc1 | | | | |
| | Y | U | V | EncT | DecT |
| Class A1 | 0.01% | −0.02% | −0.13% | 99% | 99% |
| Class A2 | 0.07% | 0.42% | 0.24% | 98% | 97% |
| Class B | 0.03% | −0.10% | −0.15% | 98% | 96% |
| Class C | −0.01% | 0.17% | 0.12% | 98% | 93% |
| Class E | −0.02% | 0.10% | −0.02% | 93% | 97% |
| Overall | 0.02% | 0.09% | 0.00% | 98% | 96% |
| Class D | 0.03% | 0.22% | 0.25% | 98% | 99% |

Referring to Table 27 above, it can be seen that the encoding efficiency is little changed although the CCLM parameter calculation operation amount is reduced ($N_{th}$=1, 2, 4). Rather, performance gains (Y 0.02%, Cb 0.12%, and Cr 0.07%) for respective components can be obtained. Further, it can be confirmed that the encoding and decoding complexities are reduced to 99% and 96%, respectively.

Further, even in the case of greatly reducing the CCLM parameter calculation operation amount through method 2 proposed as in Table 28 (Nth=1,2), it can be confirmed that the encoding efficiency is little changed and the encoding and decoding complexities are reduced to 99% and 96%, respectively.

Meanwhile, the TH may be derived as a predetermined value in the encoding apparatus and the decoding apparatus

TABLE 26

| | | Number of comparison operations | | | | |
| --- | --- | --- | --- | --- | --- | --- |
| Block size | Original CCLM | Proposed method 1 ($N_{th}$ = 1, 2, 4) | Proposed method 2 ($N_{th}$ = 1, 2) | Proposed method 3 ($N_{th}$ = 4) | Proposed method 4 ($N_{th}$ = 2) | Proposed method 5 ($N_{th}$ = N/2) |
| N = 2 | 8 | 4 | 4 | 8 | 8 | 4 |
| N = 4 | 16 | 8 | 8 | 16 | 8 | 8 |
| N = 8 | 32 | 16 | 8 | 16 | 8 | 16 |
| N = 16 | 64 | 16 | 8 | 16 | 8 | 32 |
| N = 32 | 128 | 16 | 8 | 16 | 8 | 64 | without the necessity of transmitting additional information representing the TH. Further, the additional information representing the TH may be transmitted in a unit of CU, slice, picture or sequence, and the TH may be derived based on the additional information representing the TH. The additional information representing the TH may represent the TH value.

For example, in the case that the additional information representing the TH in a unit of CU is transmitted, a scheme may be proposed for parsing a syntax element cclm_reduced_smaple_flag as in the contents to be described later and performing a CCLM parameter calculation process when an intra prediction mode of the current chroma block is the CCLM mode. The cclm_reduced_smaple_flag may represent the syntax element of the CCLM reduced sample flag.

In the case that the cclm_reduced_sample_flag is 0 (false), the $N_{th}$ is set to $N_{th}=4$ with respect to all blocks, and the CCLM parameter calculation is performed through the neighboring sample selection scheme of the embodiment proposed in FIGS. 9 and 10 above.

In the case that the cclm_reduced_sample_flag is 1 (true), the proposed method 1 ($N_{th}=1, 2$) is configured, and the CCLM parameter calculation is performed through the neighboring sample selection scheme proposed in the present embodiment.

Further, in the case that information representing a method that is applied in a unit of slice, picture, or sequence is transmitted, an applied method among method 1 to method 5 may be selected based on the information being transmitted through high level syntax (HLS) to be described later, and the CCLM parameter may be calculated based on the selected method.

For example, information representing the applied method being signaled through a slice header may be represented as the following table.

TABLE 29

| slice_header( ) { | Descriptor |
|---|---|
| ... | |
| cclm_reduced_sample_threshold | f(2) |
| ... | | cclm_reduced_sample_threshold may represent a syntax element of the information representing the applied method.

Alternatively, for example, the information representing the applied method being signaled through a picture parameter set (PPS) may be represented as the following table.

TABLE 30

| pic_parameter_set_rbsp( ) { | Descriptor |
|---|---|
| ... | |
| cclm_reduced_sample_threshold | f(2) |
| ... | |

Alternatively, for example, the information representing the applied method being signaled through a sequence parameter set (SPS) may be represented as the following table.

TABLE 31

| sps_parameter_set_rbsp( ) { | Descriptor |
|---|---|
| ... | |
| cclm_reduced_sample_threshold | f(2) |
| ... | |

The method selected based on the cclm_reduced_sample_threshold value (i.e., a value derived by decoding the cclm_reduced_sample_threshold) transmitted through the slice header, the PPS or the SPS may be derived as represented in the following table.

TABLE 32

| cclm_reduced_sample_threshold | Proposed method |
|---|---|
| 0 | 1 ($N_{th}$ = 1,2,4) |
| 1 | 2 ($N_{th}$ = 1,2) |
| 2 | 3 ($N_{th}$ = 4) |
| 3 | 4 ($N_{th}$ = 2) |
| 4 | 5 ($N_{th}$ = N/2) |

Referring to Table 32, in the case that the cclm_reduced_sample_threshold value is 0, the method being applied to the current chroma block may be selected as the method 1, and in the case that the cclm_reduced_sample_threshold value is 1, the method being applied to the current chroma block may be selected as the method 2. In the case that the cclm_reduced_sample_threshold value is 2, the method being applied to the current chroma block may be selected as the method 3, and in the case that the cclm_reduced_ sample_ threshold value is 3, the method being applied to the current chroma block may be selected as the method 4. In the case that the cclm_reduced_sample_threshold value is 4, the method being applied to the current chroma block may be selected as the method 5.

The method proposed in the present embodiment may be used in a CCLM mode that is an intra prediction mode for a chroma component, and a chroma block predicted through the CCLM mode may be used for an encoding apparatus to derive a residual image through a difference from the original image, or may be used for a decoding apparatus to derive a reconstructed image through the sum with a residual signal.

Meanwhile, in the case that the information representing one of the above-described methods is transmitted in a unit of CU, slice, picture and sequence, the encoding apparatus may determine one of the methods 1 to 5, and then may transmit the information to the decoding apparatus as follows.

In the case that the information representing whether the method of the above-described embodiment is applied is transmitted in a unit of CU, when the intra prediction mode for the current chroma block is the CCLM mode (i.e., in the case that the CCLM prediction is applied to the current chroma block), the encoding apparatus may determine a side of good encoding efficiency between two following cases through RDO and transmit information on the determined method to the decoding apparatus.

1) In the case that the encoding efficiency is good when a CCLM parameter calculation is performed through the neighboring sample selection scheme of the embodiment proposed in FIGS. 9 and 10 as described above in a state where the $N_{th}$ is set to $N_{th}=4$, the cclm_reduced_sample_flag of value 0 (false) for all blocks is transmitted.

2) In the case that the encoding efficiency is good when the CCLM parameter calculation is performed through the neighboring sample selection scheme proposed in the present embodiment in a state where the method 2 ($N_{th}$=1, 2) is applied, the cclm_reduced_sample_flag of value 1 (true) is transmitted.

Further, in the case that the information representing whether the method of the above-described embodiment is applied is transmitted in a unit of slice, picture, or sequence, the encoding apparatus may transmit the information representing one of the above-described methods by adding the high level syntax (HLS) as in Table 29, Table 30, or Table 31 as described above. The encoding apparatus may configure the applied method among the above-described methods in consideration of the size of an input image or to meet an encoding target bitrate.

1) For example, in the case that an input image is HD quality or more, the encoding apparatus may apply the method 1 ($N_{th}$=1, 2, 4), and in the case that the input image is the HD quality or less, the encoding apparatus may apply the method 2 ($N_{th}$=1, 2).

2) In the case that image encoding of high quality is required, the encoding apparatus may apply the method 3 ($N_{th}$=4), and in the case that the image encoding of low quality is required, the encoding apparatus may apply the method 4 ($N_{th}$=2).

FIGS. 23 to 27 are diagrams explaining a process of performing CCLM/MDLM prediction based on CCLM/MDLM parameters derived according to the methods proposed in the above-described embodiments.

Figure 23:
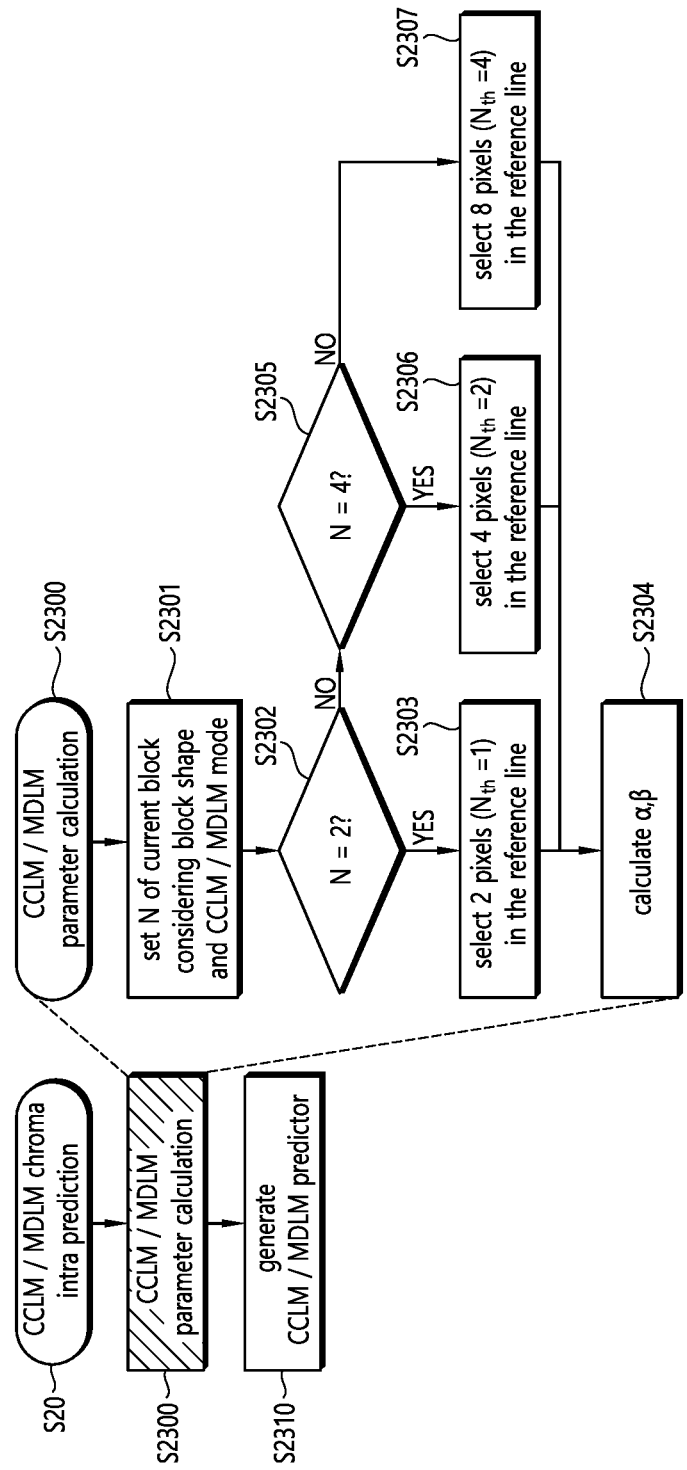
FIG. 23 is a diagram explaining a process of performing CCLM/MDLM prediction based on CCLM/MDLM parameters of a current chroma block according to a proposed method 1 according to an example of the present disclosure.

FIG. 23 illustrates a method for operating CCLM/MDLM parameters by a proposed method 1.

Referring to FIG. 23, the encoding apparatus/decoding apparatus may calculate CCLM/MDLM parameters for the current block (S2300). Such a method for calculating the CCLM/MDLM parameters may be described in more detail.

The encoding apparatus/decoding apparatus may set N of the current chroma block in consideration of a block shape and CCLM/MDLM mode (S2301), and may determine whether the N is equal to 2 (N=2) (S2302).

If the N is equal to 2, the encoding apparatus/decoding apparatus may select two neighboring samples in a reference line adjacent to the current block as reference samples for the CCLM/MDLM parameter calculation (S2303). Here, the $N_{th}$ may be 1 ($N_{th}$=1).

The encoding apparatus/decoding apparatus may derive parameters α and β for the CCLM/MDLM prediction based on the selected reference samples (S2304).

Meanwhile, if the N is not equal to 2, the encoding apparatus/decoding apparatus may determine whether the N is equal to 4 (N=4) (S2305).

If the N is equal to 4, the encoding apparatus/decoding apparatus may select four neighboring samples in the reference line adjacent to the current block as reference samples for the CCLM/MDLM parameter calculation (S2306). Here, the $N_{th}$ may be 2 ($N_{th}$=2). Thereafter, the encoding apparatus/decoding apparatus may derive the parameters α and β for the CCLM/MDLM prediction based on the selected reference samples (S2304).

Alternatively, if the N is not equal to 4, the encoding apparatus/decoding apparatus may select 8 neighboring samples in the reference line adjacent to the current block as reference samples for the CCLM/MDLM parameter calculation (S2307). Here, the $N_{th}$ may be 4 ($N_{th}$=4). Thereafter, the encoding apparatus/decoding apparatus may derive the parameters α and β for the CCLM/MDLM prediction based on the selected reference samples (S2304).

In the case that the parameters for the CCLM/MDLM prediction for the current chroma block have been calculated, the encoding apparatus/decoding apparatus may generate a prediction sample for the current chroma block by performing the CCLM/MDLM prediction based on the parameters (S2310). For example, the encoding apparatus/decoding apparatus may generate the prediction sample for the current chroma block based on the above-described Equation 1 in which the calculated parameters and reconstructed samples of the current luma block for the current chroma block are used.

Figure 24:
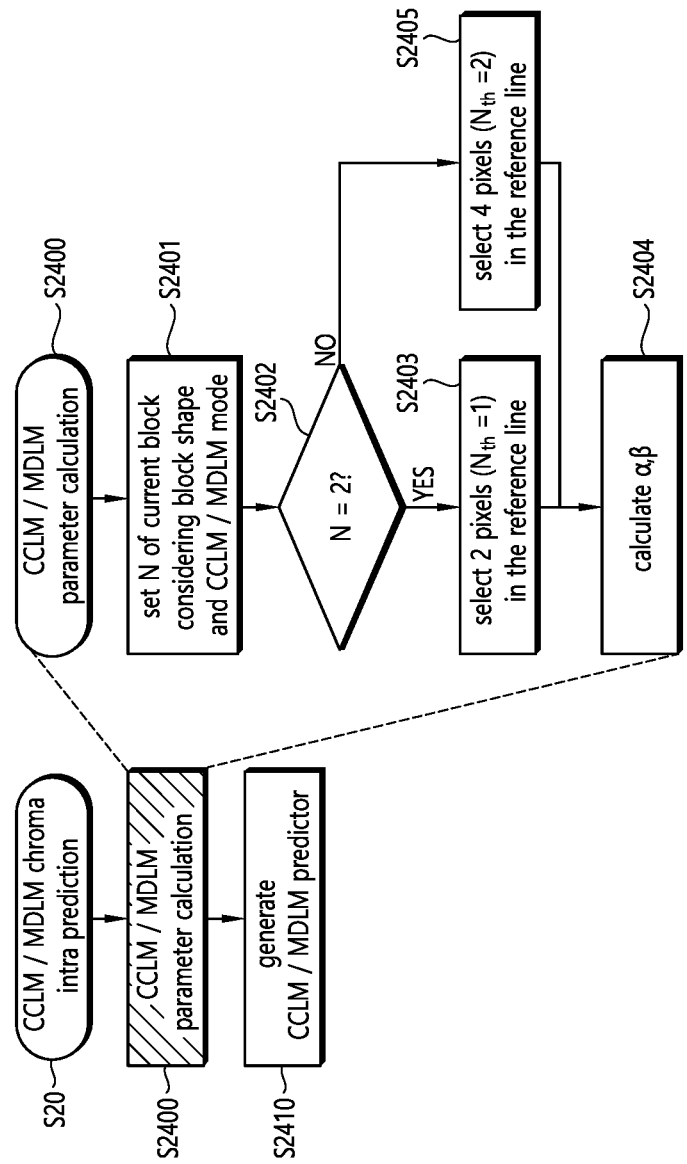
FIG. 24 is a diagram explaining a process of performing CCLM/MDLM prediction based on CCLM/MDLM parameters of a current chroma block according to a proposed method 2 according to an example of the present disclosure.

FIG. 24 illustrates a method for operating CCLM/MDLM parameters by a proposed method 2.

Referring to FIG. 24, the encoding apparatus/decoding apparatus may calculate CCLM/MDLM parameters for the current block (S2400). Such a method for calculating the CCLM/MDLM parameters may be described in more detail.

The encoding apparatus/decoding apparatus may set N of the current chroma block in consideration of a block shape and CCLM/MDLM mode (S2401), and may determine whether the N is equal to 2 (N=2) (S2402).

If the N is equal to 2, the encoding apparatus/decoding apparatus may select two neighboring samples in a reference line adjacent to the current block as reference samples for the CCLM/MDLM parameter calculation (S2403). Here, the $N_{th}$ may be 1 ($N_{th}$=1).

The encoding apparatus/decoding apparatus may derive parameters α and β for the CCLM/MDLM prediction based on the selected reference samples (S2404).

Meanwhile, if the N is not equal to 2, the encoding apparatus/decoding apparatus may select four neighboring samples in the reference line adjacent to the current block as reference samples for the CCLM/MDLM parameter calculation (S2405). Here, the $N_{th}$ may be 2 ($N_{th}$=2). Thereafter, the encoding apparatus/decoding apparatus may derive the parameters α and β for the CCLM/MDLM prediction based on the selected reference samples (S2404).

In the case that the parameters for the CCLM/MDLM prediction for the current chroma block have been calculated, the encoding apparatus/decoding apparatus may generate a prediction sample for the current chroma block by performing the CCLM/MDLM prediction based on the parameters (S2410).

Figure 25:
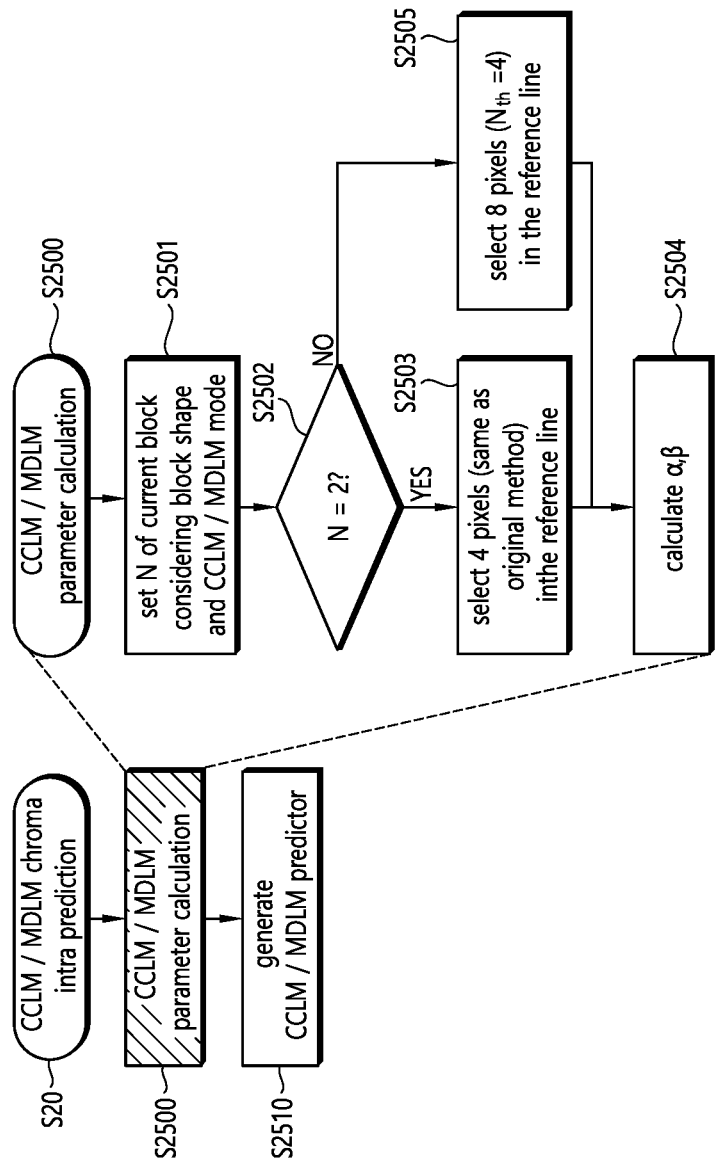
FIG. 25 is a diagram explaining a process of performing CCLM/MDLM prediction based on CCLM/MDLM parameters of a current chroma block according to a proposed method 3 according to an example of the present disclosure.

FIG. 25 illustrates a method for operating CCLM/MDLM parameters by a proposed method 3

Referring to FIG. 25, the encoding apparatus/decoding apparatus may calculate CCLM/MDLM parameters for the current block (S2500). Such a method for calculating the CCLM/MDLM parameters may be described in more detail.

The encoding apparatus/decoding apparatus may set N of the current chroma block in consideration of a block shape and CCLM/MDLM mode (S2501), and may determine whether the N is equal to 2 (N=2) (S2502).

If the N is equal to 2, the encoding apparatus/decoding apparatus may select four neighboring samples in a reference line adjacent to the current block as reference samples for the CCLM/MDLM parameter calculation (S2503). This is the same as the reference sample derivation in the existing method.

The encoding apparatus/decoding apparatus may derive parameters α and β for the CCLM/MDLM prediction based on the selected reference samples (S2504).

Meanwhile, if the N is not equal to 2, the encoding apparatus/decoding apparatus may select 8 neighboring samples in the reference line adjacent to the current block as reference samples for the CCLM/MDLM parameter calculation (S2505). Here, the $N_{th}$ may be 4 ($N_{th}$=4). Thereafter, the encoding apparatus/decoding apparatus may derive the parameters α and β for the CCLM/MDLM prediction based on the selected reference samples (S2504).

In the case that the parameters for the CCLM/MDLM prediction for the current chroma block have been calculated, the encoding apparatus/decoding apparatus may generate a prediction sample for the current chroma block by performing the CCLM/MDLM prediction based on the parameters (S2510).

Figure 26:
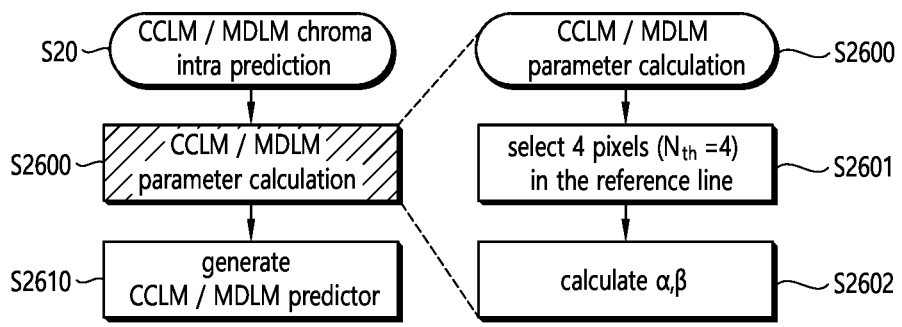
FIG. 26 is a diagram explaining a process of performing CCLM/MDLM prediction based on CCLM/MDLM parameters of a current chroma block according to a proposed method 4 according to an example of the present disclosure.

FIG. 26 illustrates a method for operating CCLM/MDLM parameters by a proposed method 3.

Referring to FIG. 26, the encoding apparatus/decoding apparatus may calculate CCLM/MDLM parameters for the current block (S2600). Such a method for calculating the CCLM/MDLM parameters may be described in more detail.

The encoding apparatus/decoding apparatus may select four neighboring samples in a reference line adjacent to the current block as reference samples for the CCLM/MDLM parameter calculation (S2601). Here, the $N_{th}$ may be 4 ($N_{th}$=4).

The encoding apparatus/decoding apparatus may derive parameters α and β for the CCLM/MDLM prediction based on the selected reference samples (S2602).

In the case that the parameters for the CCLM/MDLM prediction for the current chroma block have been calculated, the encoding apparatus/decoding apparatus may generate a prediction sample for the current chroma block by performing the CCLM/MDLM prediction based on the parameters (S2610).

Figure 27:
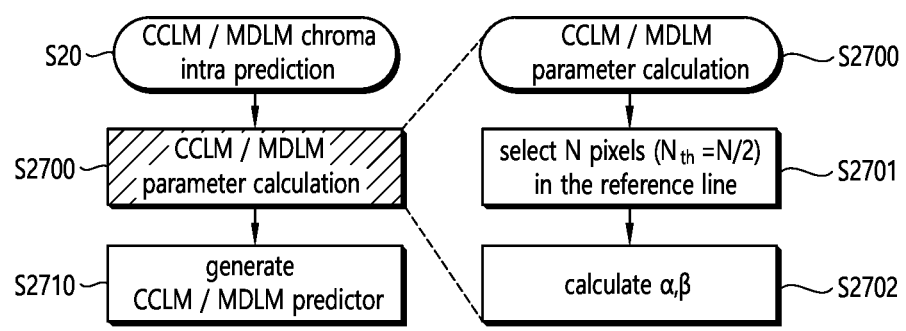
FIG. 27 is a diagram explaining a process of performing CCLM/MDLM prediction based on CCLM/MDLM parameters of a current chroma block according to a proposed method 5 according to an example of the present disclosure.

FIG. 27 illustrates a method for operating CCLM/MDLM parameters by a proposed method 3.

Referring to FIG. 27, the encoding apparatus/decoding apparatus may calculate CCLM/MDLM parameters for the current block (S2700). Such a method for calculating the CCLM/MDLM parameters may be described in more detail.

The encoding apparatus/decoding apparatus may select N neighboring samples in a reference line adjacent to the current block as reference samples for the CCLM/MDLM parameter calculation (S2701). Here, the $N_{th}$ may be N/2 ($N_{th}$=N/2).

The encoding apparatus/decoding apparatus may derive parameters α and β for the CCLM/MDLM prediction based on the selected reference samples (S2702).

In the case that the parameters for the CCLM/MDLM prediction for the current chroma block have been calculated, the encoding apparatus/decoding apparatus may generate a prediction sample for the current chroma block by performing the CCLM/MDLM prediction based on the parameters (S2710).

Meanwhile, according to an example, in order to solve the complexity of the existing CCLM parameter calculation, the following simplified CCLM parameter calculation method may be proposed.

1. In the case of downsampling the current luma block neighboring reference sample, luma reference samples of fixed position are selected without using a filter.

2. The CCLM parameter is calculated using a smaller number of reference samples through adaptive selection of the selected chroma block and the luma block reference samples.

3. In calculating the CCLM parameter, the maximum and minimum values of the selected luma block reference sample are obtained, and then the maximum and minimum luma sample values are compensated for using samples neighboring the corresponding luma samples (maximum and minimum value luma samples) through the downsampling filter.

4. The CCLM parameters α and β are calculated using the maximum and minimum neighboring reference sample pair (luma and chroma) values derived through the third method.

According to the method proposed in the present embodiment, since downsampling of a luma block is performed always at 2 sample positions, the downsampling operation amount can be reduced at least a half and up to the extent of 1/32 as compared with the existing method. Further, through adaptive selection of chroma block and luma block reference samples, the comparison operation amount can be reduced at least a half and up to the extent of 1/8 as compared with the existing method, and thus an encoding loss can be minimized due to reduction of the operation amount.

Next, a method proposed in the present embodiment will be described in detail.

1. In the case of downsampling the luma block neighboring reference sample, luma reference samples of fixed positions are selected without using a filter (step 1).

In the present step 1, different from the selection of the luma block through the existing downsampling filter, the downsampling of the luma reference sample can be simply performed using the equation below.

$Rec'_L(x,y) = Rec_L(2x,2y)$ $Rec'_L(x,y) = Rec_L(2x+1,2y)$ $Rec'_L(x,y) = Rec_L(2x,2y+1)$ $Rec'_L(x,y) = Rec_L(2x+1,2y+1)$ [Equation 7]

Figure 28:
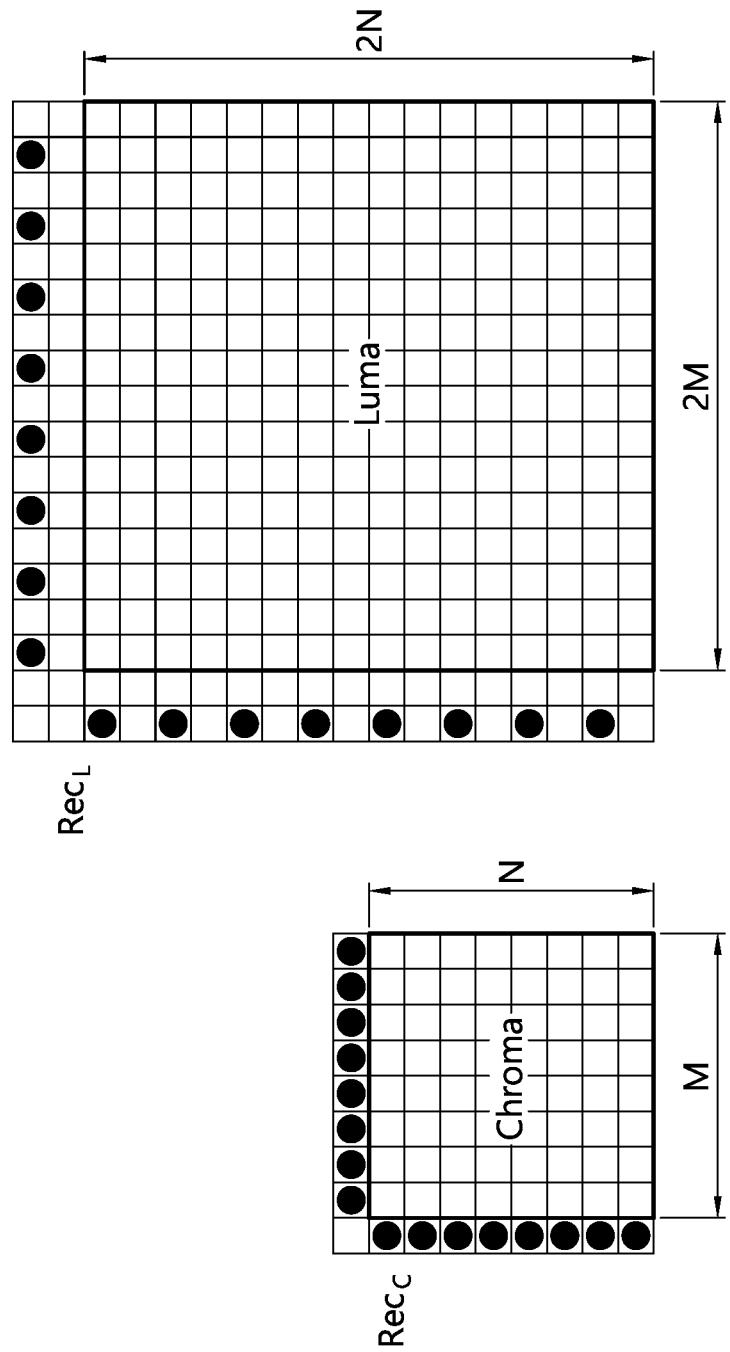
FIG. 28 illustrates luma reference samples selected according to an embodiment.

FIG. 28 illustrates luma reference samples selected according to an embodiment.

As illustrated, according to the present embodiment, a CCLM parameter can be calculated using only samples of specific positions without performing an operation for downsampling. FIG. 28 illustrates a method for performing downsampling of a luma block using Equation 7 in a 4:2:0 color format image, that is, a method for selecting luma reference samples.

2. The CCLM parameter is calculated using a smaller number of reference samples through adaptive selection of the selected chroma block and luma block reference samples (step 2).

In the present step, it is proposed to adaptively select the reference samples and to adaptively select the sampling positions using all embodiments as described above.

As an example, in the case of applying the method of FIG. 27, the CCLM parameter prediction can be performed using only a half of the reference samples. Further, in the case of applying the method of FIG. 23, the CCLM parameter prediction can be performed using a half of the reference samples and up to 8 sample pairs. Further, in the case of using the method of FIG. 22, the reference sample of the last position can be selected during sampling of the reference samples.

3. In calculating the CCLM parameter, the maximum and minimum values of the selected luma block reference sample are obtained, and then the maximum and minimum luma sample values are compensated for through a downsampling filter using neighboring samples of the corresponding luma sample (maximum and minimum value luma sample) (step 3).

The present step proposes to select the minimum and maximum luma sample and the corresponding chroma sample through comparison operation of the previously selected reference samples, and then to perform luma value compensation in the same method as the existing luma reference sample downsampling using neighboring luma samples of the selected luma sample position.

Figure 29:
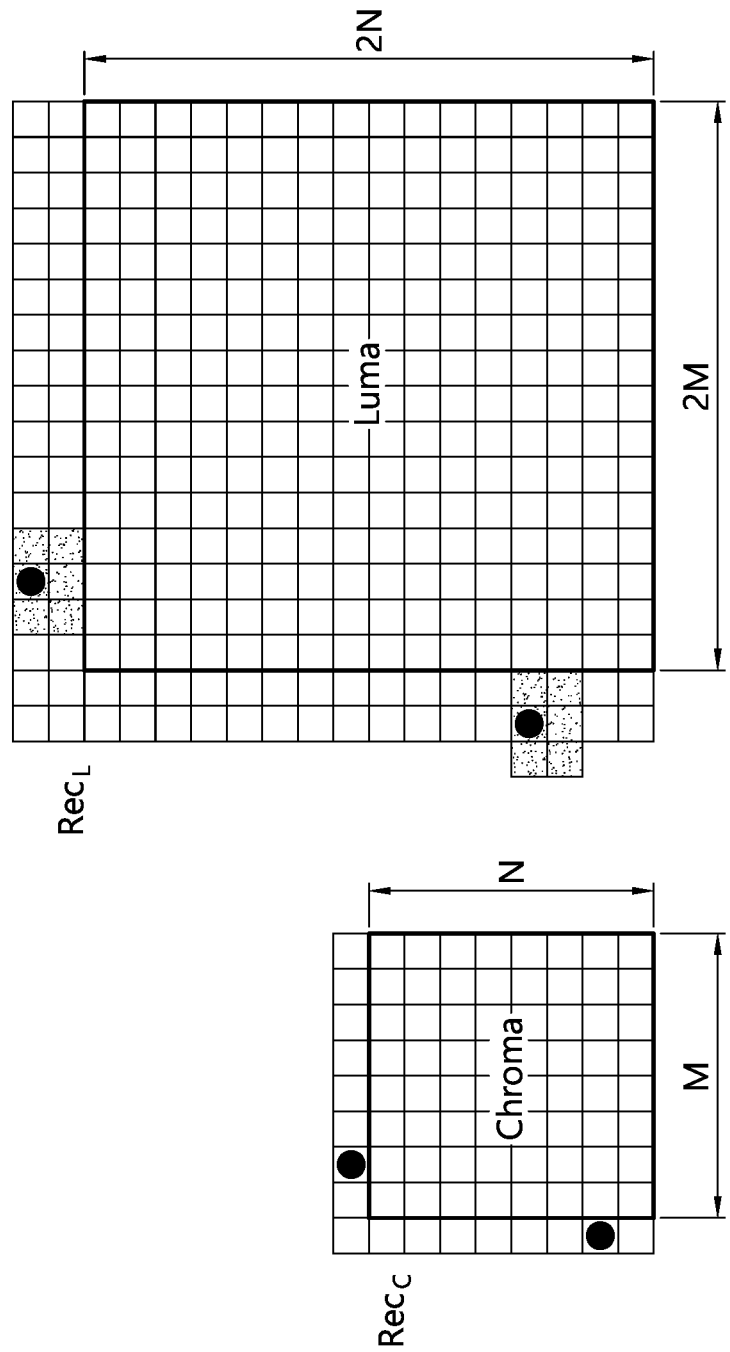
FIG. 29 illustrates maximum and minimum sample pairs selected according to an embodiment.

FIG. 29 illustrates maximum and minimum sample pairs selected according to an embodiment, and illustrates the maximum and minimum sample pairs selected from the example of FIG. 28.

That is, as shown in FIG. 29, after two luma pixels and the corresponding chroma pixels are selected through the comparison operation (the maximum and minimum values of neighboring reference luma samples), filtering may be performed using 6 samples around the original position of the selected luma sample. In other words, luma sample compensation may be performed in the same method as the existing luma reference sample downsampling method as in the equation below.

$$Rec'_L(x,y) = (2 \times Rec_L(2x,2y) + 2 \times Rec_L(2x,2y+1) + Rec_L(2x-1.2y) + Rec_L(2x+1.2y) + Rec_L(2x-1.2y+1) + Rec_L(2x+1.2y+1) + 4) >> 3$$
[Equation 8]

4. The CCLM parameters α and β are calculated using values of the maximum and minimum sample pairs (luma and corresponding chroma samples) obtained through the step 3 (step 4).

According to this step, the CCLM parameters α and β can be calculated in the same method as the existing one using two luma samples compensated for through the step 3 and the corresponding chroma sample values.

Figure 30:
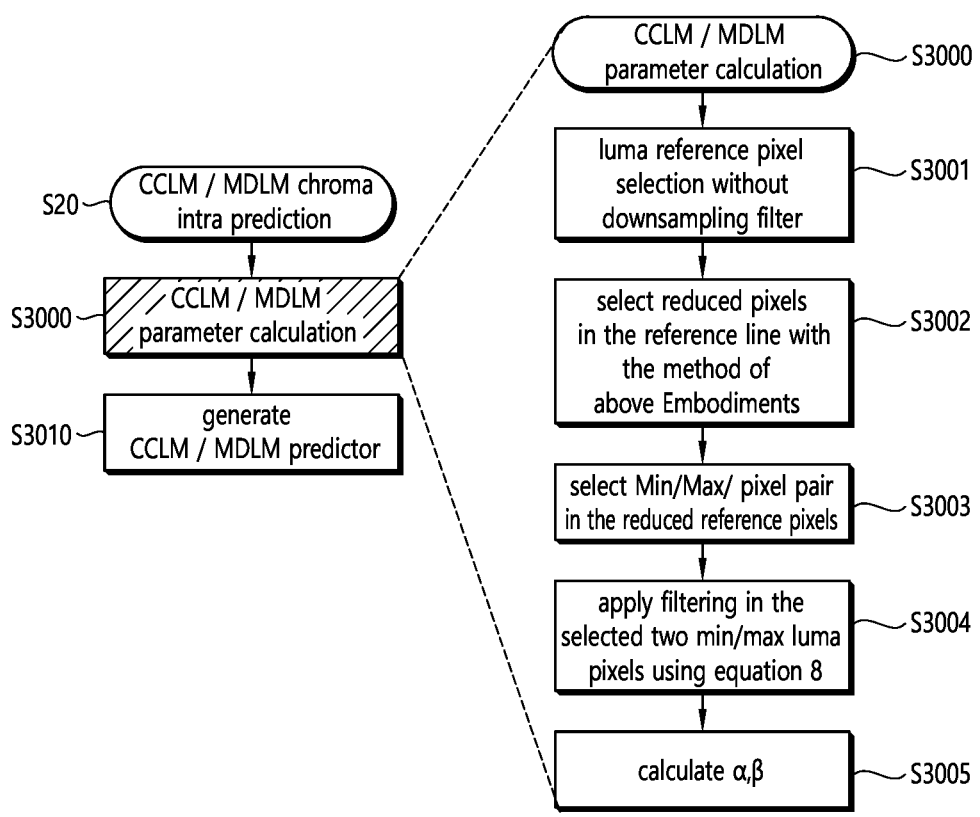
FIG. 30 is a diagram explaining a process of performing CCLM/MDLM prediction based on CCLM/MDLM parameters of a current chroma block according to a proposed method according to another example of the present disclosure.

FIG. 30 is a diagram explaining a process of performing CCLM/MDLM prediction based on CCLM/MDLM parameters of the current chroma block according to a method proposed according to another example of the present disclosure.

Referring to FIG. 30, the encoding apparatus/decoding apparatus may calculate CCLM/MDLM parameters for the current block (S3000). Such a method for calculating the CCLM/MDLM parameters may be described in more detail.

The encoding apparatus/decoding apparatus may select luma reference pixels without downsampling filtering (S3001).

Thereafter, the encoding apparatus/decoding apparatus may select reduced samples (pixels) in a reference line according to various embodiments (e.g., methods described with reference to FIGS. 9 to 27) described in the present disclosure (S3002).

Thereafter, the encoding apparatus/decoding apparatus may select the maximum and minimum sample pairs from the reduced reference pixels (S3003).

The encoding apparatus/decoding apparatus may perform filtering of the two maximum and minimum luma samples selected using Equation 8 (S3004), and may derive the parameters α and β for the CCLM/MDLM prediction based on the selected reference samples (S3005).

In the case that the parameters for the CCLM/MDLM prediction for the current chroma block have been calculated, the encoding apparatus/decoding apparatus may generate prediction samples for the current chroma block by performing the CCLM/MDLM prediction based on the parameters (S3010).

Hereafter, a method for solving a hardware implementation complexity problem during chroma intra prediction through CCLM, specifically, a method for efficiently selecting luma and chroma pixels (or samples) being used during the CCLM parameter calculation, may be proposed.

Through this, it is possible to minimize coding efficiency reduction while reducing the CCLM parameter calculation complexity.

Specifically, a first test for reducing the number of reference samples for calculating the CCLM parameters and a second test in which a half of reference samples are used for the CCLM parameters may be explained, and in the second test, the maximum value of the pixel was limited to 8 in addition to the first test. In both the two tests, the number of reference sample pairs used for the CCLM parameter determination was reduced to a half of the worst case, and thus the luma downsampling process and the pixel comparison operation complexity were reduced by a half.

As the result of the first test, the BDR was represented as Y 0.00%, Cb 0.07%, Cr 0.03% in all intra configuration, and as the result of the second test, the BDR was represented as Y 0.00%, Cb 0.04%, Cr 0.01% in all intra configuration.

According to the proposed method, since a half of the reference samples were used for the CCLM and MDLM in determining the CCLM parameter, the operation complexity could be remarkably reduced, and in particular, as shown in Table 33, the maximum value of the reference sample pairs was limited to 8 in the second test.

Further, in the proposed embodiment, the number of reference sample pairs for the CCLM parameter, for example, in the case of 2×2 block, was reduced by a half in comparison with the worst case, and as shown in Table 34 and Table 35, this resulted in reduction of the downsampling process for the luma reference pixel derivation and the number of pixel comparison operations for the CCLM parameter derivation.

TABLE 33

| Chroma block size | PROIR | TEST 1 | TEST 2 |
|---|---|---|---|
| 2 × n/n × 2 | 4 | 2 | 2 |
| 4 × n/n × 4 (n >= 4) | 8 | 4 | 4 |
| 8 × n/n × 8 (n >= 8) | 16 | 8 | 8 |
| 16 × n/n × 16 (n >= 16) | 32 | 16 | 8 |
| 32 × 32 | 64 | 32 | 8 |

TABLE 34

| Chroma block size | PROIR | TEST 1 | TEST 2 |
|---|---|---|---|
| 2 × n/n × 2 | 4 | 2 | 2 |
| 4 × n/n × 4 (n >= 4) | 8 | 4 | 4 |
| 8 × n/n × 8 (n >= 8) | 16 | 8 | 8 |
| 16 × n/n × 16 (n >= 16) | 32 | 16 | 8 |
| 32 × 32 | 64 | 32 | 8 |

TABLE 35

| Chroma block size | PROIR | TEST 1 | TEST 2 |
|---|---|---|---|
| 2 × n/n × 2 | 8 | 4 | 4 |
| 4 × n/n × 4 (n >= 4) | 16 | 8 | 8 |
| 8 × n/n × 8 (n >= 8) | 32 | 16 | 16 |
| 16 × n/n × 16 (n >= 16) | 64 | 32 | 16 |
| 32 × 32 | 128 | 64 | 16 |

The result of the first test is represented in Table 36 and Table 37, and the result of the second test is represented in Table 38 and Table 39.

TABLE 36

All Intra Main10

Over VTM-4.0

|  | Y | U | V | EncT | DecT |
|---|---|---|---|---|---|
| Class A1 | −0.03% | −0.05% | −0.11% | 100% | 100% |
| Class A2 | 0.04% | 0.27% | 0.11% | 100% | 99% |
| Class B | 0.00% | 0.00% | 0.04% | 101% | 101% |
| Class C | 0.02% | 0.12% | 0.17% | 100% | 101% |
| Class E | 0.00% | 0.07% | −0.08% | 100% | 101% |
| Overall | 0.00% | 0.07% | 0.03% | 100% | 100% |
| Class D | 0.01% | 0.26% | 0.19% | 101% | 104% |
| Class F | 0.07% | 0.22% | 0.17% | 101% | 100% |

TABLE 37

Random access Main10

Over VTM-4.0

|  | Y | U | V | EncT | DecT |
|---|---|---|---|---|---|
| Class A1 | 0.02% | −0.30% | −0.22% | 101% | 101% |
| Class A2 | 0.00% | 0.34% | 0.17% | 101% | 100% |
| Class B | −0.02% | 0.08% | −0.08% | 100% | 101% |
| Class C | 0.02% | 0.17% | −0.02% | 100% | 101% |
| Class E |  |  |  |  |  |
| Overall | 0.00% | 0.08% | −0.04% | 101% | 101% |
| Class D | 0.04% | −0.38% | 0.27% | 100% | 101% |
| Class F | 0.02% | 0.12% | 0.11% | 100% | 101% |

TABLE 38

All Intra Main10

Over VTM-4.0

|  | Y | U | V | EncT | DecT |
|---|---|---|---|---|---|
| Class A1 | −0.04% | −0.03% | −0.23% | 100% | 99% |
| Class A2 | 0.03% | 0.26% | 0.15% | 100% | 99% |
| Class B | 0.00% | −0.10% | −0.06% | 101% | 100% |
| Class C | 0.02% | 0.13% | 0.23% | 100% | 100% |
| Class E | 0.00% | −0.01% | −0.05% | 101% | 101% |
| Overall | 0.00% | 0.04% | 0.01% | 101% | 100% |
| Class D | 0.01% | 0.30% | 0.20% | 101% | 104% |
| Class F | 0.05% | 0.28% | 0.15% | 101% | 101% |

TABLE 39

Random access Main10

Over VTM-4.0

|  | Y | U | V | EncT | DecT |
|---|---|---|---|---|---|
| Cass A1 | 0.01% | −0.09% | −0.14% | 101% | 100% |
| Class A2 | 0.00% | 0.18% | 0.09% | 101% | 100% |
| Class B | −0.01% | −0.15% | −0.34% | 101% | 101% |
| Class C | 0.03% | 0.28% | 0.02% | 101% | 102% |
| Class E |  |  |  |  |  |
| Overall | 0.01% | 0.04% | −0.12% | 101% | 101% |
| Class D | 0.01% | −0.05% | 0.48% | 100% | 101% |
| Class F | 0.02% | 0.08% | 0.04% | 101% | 101% |

As shown in the above tables, in order to reduce the complexity of the CCLM parameter derivation, it is effective to limit the number of reference sample pairs during the CCLM parameter determination.

Table 40 and Table 41 below show an operation process according to the above-described embodiments.

[Table 40]

s5.1.1.1.1 Specification of INTRA_LT_CCLM, INTRA_L_CCLM and INTRA_T_CCLM Intra Prediction Mode Inputs to this process are:

the intra prediction mode predModeIntra, a sample location (xTbC, yTbC) of the top-left sample of the current transform block relative to the top-left sample of the current picture, a variable nTbW specifying the transform block width, a variable nTbH specifying the transform block height, chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

$$(xTbY, yTbY) = (xTbC<<1, yTbC<<1) \quad (8\text{-}155)$$

The variables availL, availT and availTL are derived as follows:

The availability of left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC) as inputs, and the output is assigned to availL.

The availability of top neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC, yTbC−1) as inputs, and the output is assigned to availT.

The availability of top-left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC−1) as inputs, and the output is assigned to availTL.

The number of available top-right neighbouring chroma samples numTopRight is derived as follows:

The variable numTopRight is set equal to 0 and availTR is set equal to TRUE.

When predModeIntra is equal to INTRA_T_CCLM, the following applies for x=nTbW . . . 2*nTbW−1 until availTR is equal to FALSE or x is equal to 2*nTbW−1:

The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC+x, yTbC−1) as inputs, and the output is assigned to availableTR When availableTR is equal to TRUE, numTopRight is incremented by one.

The number of available left-below neighbouring chroma samples numLeftBelow is derived as follows:

The variable numLeftBelow is set equal to 0 and availLB is set equal to TRUE.

When predModeIntra is equal to INTRA_L_CCLM, the following applies for y=nTbH . . . 2*nTbH−1 until availLB is equal to FALSE or y is equal to 2*nTbH−1:

The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC+y) as inputs, and the output is assigned to availableLB When availableLB is equal to TRUE, numLeftBelow is incremented by one.

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

$$\text{numSamp}T = \text{avail}T?nTbW:0 \qquad (8\text{-}156)$$

$$\text{numSamp}L = \text{avail}L?nTbH:0 \qquad (8\text{-}157)$$

Otherwise, the following applies:

$$\text{numSamp}T = (\text{avail}T\&\&\text{predModeIntra}==\text{INTRA\_T\_CCLM})? \\ (nTbW+\text{numTopRight}):0 \qquad (8\text{-}158)$$

$$\text{numSamp}L = (\text{avail}L\&\&\text{predModeIntra}==\text{INTRA\_L\_CCLM})? \\ (nTbH+\text{numLeftBelow}):0 \qquad (8\text{-}159)$$

The variable bCTUboundary is derived as follows:

$$bCTU\text{boundary}=(yTbC\&(1<<(Ctb\text{ Log }2\text{Size}Y-1)-1) \\ ==0)?\text{TRUE:FALSE}. \qquad (8\text{-}160)$$

The variable nS, xS, and yS are derived as follows:

If predModeIntra is equal to INTRA_LT_CCLM, the following applies:

$$nS=((\text{avail}L\&\&\text{avail}T)?\text{Min}(4,\text{Min}(nTbW,nTbH)>>1): \\ \text{Min}(8,(\text{avail}L?nTbH:nTbW)>>1)) \qquad (8\text{-xxx})$$

$$xS=\text{numSamp}T>>\text{Log }2(nS) \qquad (8\text{-xxx})$$

$$yS=\text{numSamp}L>>\text{Log }2(nS) \qquad (8\text{-xxx})$$

Otherwise if predModeIntra is equal to INTRA_L_CCLM, the following applies:

$$nS=\text{Min}(8,\text{numSamp}L>>1) \qquad (8\text{-xxx})$$

$$xS=2 \qquad (8\text{-xxx})$$

$$yS=nS>8?(\text{numSamp}L>>3):2 \qquad (8\text{-xxx})$$

Otherwise (predModeIntra is equal to INTRA_T_CCLM), the following applies:

$$nS=\text{Min}(8,\text{numSamp}T>>1) \qquad (8\text{-xxx})$$

$$xS=nS>8?(\text{numSamp}T>>3):2 \qquad (8\text{-xxx})$$

$$yS=2 \qquad (8\text{-xxx})$$

If nS is equal to 1 and availL && availT is equal to FALSE, the following applies:

$$nS=2 \qquad (8\text{-xxx})$$

$$xS=1 \qquad (8\text{-xxx})$$

$$yS=1 \qquad (8\text{-xxx})$$

The prediction samples predSamples[x][y] with x=0 . . . nTbW−1, y=0 . . . nTbH−1 are derived as follows:

If both numSampL and numSampT are equal to 0, the following applies:

$$\text{predSamples}[x][y]=1<<(\text{BitDepth}_C-1) \qquad (8\text{-}161)$$

Otherwise, the following ordered steps apply:

The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).

The neighbouring luma samples samples pY[x][y] are derived as follows:

When numSampL is greater than 0, the neighbouring left luma samples pY[x][y] with x=−1 . . . −3, y=0 . . . 2*numSampL−1, are set equal to the reconstructed luma samples prior to the deblocking filter process at the locations (xTbY+x, yTbY+y).

When numSampT is greater than 0, the neighbouring top luma samples pY[x][y] with x=0 . . . 2*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

The down-sampled collocated luma samples pDsY[x][y] with x=0 . . . nTbW−1, y=0 . . . nTbH−1 are derived as follows:

If sps_cclm_colocated_chroma_flag is equal to 1, the following applies: pDsY[x][y] with x=1 . . . nTbW−1, y=1 . . . nTbH−1 is derived as follows:

$$pDsY[x][y]=(pY[2*x][2*y-1]+pY[2*x-1][2*y]+4*pY \\ [2*x][2*y]+pY[2*x+1][2*y]+pY[2*x][2*y+1]+4) \\ >>3 \qquad (8\text{-}162)$$

If availL is equal to TRUE, pDsY[0][y] with y=1 . . . nTbH−1 is derived as follows:

$$pDsY[0][y]=(pY[0][2*y-1]+pY[-1][2*y]+4*pY[0] \\ [2*y]+pY[1][2*y]+pY[0][2*y+1]+4)>>3 \qquad (8\text{-}163)$$

Otherwise, pDsY[0][y] with y=1 . . . nTbH−1 is derived as follows:

$$pDsY[0][y]=(pY[0][2*y-1]+2*pY[0][2*y]+pY[0][2*y+ \\ 1]+2)>>2 \qquad (8\text{-}164)$$

If availT is equal to TRUE, pDsY[x][0] with x=1 . . . nTbW−1 is derived as follows:

$$pDsY[x][0]=(pY[2*x][-1]+pY[2*x-1][0]+4*pY[2*x] \\ [0]+pY[2*x+1][0]+pY[2*x][1]+4)>>3 \qquad (8\text{-}165)$$

Otherwise, pDsY[x][0] with x=1 . . . nTbW−1 is derived as follows:

$$pDsY[x][0]=(pY[2*x-1][0]+2*pY[2*x][0]+pY[2*x+1] \\ [0]+2)>>2 \qquad (8\text{-}166)$$

If availL is equal to TRUE and availT is equal to TRUE, pDsY[0][0] is derived as follows:

$$pDsY[0][0]=(pY[0][-1]+pY[-1][0]+4*pY[0][0]+pY[1] \\ [0]+pY[0][1]+4)>>3 \qquad (8\text{-}167)$$

Otherwise if availL is equal to TRUE and availT is equal to FALSE, pDsY[0][0] is derived as follows:

$$pDsY[0][0]=(pY[-1][0]+2*pY[0][0]+pY[1][0]+2)>>2 \qquad (8\text{-}168)$$

Otherwise if availL is equal to FALSE and availT is equal to TRUE, pDsY[0][0] is derived as follows:

$$pDsY[0][0]=(pY[0][-1]+2*pY[0][0]+pY[0][1]+2)>>2 \qquad (8\text{-}169)$$

Otherwise (availL is equal to FALSE and availT is equal to FALSE), pDsY[0][0] is derived as follows:

$$pDsY[0][0]=pY[0][0] \qquad (8\text{-}170)$$

Otherwise, the following applies:
pDsY[x][y] with x=1 . . . nTbW−1, y=0 . . . nTbH−1 is derived as follows:

$$pDsY[x][y]=(pY[2*x-1][2*y]+pY[2*x-1][2*y+1]+\\2*pY[2*x][2*y]+2*pY[2*x][2*y+1]+pY[2*x+1]\\{[2*y]+pY[2*x+1][2*y+1]+4)>>3} \quad (8\text{-}171)$$

If availL is equal to TRUE, pDsY[0][y] with y=0 . . . nTbH−1 is derived as follows:

$$pDsY[0][y]=(pY[-1][2*y]+pY[-1][2*y+1]+2*pY[0]\\{[2*y]+2*pY[0][2*y+1]+pY[1][2*y]+pY[1][2*y+\\1]+4)>>3} \quad (8\text{-}172)$$

Otherwise, pDsY[0][y] with y=0 . . . nTbH−1 is derived as follows:

$$pDsY[0][y]=(pY[0][2*y]+pY[0][2*y+1]+1)>>1 \quad (8\text{-}173)$$

When numSampL is greater than 0, the down-sampled neighbouring left luma samples pLeftDsY[y] with y=0 . . . numSampL−1 are derived as follows:
  If (y+1)% yS is equal to 0, the following applies:
    If sps_cclm_colocated_chroma_flag is equal to 1, the following applies:
      pLeftDsY[y] with y=1 . . . nTbH−1 is derived as follows:

$$pLeftDsY[y]=(pY[-2][2*y-1]+pY[-3][2*y]+4*pY[-2]\\{[2*y]+pY[-1][2*y]+pY[-2][2*y+1]+4)>>3} \quad (8\text{-}174)$$

If availTL is equal to TRUE, pLeftDsY[0] is derived as follows:

$$pLeftDsY[0]=(pY[-2][-1]+pY[-3][0]+4*pY[-2][0]+\\pY[-1][0]+pY[-2][1]+4)>>3 \quad (8\text{-}175)$$

Otherwise, pDsY[x][0] with x=1 . . . nTbW−1 is derived as follows:

$$pLeftDsY[0]=(pY[-3][0]+2*pY[-2][0]+pY[-1][0]+2)\\>>2 \quad (8\text{-}176)$$

Otherwise, the following applies:

$$pLeftDsY[y]=(pY[-1][2*y]+pY[-1][2*y+1]+2*pY[-2]\\{[2*y]+2*pY[-2][2*y+1]+Y[-3][2*y]+pY[-3]\\[2*y+1]+4)>>3} \quad (8\text{-}177)$$

When numSampT is greater than 0, the down-sampled neighbouring top luma samples pTopDsY[x] with x=0 . . . numSampT−1 are specified as follows:
  If (x+1) % xS is equal to 0, the following applies:
    If sps_cclm_colocated_chroma_flag is equal to 1, the following applies:
      pTopDsY[x] with x=1 . . . numSampT−1 is derived as follows:
      If bCTUboundary is equal to FALSE, the following applies:

$$pTopDsY[x]=(pY[2*x][-3]+pY[2*x-1][-2]+4*pY[2*x]\\{[-2]+pY[2*x+1][-2]+pY[2*x][-1]+4)>>3} \quad (8\text{-}178)$$

Otherwise (bCTUboundary is equal to TRUE), the following applies:

$$pTopDsY[x]=(pY[2*x-1][-1]+2*pY[2*x][-1]+pY\\{[2*x+1][-1]+2)>>2} \quad (8\text{-}179)$$

pTopDsY[0] is derived as follows:
  If availTL is equal to TRUE and bCTUboundary is equal to FALSE, the following applies:

$$pTopDsY[0]=(pY[0][-3]+pY[-1][-2]+4*pY[0][-2]+pY\\{[1][-2]+pY[0][-1]+4)>>3} \quad (8\text{-}180)$$

Otherwise if availTL is equal to TRUE and bCTUboundary is equal to TRUE, the following applies:

$$pTopDsY[0]=(pY[-1][-1]+2*pY[0][-1]+pY[1][-1]+2)\\>>2 \quad (8\text{-}181)$$

Otherwise if availTL is equal to FALSE and bCTUboundary is equal to FALSE, the following applies:

$$pTopDsY[0]=(pY[0][-3]+2*pY[0][-2]+pY[0][-1]+2)\\>>2 \quad (8\text{-}182)$$

Otherwise (availTL is equal to FALSE and bCTUboundary is equal to TRUE), the following applies:

$$pTopDsY[0]=pY[0][-1] \quad (8\text{-}183)$$

Otherwise, the following applies:
pTopDsY[x] with x=1 . . . numSampT−1 is derived as follows:
  If bCTUboundary is equal to FALSE, the following applies:

$$pTopDsY[x]=(pY[2*x-1][-2]+pY[2*x-1][-1]+2*pY\\{[2*x][-2]+2*pY[2*x][-1]+pY[2*x+1][-2]+pY\\[2*x+1][-1]+4)>>3} \quad (8\text{-}184)$$

Otherwise (bCTUboundary is equal to TRUE), the following applies:

$$pTopDsY[x]=(pY[2*x-1][-1]+2*pY[2*x][-1]+pY\\{[2*x+1][-1]+2)>>2} \quad (8\text{-}185)$$

pTopDsY[0] is derived as follows:
  If availTL is equal to TRUE and bCTUboundary is equal to FALSE, the following applies:

$$pTopDsY[0]=(pY[-1][-2]+pY[-1][-1]+2*pY[0][-2]+\\2*pY[0][-1]+pY[1][-2]+pY[1][-1]+4)>>3 \quad (8\text{-}186)$$

Otherwise if availTL is equal to TRUE and bCTUboundary is equal to TRUE, the following applies:

$$pTopDsY[0]=(pY[-1][-1]+2*pY[0][-1]+pY[1][-1]+2)\\>>2 \quad (8\text{-}187)$$

Otherwise if availTL is equal to FALSE and bCTUboundary is equal to FALSE, the following applies:

$$pTopDsY[0]=(pY[0][-2]+pY[0][-1]+1)>>1 \quad (8\text{-}188)$$

Otherwise (availTL is equal to FALSE and bCTUboundary is equal to TRUE), the following applies:

$$pTopDsY[0]=pY[0][-1] \quad (8\text{-}189)(8\text{-}189)$$

The variables minY, maxY, minC and maxC are derived as follows:
  The variable minY is set equal to 1<<(BitDepth$_Y$)+1 and the variable maxY is set equal to −1.
  If availT is equal to TRUE, the variables minY, maxY, minC and maxC with x=0 . . . nS−1 are derived as follows:
    The variable subx is set equal to (x+1)*xS−1
    If minY is greater than pTopDsY[subx], the following applies:

$$minY=pTopDsY[subx] \quad (8\text{-}199)$$

$$minC=p[subx][-1] \quad (8\text{-}200)$$

If maxY is less than pTopDsY[subx], the following applies:

$$maxY=pTopDsY[subx] \quad (8\text{-}201)$$

$$maxC=p[subx][-1] \quad (8\text{-}202)$$

If availL is equal to TRUE, the variables minY, maxY, minC and maxC with y=0 . . . nS−1 are derived as follows:
  The variable suby is set equal to (y+1)*yS−1
  If minY is greater than pLeftDsY[suby], the following applies:

$$minY=pLeftDsY[suby] \quad (8\text{-}203)$$

$$minC=p[-1][suby] \quad (8\text{-}204)$$

If maxY is less than pLeftDsY[suby], the following applies:

$$\text{max}Y = p\text{Left}DsY[suby] \quad (8\text{-}205)$$

$$\text{max}C = p[-1][suby] \quad (8\text{-}206)$$

The variables a, b, and k are derived as follows:
If numSampL is equal to 0, and numSampT is equal to 0, the following applies:

$$k = 0 \quad (8\text{-}207)$$

$$a = 0 \quad (8\text{-}208)$$

$$b = 1 << (\text{BitDepth}_C - 1) \quad (8\text{-}209)$$

Otherwise, the following applies:

$$\text{diff} = \text{max}Y - \text{min}Y \quad (8\text{-}210)$$

If diff is not equal to 0, the following applies:

$$\text{diff}C = \text{max}C - \text{min}C \quad (8\text{-}211)$$

$$x = \text{Floor}(\text{Log 2}(\text{diff})) \quad (8\text{-}212)$$

$$\text{normDiff} = ((\text{diff} << 4) >> x) \& 15 \quad (8\text{-}213)$$

$$x += (\text{normDiff}! = 0)?1:0 \quad (8\text{-}214)$$

$$y = \text{Floor}(\text{Log 2}(\text{Abs}(\text{diff}C))) + 1 \quad (8\text{-}215)$$

$$a = (\text{diff}C * (\text{divSigTable}[\text{normDiff}]18) + 2^{y-1}) >> y \quad (8\text{-}216)$$

$$k = ((3 + x - y) < 1)?1:3 + x - y \quad (8\text{-}217)$$

$$a = ((3 + x - y) < 1)?\text{Sign}(a) * 15:a \quad (8\text{-}218)$$

$$b = \text{min}C - ((a * \text{min}Y) >> k) \quad (8\text{-}219)$$

where divSigTable[ ] is specified as follows:

$$\text{divSigTable}[\ ] = \{0,7,6,5,5,4,4,3,3,2,2,1,1,1,1,0\} \quad (8\text{-}220)$$

Otherwise (diff is equal to 0), the following applies:

$$k = 0 \quad (8\text{-}221)$$

$$a = 0 \quad (8\text{-}222)$$

$$b = \text{min}C \quad (8\text{-}223)$$

The prediction samples predSamples[x][y] with x=0 . . . nTbW−1, y=0 . . . nTbH−1 are derived as follows:

$$\text{predSamples}[x][y] = \text{Clip1}C(((pDsY[x][y] * a) >> k) + b) \quad (8\text{-}224)$$

[Table 41]
5.1.1.1.1 Specification of INTRA_LT_CCLM, INTRA_L_CCLM and INTRA_T_CCLM Intra Prediction Mode Inputs to this process are:
the intra prediction mode predModeIntra,
a sample location (xTbC, yTbC) of the top-left sample of the current transform block relative to the top-left sample of the current picture,
a variable nTbW specifying the transform block width,
a variable nTbH specifying the transform block height,
chroma neighbouring samples p[x][y], with x=−1, y=0 . . . 2*nTbH−1 and x=0 . . . 2*nTbW−1, Y=[1].

Output of this process are predicted samples predSamples [x][y], with x=0 . . . nTbW−1, y=0 . . . nTbH−1.

The current luma location (xTbY, yTbY) is derived as follows:

$$(xTbY, yTbY) = (xTbC << 1, yTbC << 1) \quad (8\text{-}155)$$

The variables availL, availT and availTL are derived as follows:

The availability of left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC) as inputs, and the output is assigned to availL.

The availability of top neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC, yTbC−1) as inputs, and the output is assigned to availT.

The availability of top-left neighbouring samples derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC−1) as inputs, and the output is assigned to availTL.

The number of available top-right neighbouring chroma samples numTopRight is derived as follows:
The variable numTopRight is set equal to 0 and availTR is set equal to TRUE.

When predModeIntra is equal to INTRA_T_CCLM, the following applies for x=nTbW . . . 2*nTbW−1 until availTR is equal to FALSE or x is equal to 2*nTbW−1:

The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC+x, yTbC−1) as inputs, and the output is assigned to availableTR When availableTR is equal to TRUE, numTopRight is incremented by one.

The number of available left-below neighbouring chroma samples numLeftBelow is derived as follows:
The variable numLeftBelow is set equal to 0 and availLB is set equal to TRUE.

When predModeIntra is equal to INTRA_L_CCLM, the following applies for y=nTbH . . . 2*nTbH−1 until availLB is equal to FALSE or y is equal to 2*nTbH−1:

The availability derivation process for a block as specified in clause 6.4.X [Ed. (BB): Neighbouring blocks availability checking process tbd] is invoked with the current chroma location (xCurr, yCurr) set equal to (xTbC, yTbC) and the neighbouring chroma location (xTbC−1, yTbC+y) as inputs, and the output is assigned to availableLB When availableLB is equal to TRUE, numLeftBelow is incremented by one.

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

$$\text{numSamp}T = \text{avail}T?nTbW:0 \quad (8\text{-}156)$$

$$\text{numSamp}L = \text{avail}L?nTbH:0 \quad (8\text{-}157)$$

Otherwise, the following applies:

$$\text{numSamp}T = (\text{avail}T \&\& \text{predModeIntra} == \text{INTRA}\_T\_\text{CCLM})? \\ (nTbW + \text{numTopRight}):0 \quad (8\text{-}158)$$

numSampL=
(availL&&predModeIntra==INTRA_L_CCLM)?
(nTbH+numLeftBelow):0     (8-159)

The variable bCTUboundary is derived as follows:

bCTUboundary=(yTbC&(1<<(Ctb Log 2SizeY−1)−1)
==0)?TRUE:FALSE     (8-160)

The variable nS, xS, and yS are derived as follows:
If predModeIntra is equal to INTRA_LT_CCLM, the following applies:

nS=((availL&& availT)?Min(4,Min(nTbW,nTbH)
>>1):Min(8,(availL?nTbH:nTbW)>>1))     (8-xxx)

xS=numSampT>>Log 2(nS)     (8-xxx)

yS=numSampL>>Log 2(nS)     (8-xxx)

Otherwise if predModeIntra is equal to INTRA_L_CCLM, the following applies:

nS=Min(8,numSampL>>1)     (8-xxx)

xS=2     (8-xxx)

yS=nS>8?(numSampL>>3):2     (8-xxx)

Otherwise (predModeIntra is equal to INTRA_T_CCLM), the following applies:

nS=Min(8,numSampT>>1)     (8-xxx)

xS=nS>8?(numSampT>>3):2     (8-xxx)

yS=2     (8-xxx)

If nS is equal to 1 and availL && availT is equal to FALSE, the following applies:

nS=2     (8-xxx)

xS=1     (8-xxx)

yS=1     (8-xxx)

The prediction samples predSamples[x][y] with x=0 . . . nTbW−1, y=0 . . . nTbH−1 are derived as follows:
If both numSampL and numSampT are equal to 0, the following applies:

predSamples[x][y]=1<<(BitDepth_C−1)     (8-161)

Otherwise, the following ordered steps apply:
The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).
The neighbouring luma samples samples pY[x][y] are derived as follows:
When numSampL is greater than 0, the neighbouring left luma samples pY[x][y] with x=−1 . . . −3, y=0 . . . 2*numSampL−1, are set equal to the reconstructed luma samples prior to the deblocking filter process at the locations (xTbY+x, yTbY+y).
When numSampT is greater than 0, the neighbouring top luma samples pY[x][y] with x=0 . . . 2*numSampT−1, y=−1, −2, are set equal to the reconstructed luma samples prior to the deblocking filter process at the locations (xTbY+x, yTbY+y).
When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

The down-sampled collocated luma samples pDsY[x][y] with x=0 . . . nTbW−1, y=0 . . . nTbH−1 are derived as follows:
If sps_cclm_colocated_chroma_flag is equal to 1, the following applies:
pDsY[x][y] with x=1 . . . nTbW−1, y=1 . . . nTbH−1 is derived as follows:

pDsY[x][y]=(pY[2*x][2*y−1]+pY[2*x−1][2*y]+4*pY
[2*x][2*y]+pY[2*x+1][2*y]+pY[2*x][2*y+1]+4)
>>3     (8-162)

If availL is equal to TRUE, pDsY[0][y] with y=1 . . . nTbH−1 is derived as follows:

pDsY[0][y]=(pY[0][2*y−1]+pY[−1][2*y]+4*pY[0]
[2*y]+pY[1][2*y]+pY[0][2*y+1]+4)>>3     (8-163)

Otherwise, pDsY[0][y] with y=1 . . . nTbH−1 is derived as follows:

pDsY[0][y]=(pY[0][2*y−1]+2*pY[0][2*y]+pY[0][2*y+
1]+2)>>2     (8-164)

If availT is equal to TRUE, pDsY[x][0] with x=1 . . . nTbW−1 is derived as follows:

pDsY[x][0]=(pY[2*x][−1]+pY[2*x−1][0]+4*pY[2*x]
[0]+pY[2*x+1][0]+pY[2*x][1]+4)>>3     (8-165)

Otherwise, pDsY[x][0] with x=1 . . . nTbW−1 is derived as follows:

pDsY[x][0]=(pY[2*x−1][0]+2*pY[2*x][0]+pY[2*x+1]
[0]+2)>>2     [Table 1]

pDsY[x][0]=(pY[2*x−1][0]+2*pY[2*x][0]+pY[2*x+1]
[0]+2)>>2     (8-166)

If availL is equal to TRUE and availT is equal to TRUE, pDsY[0][0] is derived as follows:

pDsY[0][0]=(pY[0][−1]+pY[−1][0]+4*pY[0][0]+pY[1]
[0]+pY[0][1]+4)>>3     (8-167)

Otherwise if availL is equal to TRUE and availT is equal to FALSE, pDsY[0][0] is derived as follows:

pDsY[0][0]=(pY[−1][0]+2*pY[0][0]+pY[1][0]+2)>>2     (8-168)

Otherwise if availL is equal to FALSE and availT is equal to TRUE, pDsY[0][0] is derived as follows:

pDsY[0][0]=(pY[0][−1]+2*pY[0][0]+pY[0][1]+2)>>2     (8-169)

Otherwise (availL is equal to FALSE and availT is equal to FALSE), pDsY[0][0] is derived as follows:

pDsY[0][0]=pY[0][0]     (8-170)

Otherwise, the following applies:
pDsY[x][y] with x=1 . . . nTbW−1, y=0 . . . nTbH−1 is derived as follows:

pDsY[x][y]=(pY[2*x−1][2*y]+pY[2*x−1][2*y+1]+
2*pY[2*x][2*y]+2*pY[2*x][2*y+1]+pY[2*x+1]
[2*y]+pY[2*x+1][2*y+1]+4)>>3     (8-171)

If availL is equal to TRUE, pDsY[0][y] with y=0 . . . nTbH−1 is derived as follows:

pDsY[0][y]=(pY[−1][2*y]+pY[−1][2*y+1]+2*pY[0]
[2*y]+2*pY[0][2*y+1]+pY[1][2*y]+pY[1][2*y+
1]+4)>>3     (8-172)

Otherwise, pDsY[0][y] with y=0 . . . nTbH−1 is derived as follows:

pDsY[0][y]=(pY[0][2*y]+pY[0][2*y+1]+1)>>1     (8-173)

When numSampL is greater than 0, the down-sampled neighbouring left luma samples pLeftDsY[y] with y=0 . . . numSampL−1 are derived as follows:

If (y+1)% yS is equal to 0, the following applies:
If sps_cclm_colocated_chroma_flag is equal to 1, the following applies:
pLeftDsY[y] with y=1 . . . nTbH−1 is derived as follows:

$$pLeftDsY[y]=(pY[-2][2*y-1]+pY[-3][2*y]+4*pY[-2]\\[2*y]+pY[-1][2*y]+pY[-2][2*y+1]+4)>>3 \quad (8\text{-}174)$$

If availTL is equal to TRUE, pLeftDsY[0] is derived as follows:

$$pLeftDsY[0]=(pY[-2][-1]+pY[-3][0]+4*pY[-2][0]+\\pY[-1][0]+pY[-2][1]+4)>>3 \quad (8\text{-}175)$$

Otherwise, pDsY[x][0] with x=1 . . . nTbW−1 is derived as follows:

$$pLeftDsY[0]=(pY[-3][0]+2*pY[-2][0]+pY[-1][0]+2)\\>>2 \quad (8\text{-}176)$$

Otherwise, the following applies:

$$pLeftDsY[y]=(pY[-1][2*y]+pY[-1][2*y+1]+2*pY[-2]\\[2*y]+2*pY[-2][2*y+1]+pY[-3][2*y]+pY[-3]\\[2*y+1]+4)>>3 \quad (8\text{-}177)$$

When numSampT is greater than 0, the down-sampled neighbouring top luma samples pTopDsY[x] with x=0 . . . numSampT−1 are specified as follows:
If (x+1) % xS is equal to 0, the following applies:
If sps_cclm_colocated_chroma_flag is equal to 1, the following applies:
pTopDsY[x] with x=1 . . . numSampT−1 is derived as follows:
If bCTUboundary is equal to FALSE, the following applies:

$$pTopDsY[x]=(pY[2*x][-3]+pY[2*x-1][-2]+4*pY[2*x]\\[-2]+pY[2*x+1][-2]+pY[2*x][-1]+4)>>3 \quad (8\text{-}178)$$

Otherwise (bCTUboundary is equal to TRUE), the following applies:

$$pTopDsY[x]=(pY[2*x-1][-1]+2*pY[2*x][-1]+pY\\[2*x+1][-1]+2)>>2 \quad (8\text{-}179)$$

pTopDsY[0] is derived as follows:
If availTL is equal to TRUE and bCTUboundary is equal to FALSE, the following applies:

$$pTopDsY[0]=(pY[0][-3]+pY[-1][-2]+4*pY[0][-2]+pY\\[1][-2]+pY[0][-1]+4)>>3 \quad (8\text{-}180)$$

Otherwise if availTL is equal to TRUE and bCTUboundary is equal to TRUE, the following applies:

$$pTopDsY[0]=(pY[-1][-1]+2*pY[0][-1]+pY[1][-1]+2)\\>>2 \quad (8\text{-}181)$$

Otherwise if availTL is equal to FALSE and bCTUboundary is equal to FALSE, the following applies:

$$pTopDsY[0]=(pY[0][-3]+2*pY[0][-2]+pY[0][-1]+2)\\>>2 \quad (8\text{-}182)$$

Otherwise (availTL is equal to FALSE and bCTUboundary is equal to TRUE), the following applies:

$$pTopDsY[0]=pY[0][-1] \quad (8\text{-}183)$$

Otherwise, the following applies:
pTopDsY[x] with x=1 . . . numSampT−1 is derived as follows:
If bCTUboundary is equal to FALSE, the following applies:

$$pTopDsY[x]=(pY[2*x-1][-2]+pY[2*x-1][-1]+2*pY\\[2*x][-2]+2*pY[2*x][-1]+pY[2*x+1][-2]+pY\\[2*x+1][-1]+4)>>3 \quad (8\text{-}184)$$

Otherwise (bCTUboundary is equal to TRUE), the following applies:

$$pTopDsY[x]=(pY[2*x-1][-1]+2*pY[2*x][-1]+pY\\[2*x+1][-1]+2)>>2 \quad (8\text{-}185)$$

pTopDsY[0] is derived as follows:
If availTL is equal to TRUE and bCTUboundary is equal to FALSE, the following applies:

$$pTopDsY[0]=(pY[-1][-2]+pY[-1][-1]+2*pY[0][-2]+\\2*pY[0][-1]+pY[1][-2]+pY[1][-1]+4)>>3 \quad (8\text{-}186)$$

Otherwise if availTL is equal to TRUE and bCTUboundary is equal to TRUE, the following applies:

$$pTopDsY[0]=(pY[-1][-1]+2*pY[0][-1]+pY[1][-1]+2)\\>>2 \quad (8\text{-}187)$$

Otherwise if availTL is equal to FALSE and bCTUboundary is equal to FALSE, the following applies:

$$pTopDsY[0]=(pY[0][-2]+pY[0][-1]+1)>>1 \quad (8\text{-}188)$$

Otherwise (availTL is equal to FALSE and bCTUboundary is equal to TRUE), the following applies:

$$pTopDsY[0]=pY[0][-1] \quad (8\text{-}189)$$

The variables minY, maxY, minC and maxC are derived as follows:
The variable minY is set equal to 1<<(BitDepth$_Y$)+1 and the variable maxY is set equal to −1.
If availT is equal to TRUE, the variables minY, maxY, minC and maxC with x=0 . . . nS−1 are derived as follows:
The variable subx is set equal to (x+1)*xS−1
If minY is greater than pTopDsY[subx], the following applies:

$$minY=pTopDsY[subx] \quad (8\text{-}199)$$

$$minC=p[subx][-1] \quad (8\text{-}200)$$

If maxY is less than pTopDsY[subx], the following applies:

$$maxY=pTopDsY[subx] \quad (8\text{-}201)$$

$$maxC=p[subx][1] \quad (8\text{-}202)$$

If availL is equal to TRUE, the variables minY, maxY, minC and maxC with y=0 . . . nS−1 are derived as follows:
The variable suby is set equal to (y+1)*yS−1
If minY is greater than pLeftDsY[suby], the following applies:

$$minY=pLeftDsY[suby] \quad (8\text{-}203)$$

$$minC=p[-1][suby] \quad (8\text{-}204)$$

If maxY is less than pLeftDsY[suby], the following applies:

$$maxY=pLeftDsY[suby] \quad (8\text{-}205)$$

$$maxC=p[-1][suby] \quad (8\text{-}206)$$

The variables a, b, and k are derived as follows:
If numSampL is equal to 0, and numSampT is equal to 0, the following applies:

$$k=0 \quad (8\text{-}207)$$

$$a=0 \quad (8\text{-}208)$$

$$b=1<<(BitDepth_C-1) \quad (8\text{-}209)$$

Otherwise, the following applies:

$$diff=maxY-min \quad (8\text{-}210)$$

If diff is not equal to 0, the following applies:

$$diffC=maxC-minC \quad (8\text{-}211)$$

$x=\text{Floor}(\text{Log }2(\text{diff}))$ (8-212)

$\text{normDiff}=((\text{diff}<<4)>>x)\&15$ (8-213)

$x+=(\text{normDiff}!=0)?1:0$ (8-214)

$y=\text{Floor}(\text{Log }2(\text{Abs}(\text{diffC})))+1$ (8-215)

$a=(\text{diffC}*(\text{divSigTable}[\text{normDiff}]18)+2^{y-1})>>y$ (8-216)

$k=((3+x-y)<1)?1:3+x-y$ (8-217)

$a=((3+x-y)<1)?\text{Sign}(a)*15:a$ (8-218)

$b=\text{minC}-((a*\text{minY})>>k)$ (8-219)

where divSigTable[ ] is specified as follows:

divSigTable[ ]={0,7,6,5,5,4,4,3,3,2,2,1,1,1,1,0} (8-220)

Otherwise (diff is equal to 0), the following applies:

$k=0$ (8-221)

$a=0$ (8-222)

$b=\text{minC}$ (8-223)

The prediction samples predSamples[x][y] with x=0 . . . nTbW−1, y=0 . . . nTbH−1 are derived as follows:

$\text{predSamples}[x][y]=\text{Clip1}C(((pDsY[x][y]*a)>>k)+b)$ (8-224)

In Table 40 and Table 41 above, it is described that downsampling of neighboring luma samples is performed only in the case that "−If (y+1)% yS is equal to 0, the following applies" and "−If (y+1)% yS is equal to 0, the following applies". That is, the downsampling is not performed with respect to all neighboring luma samples, but is performed with respect to neighboring luma samples of limited positions satisfying specific conditions.

The following drawings have been prepared to explain specific examples of the present disclosure. Since names of specific devices described in the drawings and names of specific signal/message/field are exemplarily presented, the technical features of the present disclosure are not limited to the specific names used in the following drawings.

Figure 31:
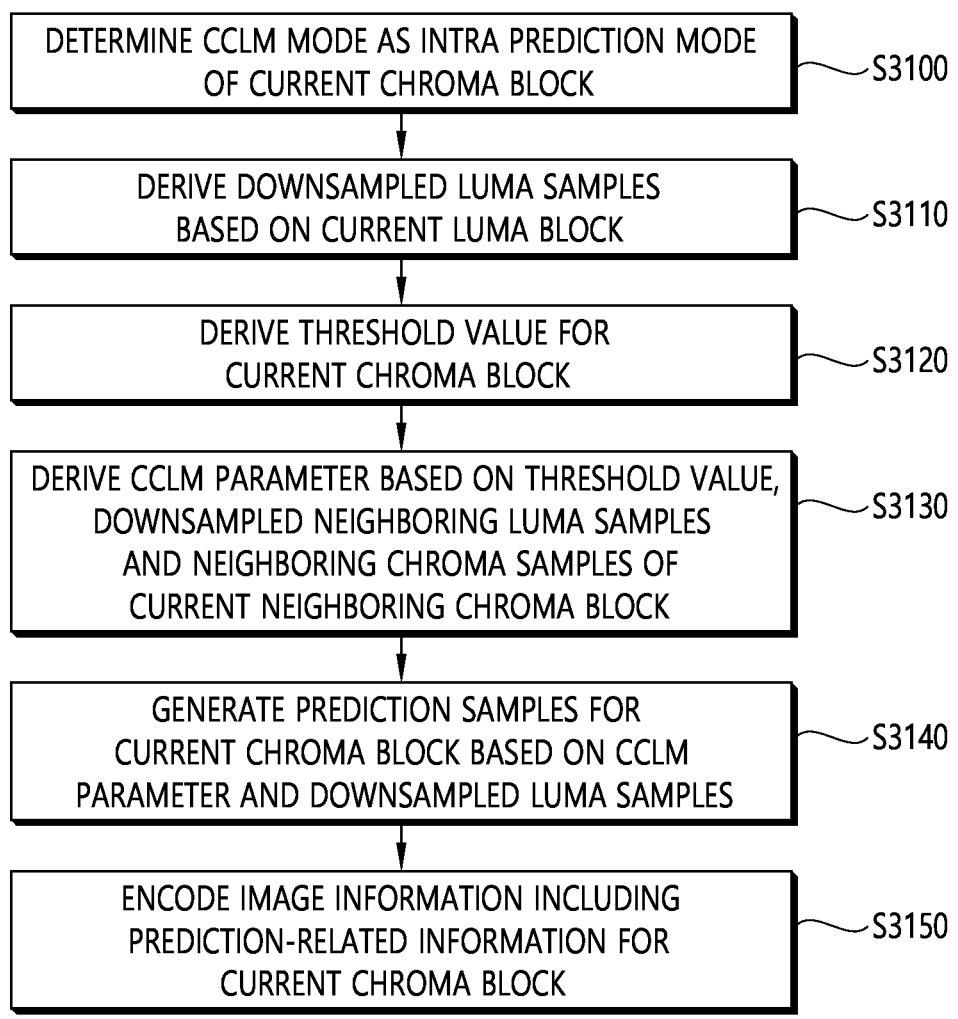
FIG. 31 schematically illustrates an image encoding method by an encoding apparatus according to the present disclosure.

FIG. 31 schematically illustrates an image encoding method performed by an encoding apparatus according to the present document. The method disclosed in FIG. 31 may be performed by the encoding apparatus disclosed in FIG. 2. Specifically, for example, S3100 to S3140 in FIG. 31 may be performed by the predictor of the encoding apparatus, and S3150 may be performed by the entropy encoder of the encoding apparatus. Further, although not illustrated, a process of deriving residual samples for the current chroma block based on the original samples and prediction samples for the current chroma block may be performed by the subtractor of the encoding apparatus, and a process of deriving reconstructed samples for the current chroma block based on the residual samples and the prediction samples for the current chroma block may be performed by the adder of the encoding apparatus. A process of generating information on a residual for the current chroma block based on the residual samples may be performed by the transformer of the encoding apparatus, and a process of encoding the information on the residual may be performed by the entropy encoder of the encoding apparatus.

The encoding apparatus determines a cross-component linear model (CCLM) mode as an intra prediction mode for the current chroma block (S3100). For example, the encoding apparatus may determine the intra prediction mode for the current chroma block based on a rate-distortion (RD) cost (or RDO). Here, the RD cost may be derived based on the sum of absolute difference (SAD). The encoding apparatus may determine the CCLM mode as the intra prediction mode for the current chroma block based on the RD cost.

Further, the encoding apparatus may encode information on the intra prediction mode for the current chroma block, and the information on the intra prediction mode may be signaled through a bitstream. The prediction-related information of the current chroma block may include the information on the intra prediction mode.

The encoding apparatus may derive downsampled luma samples based on the current luma block (S3110).

The encoding apparatus may derive a threshold value for the current chroma block (S3120).

The threshold value may be derived to derive the CCLM parameters for the current chroma block.

For example, the threshold value may be represented as an upper limit of the number of neighboring samples, or the maximum number of neighboring samples. The derived threshold value may be 4. Further, the derived threshold value may be 4, 8, or 16.

If the current chroma block is in the top and left based CCLM mode, that is, if the current chroma block is in the top left based CCLM mode, the CCLM parameters may be derived based on downsampled top left neighboring luma samples and top left neighboring chroma samples, of which the number is equal to the threshold value. For example, if the current chroma block is in the top left based CCLM mode and the threshold value is 4, the CCLM parameters may be derived based on two downsampled left neighboring luma samples, two downsampled top neighboring luma samples, two left neighboring chroma samples, and two top neighboring chroma samples.

Alternatively, if the current chroma block is in the left based CCLM mode, the parameters may be derived based on the downsampled left neighboring luma samples and the left neighboring chroma samples, of which the number is equal to the threshold value. For example, if the current chroma block is in the left based CCLM mode and the threshold value is 4, the CCLM parameters may be derived based on four downsampled left neighboring luma samples and four left neighboring chroma samples.

Alternatively, if the current chroma block is in the top based CCLM mode, the parameters may be derived based on the downsampled top neighboring luma samples and the top neighboring chroma samples, of which the number is equal to the threshold value. For example, if the current chroma block is in the top based CCLM mode and the threshold value is 4, the CCLM parameters may be derived based on four downsampled top neighboring luma samples and four top neighboring chroma samples.

The threshold value described above may be derived as a predetermined value. That is, the threshold value may be derived as a promised value between the encoding apparatus and the decoding apparatus. In other words, the threshold value may be derived as the predetermined value for the current chroma block to which the CCLM mode is applied.

Alternatively, for example, the encoding apparatus may encode image information including prediction-related information, and perform signaling of the image information including the prediction-related information through the bitstream, and the prediction-related information may include information indicating the threshold value. The information indicating the threshold value may be signaled in a unit of coding unit (CU), slice, PPS, or SPS.

Alternatively, for example, the encoding apparatus may encode the image information including the prediction-related information, and the prediction-related information may include flag information indicating whether to derive the number of neighboring reference samples based on the threshold value. If the value of the flag information is 1, the flag information may indicate that the number of neighboring reference samples is derived based on the threshold value, whereas if the value of the flag information is 0, the flag information may indicate that the number of neighboring reference samples is not derived based on the threshold value. If the value of the flag information is 1, the prediction-related information may include the information indicating the threshold value. The information indicating the flag information and/or the threshold value may be signaled in a unit of coding unit (CU), slice, PPS, or SPS.

Alternatively, for example, the threshold value may be derived based on the size of the current block. As an example, the threshold value may be derived based on whether a smaller value between a width and a height of the current block is larger than a specific threshold value. For example, if the smaller value between the width and the height of the current block is larger than the specific threshold value, the threshold value may be derived as 4, and if the smaller value between the width and the height of the current block is not larger than the specific threshold value, the threshold value may be derived as 2. The specific threshold value may be derived as a predetermined value. That is, the specific threshold value may be derived as a promised value between the encoding apparatus and the decoding apparatus. Alternatively, for example, the encoding apparatus may encode the image information including the prediction-related information, and the prediction-related information may include information indicating the specific threshold value. In this case, the specific threshold value may be derived based on the information indicating the specific threshold value. For example, the derived specific threshold value may be 4 or 8.

According to an embodiment, the encoding apparatus may compare the width and the height of the current chroma block with the threshold value. For example, the encoding apparatus may compare the width and the height of the current chroma block with the threshold value.

As an example, the encoding apparatus may compare the width of the current chroma block with the threshold value, and may compare the height of the current chroma block with the threshold value.

Alternatively, as an example, the encoding apparatus may compare the smaller value between the width and the height of the current chroma block with the threshold value, and may compare the height of the current chroma block with the threshold value.

The encoding apparatus may derive the top neighboring chroma samples of which the number is equal to the threshold value of the current chroma value, or the left neighboring chroma samples of which the number is equal to the threshold value, or the top neighboring chroma and left neighboring chroma samples of which the number is equal to the threshold value.

Further, the encoding apparatus may derive the downsampled neighboring luma samples of the current luma block.

Here, the neighboring luma samples may be corresponding samples having relevance to the top neighboring chroma samples and the left neighboring chroma samples. The downsampled neighboring luma samples may include the downsampled top neighboring luma samples of the current luma block corresponding to the top neighboring chroma samples and the downsampled left neighboring luma samples of the current luma block corresponding to the left neighboring chroma samples.

If the top neighboring chroma samples of which the number is equal to the threshold value are derived, the downsampled top neighboring luma samples of which the number is equal to the threshold value corresponding to the top neighboring chroma samples may be derived. Further, if the top neighboring chroma samples of which the number is equal to the value of the width are derived, the downsampled top neighboring luma samples of which the number is equal to the value of the width corresponding to the top neighboring chroma samples may be derived.

Further, if the left neighboring chroma samples of which the number is equal to the threshold value are derived, the downsampled left neighboring luma samples of which the number is equal to the threshold value corresponding to the left neighboring chroma samples may be derived. Further, if the left neighboring chroma samples, of which the number is equal to the value of the height, are derived, the downsampled left neighboring luma samples, of which the number is equal to the value of the height, corresponding to the left neighboring chroma samples may be derived.

If the top neighboring chroma samples and the left neighboring chroma samples, of which the number is equal to the threshold value are derived, the downsampled top neighboring luma samples and the left neighboring luma samples, of which the number is equal to the threshold value, corresponding to the top neighboring chroma samples and the left neighboring chroma samples may be derived.

Meanwhile, the samples which are not used to derive the downsampled neighboring luma samples among the neighboring luma samples of the current luma block may not be downsampled.

The encoding apparatus derives the CCLM parameters based on the threshold value, neighboring chroma samples including at least one of the top neighboring chroma samples and the left neighboring chroma samples, and the neighboring luma samples including at least one of the downsampled neighboring luma samples and the downsampled left neighboring luma samples (S3130).

The encoding apparatus may derive the CCLM parameters based on the threshold value, the top neighboring chroma samples, the left neighboring chroma samples, and the downsampled neighboring luma samples. For example, the CCLM parameters may be derived based Equation 3 as described above.

The encoding apparatus derives the prediction samples for the current chroma block based on the CCLM parameters and the downsampled luma samples (S3140).

The encoding apparatus may derive the prediction samples for the current chroma block based on the CCLM parameters and the downsampled luma samples. The encoding apparatus may generate the prediction samples for the current chroma block by applying the CCLM being derived from the CCLM parameters to the downsampled luma samples. That is, the encoding apparatus may generate the prediction samples for the current chroma block by performing the CCLM prediction based on the CCLM parameters. For example, the prediction samples may be derived based on Equation 1 as described above.

The encoding apparatus encodes image information including prediction-related information for the current chroma block (S3150). The encoding apparatus may encode the image information including the prediction-related information for the current chroma block, and perform signaling of the image information through the bitstream.

For example, the prediction-related information may include information indicating the threshold value. Alternatively, for example, the prediction-related information may include the information indicating the specific threshold value. Alternatively, for example, the prediction-related information may include the flag information indicating whether to derive the number of neighboring reference samples based on the threshold value. Alternatively, for example, the prediction-related information may include the information indicating the intra prediction mode for the current chroma block.

Meanwhile, although not illustrated, the encoding apparatus may derive the residual samples for the current chroma block based on the original samples and prediction samples for the current chroma block, generate information on the residual for the current chroma block based on the residual samples, and encode the information on the residual. The image information may include information on the residual. Further, the encoding apparatus may generate the reconstructed samples for the current chroma block based on the prediction samples and the residual samples for the current chroma block.

Meanwhile, the bitstream may be transmitted to the decoding apparatus through a network or (digital) storage medium. Here, the network may include a broadcasting network and/or a communication network, and the digital storage medium may include various storage media, such as USB, SD, CD, DVD, Blu-ray, HDD, and SSD.

Figure 32:
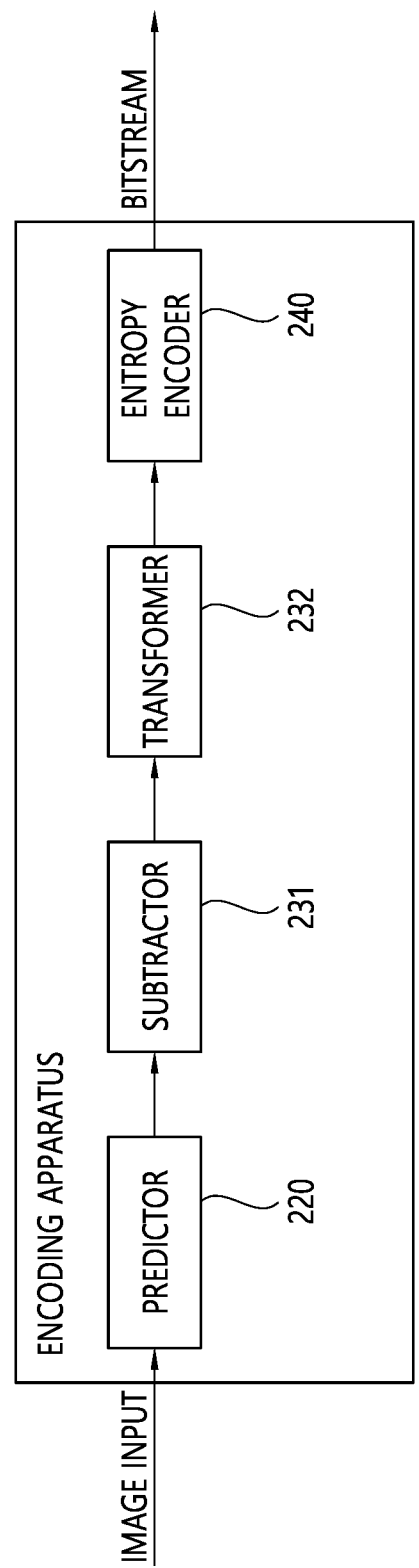
FIG. 32 schematically illustrates an encoding apparatus for performing an image encoding method according to the present disclosure.

FIG. 32 schematically illustrates an encoding apparatus for performing an image encoding method according to the present document. The method disclosed in FIG. 31 may be performed by the encoding apparatus disclosed in FIG. 32. Specifically, for example, the predictor of the encoding apparatus of FIG. 32 may perform S3100 to S3140 in FIG. 31, and the entropy encoder of the encoding apparatus of FIG. 32 may perform S3150 of FIG. 31. Further, although not illustrated, the process of deriving the residual samples for the current chroma block based on the original samples and prediction samples for the current chroma block may be performed by the subtractor of the encoding apparatus of FIG. 32, and the process of deriving the reconstructed samples for the current chroma block based on the prediction samples and the residual samples for the current chroma block may be performed by the adder of the encoding apparatus of FIG. 32. The process of generating the information on the residual for the current chroma block based on the residual samples may be performed by the transformer of the encoding apparatus of FIG. 32, and the process of encoding the information on the residual may be performed by the entropy encoder of the encoding apparatus of FIG. 32.

The following drawings have been prepared to explain specific examples of the present disclosure. Since names of specific devices described in the drawings and names of specific signal/message/field are exemplarily presented, the technical features of the present disclosure are not limited to the specific names used in the following drawings.

Figure 33:
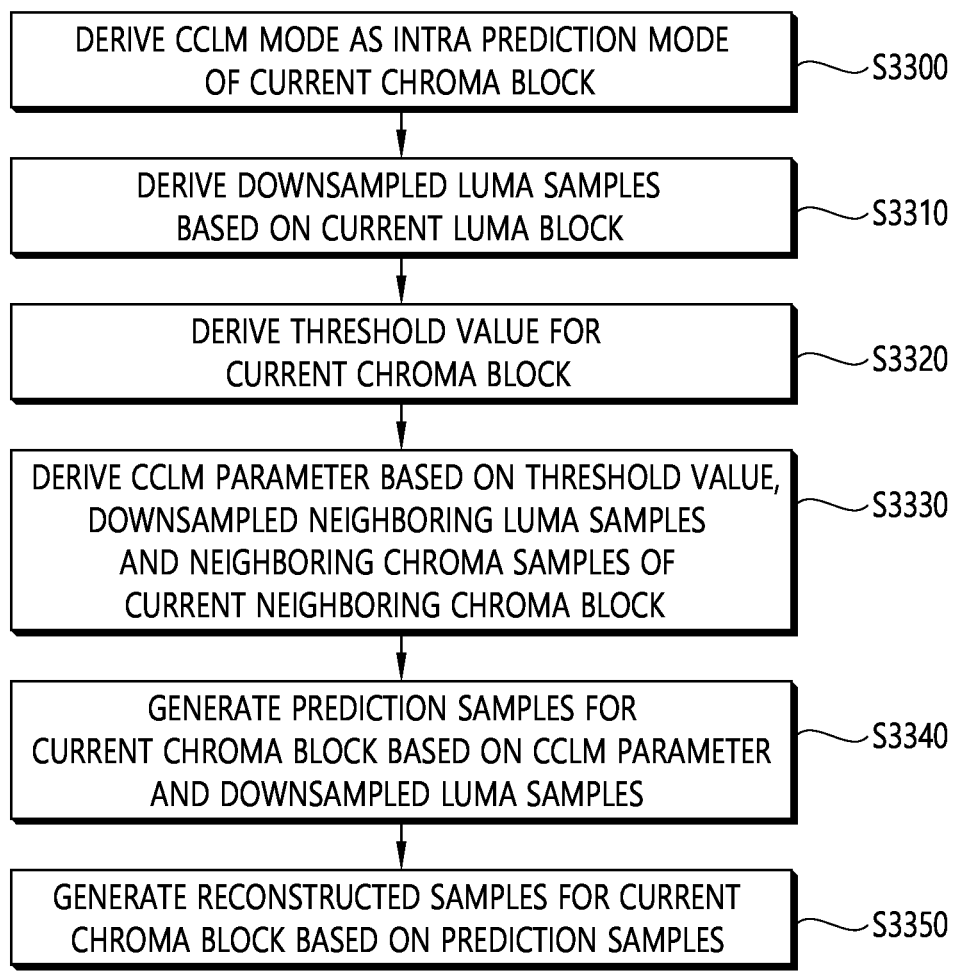
FIG. 33 schematically illustrates an image decoding method by a decoding apparatus according to the present disclosure.

FIG. 33 schematically illustrates an image decoding method performed by a decoding apparatus according to the present document. The method disclosed in FIG. 33 may be performed by the decoding apparatus disclosed in FIG. 3. Specifically, for example, S3300 to S3340 in FIG. 33 may be performed by the predictor of the decoding apparatus, and S3350 may be performed by the adder of the decoding apparatus. Further, although not illustrated, a process of acquiring information on the residual of the current block through the bitstream may be performed by the entropy decoder of the decoding apparatus, and a process of deriving the residual samples for the current block based on the residual information may be performed by the inverse transformer of the decoding apparatus.

The decoding apparatus derives a cross-component linear model (CCLM) mode as an intra prediction mode for the current chroma block (S3300). The decoding apparatus may derive the intra prediction mode for the current chroma block. For example, the decoding apparatus may receive information on the intra prediction mode for the current chroma block through the bitstream, and may derive the CCLM mode as the intra prediction mode for the current chroma block based on the information on the intra prediction mode.

The decoding apparatus may derive downsampled luma samples based on the current luma block (S3310).

The decoding apparatus may derive a threshold value for the current chroma block (S3320).

The threshold value may be derived to derive the CCLM parameters for the current chroma block. For example, the threshold value may be represented as an upper limit of the number of neighboring samples, or the maximum number of neighboring samples. The derived threshold value may be 2. Further, the derived threshold value may be 4, 8, or 16.

If the current chroma block is in the top and left based CCLM mode, that is, if the current chroma block is in the top left based CCLM mode, the CCLM parameters may be derived based on downsampled top left neighboring luma samples of which the number is equal to the threshold value and top left neighboring chroma samples. For example, if the current chroma block is in the top left based CCLM mode and the threshold value is 4, the CCLM parameters may be derived based on two downsampled left neighboring luma samples, two downsampled top neighboring luma samples, two left neighboring chroma samples, and two top neighboring chroma samples.

Alternatively, if the current chroma block is in the left based CCLM mode, the parameters may be derived based on the downsampled left neighboring luma samples and the left neighboring chroma samples, of which the number of equal to the threshold value. For example, if the current chroma block is in the left based CCLM mode and the threshold value is 4, the CCLM parameters may be derived based on four downsampled left neighboring luma samples and four left neighboring chroma samples.

Alternatively, if the current chroma block is in the top based CCLM mode, the parameters may be derived based on the downsampled top neighboring luma samples and the top neighboring chroma samples, of which the number is equal to the threshold value. For example, if the current chroma block is in the top based CCLM mode and the threshold value is 4, the CCLM parameters may be derived based on four downsampled top neighboring luma samples and four top neighboring chroma samples.

The threshold value described above may be derived as a predetermined value. That is, the threshold value may be derived as a promised value between the encoding apparatus and the decoding apparatus. In other words, the threshold value may be derived as the predetermined value for the current chroma block to which the CCLM mode is applied.

Alternatively, for example, the decoding apparatus may acquire image information including prediction-related information through the bitstream, and the prediction-related information may include information indicating the threshold value. In this case, the decoding apparatus may derive the threshold value based on the information indicating the threshold value. The information indicating the threshold value may be signaled in a unit of coding unit (CU), slice, PPS, or SPS.

Alternatively, for example, the decoding apparatus may acquire the image information including the prediction-related information through the bitstream, and the prediction-related information may include flag information indicating whether to derive the number of neighboring reference samples based on the threshold value. If the value of the flag information is 1, the flag information may indicate that the number of neighboring reference samples is derived based on the threshold value, whereas if the value of the flag information is 0, the flag information may indicate that the number of neighboring reference samples is not derived based on the threshold value. If the value of the flag information is 1, the prediction-related information may include the information indicating the threshold value. In this case, the decoding apparatus may derive the threshold value based on the information indicating the threshold value. The information indicating the flag information and/or the threshold value may be signaled in a unit of coding unit (CU), slice, PPS, or SPS.

Alternatively, for example, the threshold value may be derived based on the size of the current block. As an example, the threshold value may be derived based on whether a smaller value between a width and a height of the current block is larger than a specific threshold value. For example, if the smaller value between the width and the height of the current block is larger than the specific threshold value, the threshold value may be derived as 4, and if the smaller value between the width and the height of the current block is not larger than the specific threshold value, the threshold value may be derived as 2. The specific threshold value may be derived as a predetermined value. That is, the specific threshold value may be derived as a promised value between the encoding apparatus and the decoding apparatus. Alternatively, for example, the decoding apparatus may acquire the image information including the prediction-related information through the bitstream, and the prediction-related information may include information indicating the specific threshold value. In this case, the specific threshold value may be derived based on the information indicating the specific threshold value. For example, the derived specific threshold value may be 4 or 8.

The decoding apparatus may compare the width and the height of the current chroma block with the threshold value. For example, the decoding apparatus may compare the width and the height of the current chroma block with the threshold value.

As an example, the decoding apparatus may compare the width of the current chroma block with the threshold value, and may compare the height of the current chroma block with the threshold value.

Alternatively, as an example, the decoding apparatus may compare the smaller value between the width and the height of the current chroma block with the threshold value, and may compare the height of the current chroma block with the threshold value.

The decoding apparatus may derive the top neighboring chroma samples of which the number is equal to the threshold value of the current chroma value, or the left neighboring chroma samples of which the number is equal to the threshold value, or the top neighboring chroma and left neighboring chroma samples of which the number is equal to the threshold value.

Further, the decoding apparatus may derive the downsampled neighboring luma samples of the current luma block.

Here, the neighboring luma samples may be corresponding samples having relevance to the top neighboring chroma samples and the left neighboring chroma samples. The downsampled neighboring luma samples may include the downsampled top neighboring luma samples of the current luma block corresponding to the top neighboring chroma samples and the downsampled left neighboring luma samples of the current luma block corresponding to the left neighboring chroma samples.

If the top neighboring chroma samples of which the number is equal to the threshold value are derived, the downsampled top neighboring luma samples of which the number is equal to the threshold value corresponding to the top neighboring chroma samples may be derived. Further, if the top neighboring chroma samples of which the number is equal to the value of the width are derived, the downsampled top neighboring luma samples of which the number is equal to the value of the width corresponding to the top neighboring chroma samples may be derived.

Further, if the left neighboring chroma samples of which the number is equal to the threshold value are derived, the downsampled left neighboring luma samples of which the number is equal to the threshold value corresponding to the left neighboring chroma samples may be derived. Further, if the left neighboring chroma samples, of which the number is equal to the value of the height, are derived, the downsampled left neighboring luma samples, of which the number is equal to the value of the height, corresponding to the left neighboring chroma samples may be derived.

If the top neighboring chroma samples and the left neighboring chroma samples, of which the number is equal to the threshold value, are derived, the downsampled top neighboring luma samples and the left neighboring luma samples, of which the number is equal to the threshold value, corresponding to the top neighboring chroma samples and the left neighboring chroma samples may be derived.

Alternatively, for example, if the width and the height are equal to or larger than the threshold value, the decoding apparatus may derive the top neighboring chroma samples of which the number is equal to the threshold value of the current chroma block and the left neighboring chroma samples of which the number is equal to the threshold value.

Alternatively, for example, if the width and the height are smaller than the threshold value, the decoding apparatus may derive the top neighboring chroma samples of which the number is equal to the value of the width of the current chroma block and the left neighboring chroma samples of which the number is equal to the value of the height of the current chroma block.

Alternatively, for example, if the width is equal to or larger than the threshold value and the height is smaller than the threshold value, the decoding apparatus may derive the top neighboring chroma samples of which the number is equal to the threshold value of the current chroma block and the left neighboring chroma samples of which the number is equal to the value of the height.

Alternatively, for example, if the width is smaller than the threshold value and the height is equal to or larger than the threshold value, the decoding apparatus may derive the top neighboring chroma samples of which the number is equal to the value of the width of the current chroma block and the left neighboring chroma samples of which the number is equal to the threshold value.

Meanwhile, the top neighboring chroma samples may be neighboring chroma samples adjacent to a top boundary of the current chroma block, and the left neighboring chroma samples may be neighboring chroma samples adjacent to a left boundary of the current chroma block.

Further, in the case that the top neighboring chroma samples of which the number is equal to the threshold value are derived, the top neighboring chroma samples at positions derived based on Equation 6 above among the top neighboring chroma samples adjacent to the top boundary of the current chroma block may be derived as the top neighboring chroma samples of which the number is equal to the threshold value. Further, in the case that the left neighboring chroma samples of which the number is equal to the threshold value are derived, the top neighboring chroma samples at positions derived based on Equation 6 above among the left neighboring chroma samples adjacent to the left boundary of the current chroma block may be derived as the left neighboring chroma samples of which the number is equal to the threshold value.

Alternatively, in the case that the top neighboring chroma samples of which the number is equal to the threshold value are derived, the top neighboring chroma samples at positions derived based on Equation 6 above among the top neighboring chroma samples adjacent to the top boundary of the current chroma block may be derived as the top neighboring chroma samples of which the number is equal to the threshold value. Further, in the case that the left neighboring chroma samples of which the number is equal to the threshold value are derived, the top neighboring chroma samples at positions derived based on Equation 6 above among the left neighboring chroma samples adjacent to the left boundary of the current chroma block may be derived as the left neighboring chroma samples of which the number is equal to the threshold value.

Here, the neighboring luma samples may correspond to the top neighboring chroma samples and the left neighboring chroma samples. The downsampled neighboring luma samples may include the downsampled top neighboring luma samples of the current luma block corresponding to the top neighboring chroma samples and the downsampled left neighboring luma samples of the current luma block corresponding to the left neighboring chroma samples.

If the top neighboring chroma samples of which the number is equal to the threshold value are derived, the downsampled top neighboring luma samples, of which the number is equal to the threshold value, corresponding to the top neighboring chroma samples may be derived. Further, if the top neighboring chroma samples of which the number is equal to the value of the width are derived, the downsampled top neighboring luma samples, of which the number is equal to the value of the width, corresponding to the top neighboring chroma samples may be derived.

Further, if the left neighboring chroma samples of which the number is equal to the threshold value are derived, the downsampled left neighboring luma samples, of which the number is equal to the threshold value, corresponding to the left neighboring chroma samples may be derived. Further, if the left neighboring chroma samples of which the number is equal to the value of the height are derived, the downsampled left neighboring luma samples, of which the number is equal to the value of the height, corresponding to the left neighboring chroma samples may be derived.

Meanwhile, the samples which are not used to derive the downsampled neighboring luma samples among the neighboring luma samples of the current luma block may not be downsampled.

The decoding apparatus may derive the CCLM parameters based on the threshold value, the top neighboring chroma samples, the left neighboring chroma samples, and the downsampled neighboring luma samples (S3330). For example, the CCLM parameters may be derived based on Equation 3 above.

The decoding apparatus derives prediction samples for the current chroma block based on the CCLM parameters and the down-sampled luma samples (step, S3340). The decoding apparatus may derive the prediction samples for the current chroma block based on the CCLM parameters and the down-sampled luma samples. The decoding apparatus may apply the CCLM derived by the CCLM parameters to the own-sampled luma samples and generate prediction samples for the current chroma block. That is, the decoding apparatus may perform a CCLM prediction based on the CCLM parameters and generate prediction samples for the current chroma block. For example, the prediction samples may be derived based on Equation 1 described above.

The decoding apparatus generates reconstructed samples for the current chroma block based on the prediction samples (step, S3350). The decoding apparatus may generate the reconstructed samples based on the prediction samples. For example, the decoding apparatus may receive information for a residual for the current chroma block from the bitstream. The information for the residual may include a transform coefficient for the (chroma) residual sample. The decoding apparatus may derive the residual sample (or residual sample array) for the current chroma block based on the residual information. In this case, the decoding apparatus may generate the reconstructed samples based on the prediction samples and the residual samples. The decoding apparatus may derive a reconstructed block or a reconstructed picture based on the reconstructed sample. Later, the decoding apparatus may apply the in-loop filtering procedure such as deblocking filtering and/or SAO process to the reconstructed picture to improve subjective/objective image quality, as described above.

Figure 34:
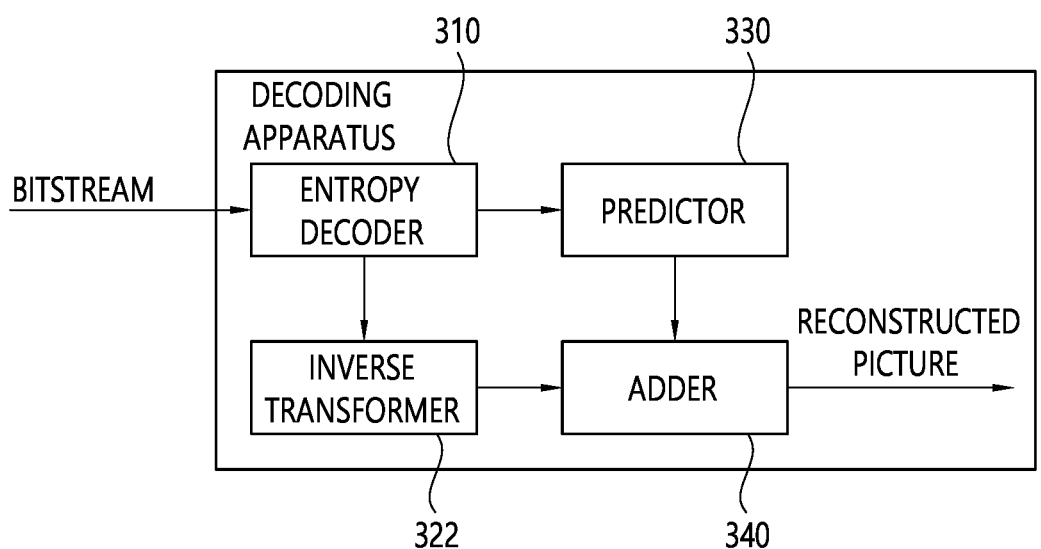
FIG. 34 schematically illustrates a decoding apparatus performing an image decoding method according to the present disclosure.

FIG. 34 schematically illustrates a decoding apparatus for performing an image decoding method according to the present document. The method disclosed in FIG. 33 may be performed by the decoding apparatus disclosed in FIG. 34. Specifically, for example, the predictor of the decoding apparatus of FIG. 34 may perform S3300 to S3340 of FIG. 33, and the adder of the decoding apparatus of FIG. 22 may perform S3350 in FIG. 33. Further, although not illustrated, the process of acquiring image information including information on the residual of the current block through the bitstream may be performed by the entropy decoder of the decoding apparatus of FIG. 34, and the process of deriving the residual samples for the current block based on the residual information may be performed by the inverse transformer of the decoding apparatus of FIG. 34.

According to the present document as described above, the image coding efficiency can be enhanced through performing of the intra prediction based on the CCLM.

Further, according to the present document, the CCLM-based intra prediction efficiency can be enhanced.

Further, according to the present document, the intra prediction complexity can be reduced by limiting the number of neighboring samples being selected to derive the linear model parameter for the CCLM to the specific number.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding device and the encoding device to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 35:
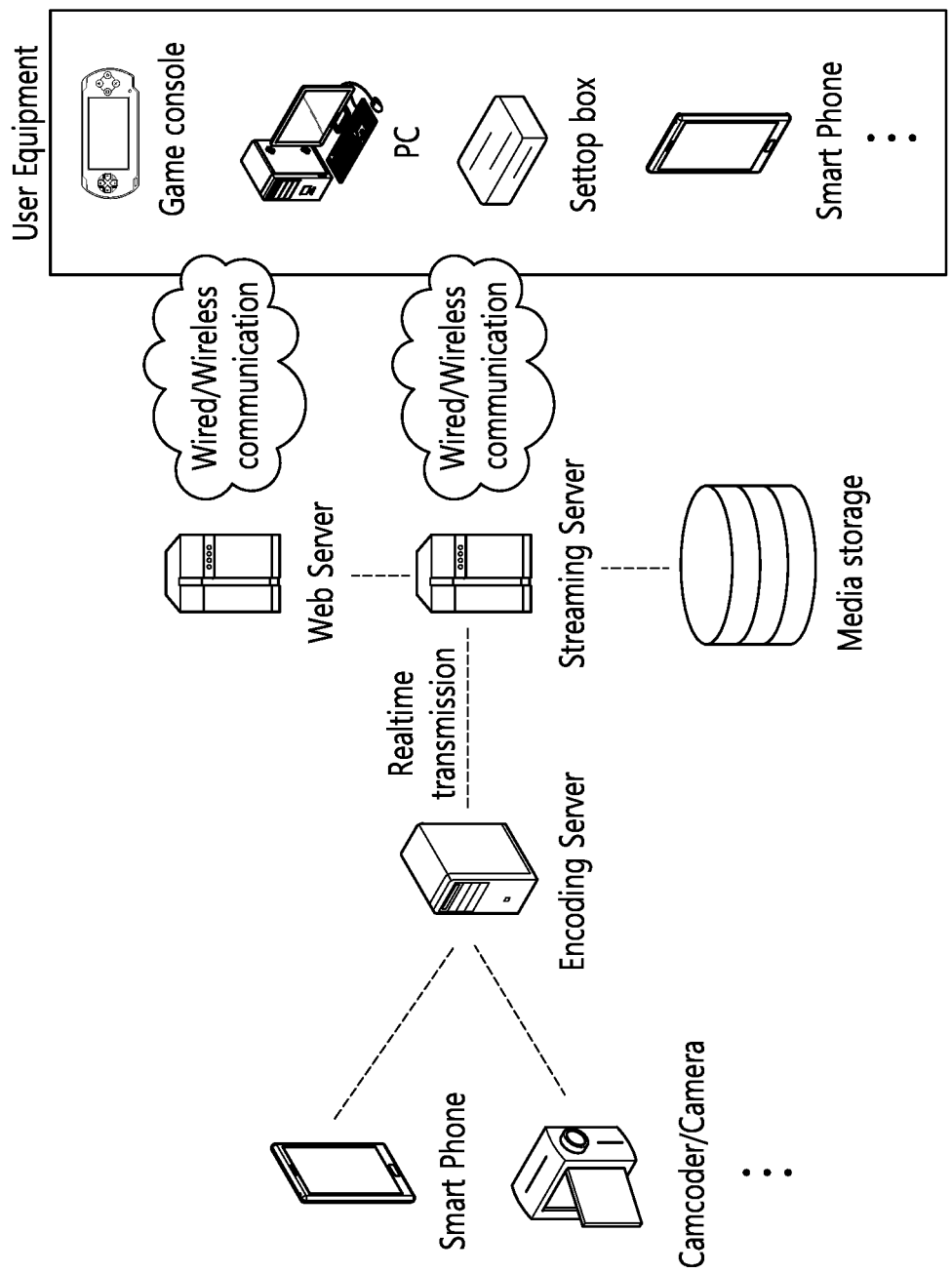
FIG. 35 exemplarily illustrates a content streaming system structure to which embodiments of the present disclosure are applied.

FIG. 35 illustrates a structural diagram of a contents streaming system to which the present disclosure is applied.

The content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like. Each server in the content streaming system may be operated as a distributed server, in which case data received from each server may be distributed.

Claims described in the present disclosure may be combined in various ways. For example, the technical features of the method claims of the present disclosure may be combined to be implemented as the apparatus, and the technical features of the apparatus claims of the present disclosure may be combined to be implemented as the method. Further, the technical features of the method claims and the technical features of the apparatus claims of the present disclosure may be combined to be implemented as the apparatus, and the technical features of the method claims and the technical features of the apparatus claims of the present disclosure may be combined to be implemented as the method.

What is claimed is:

1. An image decoding method performed by a decoding apparatus, the method comprising:

deriving a cross-component linear model (CCLM) mode as an intra prediction mode for a current chroma block based on prediction mode information on the current chroma block, wherein the derived CCLM mode is one of a left based CCLM mode or a top based CCLM mode;

deriving downsampled luma samples based on a current luma block;

deriving downsampled neighboring luma samples based on neighboring luma samples of the current luma block;

deriving a CCLM parameter based on the downsampled neighboring luma samples and neighboring chroma samples of the current chroma block; and generating prediction samples of the current chroma block based on the CCLM parameter and the downsampled luma samples, wherein a width and a height of the current chroma block is N, wherein based on the CCLM mode being the left based CCLM mode and N being greater than a threshold value, downsampled left neighboring luma samples and left neighboring chroma samples are derived and a number of the downsampled left neighboring luma samples and a number of the left neighboring chroma samples are equal to twice the threshold value, and wherein based on the CCLM mode being the top based CCLM mode and the N being greater than the threshold value, downsampled top neighboring luma samples and top neighboring chroma samples are derived and a number of the downsampled top neighboring luma samples and a number of the top neighboring chroma samples are equal to twice the threshold value.

2. An image encoding method performed by an encoding apparatus, the method comprising:

determining a cross-component linear model (CCLM) mode as an intra prediction mode for a current chroma block, wherein the determined CCLM mode is one of a left based CCLM mode or a top based CCLM mode;

deriving downsampled luma samples based on a current luma block;

deriving downsampled neighboring luma samples based on neighboring luma samples of the current luma block;

deriving a CCLM parameter based on the downsampled neighboring luma samples and neighboring chroma samples of the current chroma block; and generating prediction samples of the current chroma block based on the CCLM parameter and the downsampled luma samples, wherein a width and a height of the current chroma block is N, wherein based on the CCLM mode being the left based CCLM mode and N being greater than a threshold value, downsampled left neighboring luma samples and left neighboring chroma samples are derived and a number of the downsampled left neighboring luma samples and a number of the left neighboring chroma samples are equal to twice the threshold value, and wherein based on the CCLM mode being the top based CCLM mode and the N being greater than the threshold value, downsampled top neighboring luma samples and top neighboring chroma samples are derived and number of the downsampled top neighboring luma samples and the number of the top neighboring chroma samples are equal to twice the threshold value.

3. A transmission method of data for image, the method comprising:

obtaining a bitstream of image information including prediction mode information for a current chroma block; and transmitting the data including the bitstream of the image information including the prediction mode information, wherein the prediction mode information is generated by determining a cross-component linear model (CCLM) mode as an intra prediction mode for the current chroma block, wherein the determined CCLM mode is one of a left based CCLM mode or a top based CCLM mode, deriving downsampled luma samples based on a current luma block, deriving downsampled neighboring luma samples based on neighboring luma samples of the current luma block, deriving a CCLM parameter based on the downsampled neighboring luma samples and neighboring chroma samples of the current chroma block, generating prediction samples of the current chroma block based on the CCLM parameter and the downsampled luma samples, generating the prediction mode information for the prediction samples of the current chroma block, wherein a width and a height of the current chroma block is N, wherein based on the CCLM mode being the left based CCLM mode and N being greater than a threshold value, downsampled left neighboring luma samples and left neighboring chroma samples are derived and a number of the downsampled left neighboring luma samples and a number of the left neighboring chroma samples are equal to twice the threshold value, and wherein based on the CCLM mode being the top based CCLM mode and the N being greater than the threshold value, downsampled top neighboring luma samples and top neighboring chroma samples are derived and a number of the downsampled top neighboring luma samples and a number of the top neighboring chroma samples are equal to twice the threshold value.

* * * * *